United States Patent
Johnson

(10) Patent No.: US 8,744,885 B2
(45) Date of Patent: Jun. 3, 2014

(54) TASK BASED ORGANIZATIONAL MANAGEMENT SYSTEM AND METHOD

(75) Inventor: Steven J. Johnson, Seattle, WA (US)

(73) Assignee: Snowflake ITM, Inc., Seattle, WA (US)

(*) Notice: Subject to any disclaimer, the term of this patent is extended or adjusted under 35 U.S.C. 154(b) by 964 days.

(21) Appl. No.: 11/692,896

(22) Filed: Mar. 28, 2007

(65) Prior Publication Data

US 2007/0244736 A1    Oct. 18, 2007

Related U.S. Application Data

(60) Provisional application No. 60/743,860, filed on Mar. 28, 2006.

(51) Int. Cl.
   *G06Q 10/00* (2012.01)

(52) U.S. Cl.
   USPC .................. 705/7.12; 705/7.27; 705/7.36

(58) Field of Classification Search
   USPC ................... 705/7.12, 7.27, 7.36
   See application file for complete search history.

(56) References Cited

U.S. PATENT DOCUMENTS

| | | | | |
|---|---|---|---|---|
| 5,765,140 A * | 6/1998 | Knudson et al. | | 705/7.15 |
| 6,076,105 A * | 6/2000 | Wolff et al. | | 709/223 |
| 7,058,660 B2 * | 6/2006 | Scott | | 1/1 |
| 7,096,223 B2 * | 8/2006 | Cope | | 707/661 |
| 7,139,720 B1 * | 11/2006 | Foell et al. | | 705/7.22 |
| 7,155,439 B2 * | 12/2006 | Cope | | 705/26.8 |
| 7,197,502 B2 * | 3/2007 | Feinsmith | | 1/1 |
| 7,801,755 B2 * | 9/2010 | Doherty et al. | | 705/7.13 |
| 7,937,281 B2 * | 5/2011 | Miller et al. | | 705/7.12 |
| 2003/0009540 A1 * | 1/2003 | Benfield et al. | | 709/220 |
| 2003/0048286 A1 * | 3/2003 | Lal | | 345/700 |
| 2003/0126141 A1 * | 7/2003 | Hassman et al. | | 707/100 |
| 2004/0024629 A1 * | 2/2004 | Kirby et al. | | 705/8 |
| 2006/0041447 A1 * | 2/2006 | Vucina et al. | | 705/1 |
| 2006/0136871 A1 * | 6/2006 | O'Connor et al. | | 717/113 |
| 2006/0178921 A1 * | 8/2006 | Chuang et al. | | 705/8 |
| 2007/0038494 A1 * | 2/2007 | Kreitzberg et al. | | 705/8 |
| 2007/0150327 A1 * | 6/2007 | Dromgold | | 705/8 |
| 2007/0156731 A1 * | 7/2007 | Ben-Zeev | | 707/101 |
| 2008/0015880 A1 * | 1/2008 | Freedenberg et al. | | 705/1 |
| 2011/0145805 A1 * | 6/2011 | Taylor et al. | | 717/168 |

OTHER PUBLICATIONS

Wang, Lingyu Wijesekera, Duminda and Jajodia, Sushil, 2004, A Logic-Based Framework for Attribute based Access Control, FMSE '04 Proceedings of the 2004 ACM workshop on Formal methods in security engineering, pp. 45-55.*

Yuan Eric and Tong Jin, 2005, Attributed Based Access Control (ABAC) for Web Services, Proceedings of the IEEE International Conference 2005.*

* cited by examiner

*Primary Examiner* — Jonathan G Sterrett
*Assistant Examiner* — Stephen S Swartz
(74) *Attorney, Agent, or Firm* — ÆON Law; Adam L. K. Philipp; Kyle H. Flindt

(57) ABSTRACT

A system and method of managing tasks and organizations is provided herein.

15 Claims, 56 Drawing Sheets

Fig. 1

Bob's Email Address

Modify Your Email Address:  505

Bob@Org.email

Note:
- An address is required for notifications & form access.
- Your Snowflake Page's email address can be changed at any time by simply typing in and submitting a new one.
- Upon submittal an email notice will be sent to the entered address. If notice is not received, check address.

Submit  510

Cancel  515

Modify 1st User Page: Bob

Input fields show the current data.

Snowflake Name: 605
Organization
(notice of Snowflake name change will be sent to all Snowflake members)
(Snowflake name must be unique within the Snowflake Universe; the system will check for you)

1st User's Page Name: 610
Bob
(notice of Page name change will be sent to all sub-pages and fellow Team members)
(a modified Page name will be checked for uniqueness throughout this Snowflake)

Department: 640
● Current (HQ) 615
○ New [ ] 620
○ Existing [- select from list below -  ▼] 625

[Submit] 630    [Cancel] 635

Move 1st User Page: Bob

This Form will ask the Proposed New Manager Page to accept this 1st User Page as one of its Sub-Pages. You will receive an email notice that the Move has either been Accepted or Rejected.
- If this Move is Accepted, Bob will no longer be a 1st User Page
- If Accepted, this Move will "Close Out" this Snowflake and its Name will be removed from the Data Base Enter the Proposed New Manager Page's Address: — 705
(Snowflake Name/Page Name)

Add a comment for the Proposed New Manager: — 710

Submit — 715          Cancel — 720

Move Page Request

Your Snowflake Page: SF2/Steve2. has been asked to take over management responsibilities for Page: Organization/Bob The Request was made by the Page's current Manager: Organization/Bob — 805

Additional comments from the current Page Manager are:
Requesting that you become my new manager.

Please Accept or Reject the Move:
(In acknowledgement of Acceptance, an automatic email notice will be sent to the Page's current Manager; if accepted, a notice will also be sent as the Page being Moved and its former sub-pages (if any))

● Accept        ○ Reject — 815
    |
   810

The Sub-Page's Department Name is: HQ — 850
If you are Accepting the Request, would you like to change it?
● No Change — 820
○ Change to same Department as your Page (1) — 825
○ New — 830
○ Existing — 835   -- select from list below -- ▼ — 840

Enter comments for the Sub-Page's current Manager's notice:

[ Submit ] — 845

Move 1st User Page: Bob

This 1st User Page has Sub-Pages. Therefore it CANNOT be moved.

(Sub-Pages must first be Moved or Deleted)

Delete 1st User Page: Bob

Are You Sure You Want To Delete This Page?

Deletion of this Page will "Close Out" this Snowflake and this Snowflake will no longer exist.

Tasks on the Deleted First User's Page are automatically dealt with by the System as follows:
(Standard Visibility Tasks)
a) IF the Deleted Page is Task Performer only THEN Task Manager becomes Performer & Manager
b) IF Deleted Page is Task Manager only THEN:
 - IF the Task is attached to a Team THEN The Team Manager becomes the Task Manager
 - IF the Task is NOT attached to a Team THEN Task Performer becomes Performer & Manager
c) IF Deleted Page is Task Manager AND Task Performer THEN:
 - IF the Task is attached to a Team THEN The Team Manager becomes the Task Manager &
   Task Performer NOT attached to a Team THEN Task is Deleted (Hidden Visibility Tasks)
i) IF the Deleted Page is Task Performer only THEN Task Manager becomes Performer & Manager
ii) IF the Deleted Page is Task Manager only THEN:
 - IF the Task is attached to a HIDDEN Team THEN The Team Manager becomes the Task
   Manager Task is NOT attached to a HIDDEN Team THEN Task Performer becomes Performer
iii) IF Deleted Page is Task Manager AND Task Performer THEN:
 - IF the Task is attached to a HIDDEN Team THEN The Team Manager becomes the Task
   Manager Task is NOT attached to a HIDDEN Team THEN Task is Deleted

[ Delete Page & Snowflake ]   [ Cancel ]

Delete 1st User Page: Bob

This 1st User Page has Sub-Page(s) and/or is a Team Manager. Therefore it CANNOT deleted.

To Delete this Page you must first Delete or Move any Sub-Pages and/or Delete or Allocate any Managed Teams.

Create The Task

Enter Task Name: ⟵ 1205
(Task name must be unique on Task Performer's Page; the system will check for you) (Max Characters = ?)

Enter Task Description: (case must be entered) ⟵ 1210

Select Task's Priority: [1 ▼] (1 is highest priority, 5 is lowest) ⟵ 1215

Select the Visibility of the new Task: ⟵ 1265
(Hidden visibility tasks can only be seen by the Task's Performer, Manager and immediate Dependencies. Hidden tasks will not show up on your manager's page's sub-page view of your page. Unless they are the task's manager or Performer.)

● Standard   ○ Hidden
  1220         1225

Attach Task to the appropriate Team, Area of Responsibility and Objective: ⟵ 1240
(A Task does not have to be attached to any of these) 1235
(Team)          (Responsibility)     (Objective)
-select from list below- ▼   ▼   ▼
1230

Select the new task's Parent task from active and future tasks on your page:
(A Task has a Parent if it is a sub-task of a larger (or parent) task) ⟵ 1245
-select from list below- ▼
(Completed and late tasks are not listed)

☐ Check this box if New Task has NO PREDECESSOR or SUCCESSOR ⟵ 1250

[Continue]  [Cancel]
  1255        1260

Create Task for Direct Report(s)

Select Direct-Report(s): — 1505
(Use the Ctrl or Shift key to select more than one option)

Jim
Julie
Steve (Currently a Predecessor and/or Successor cannot be attached to this task if it is being created for more than one performer)

Select Task Manager:  ● Yourself   ○ Recipient — 1510
Select Task Performer: ○ Yourself   ● Recipient — 1511

If Recipient will be the Task's Manager, would you still like to be Notified of changes affecting the Task: ○ Yes  ● No — 1515

Continue — 1520      Cancel — 1525

1500

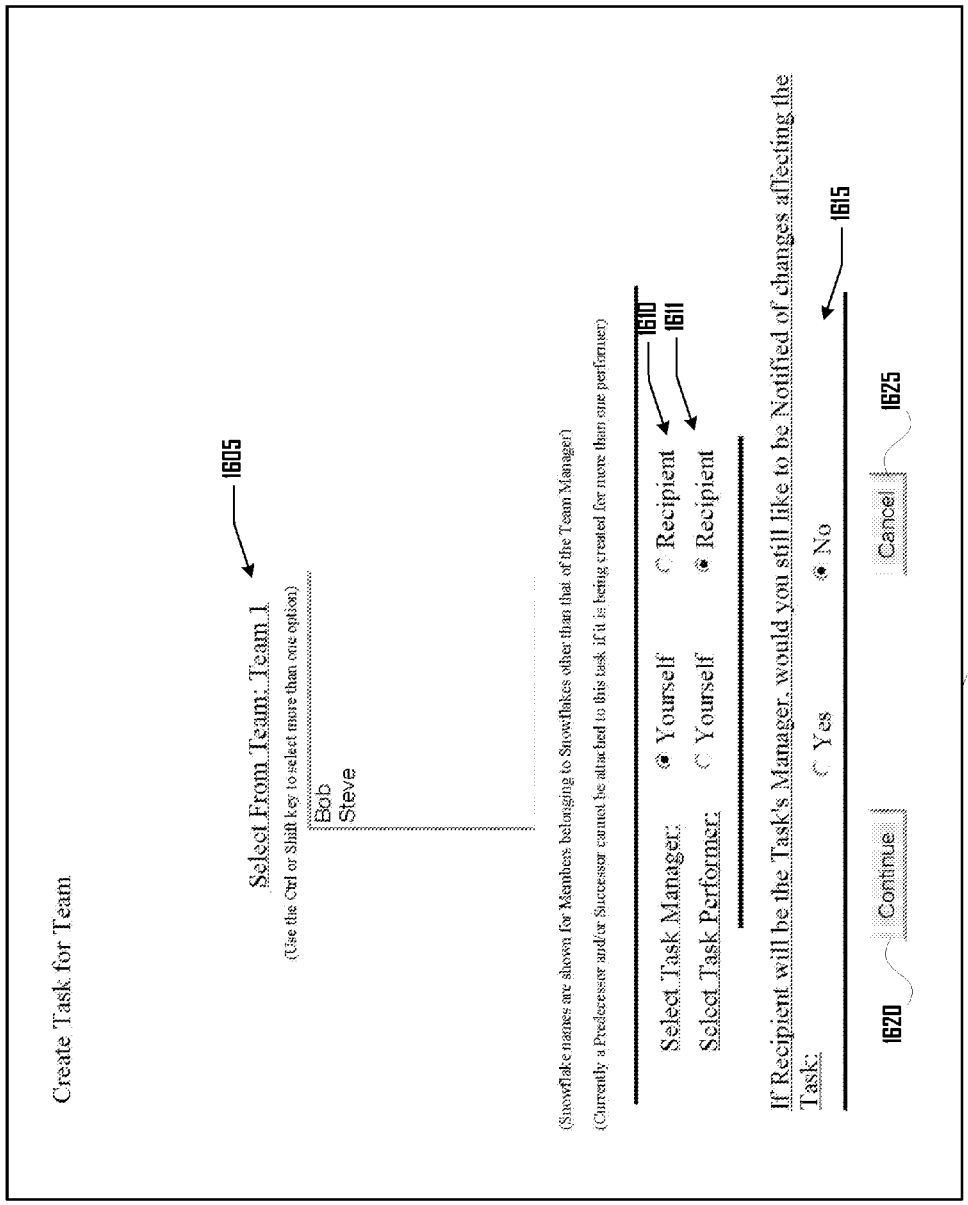

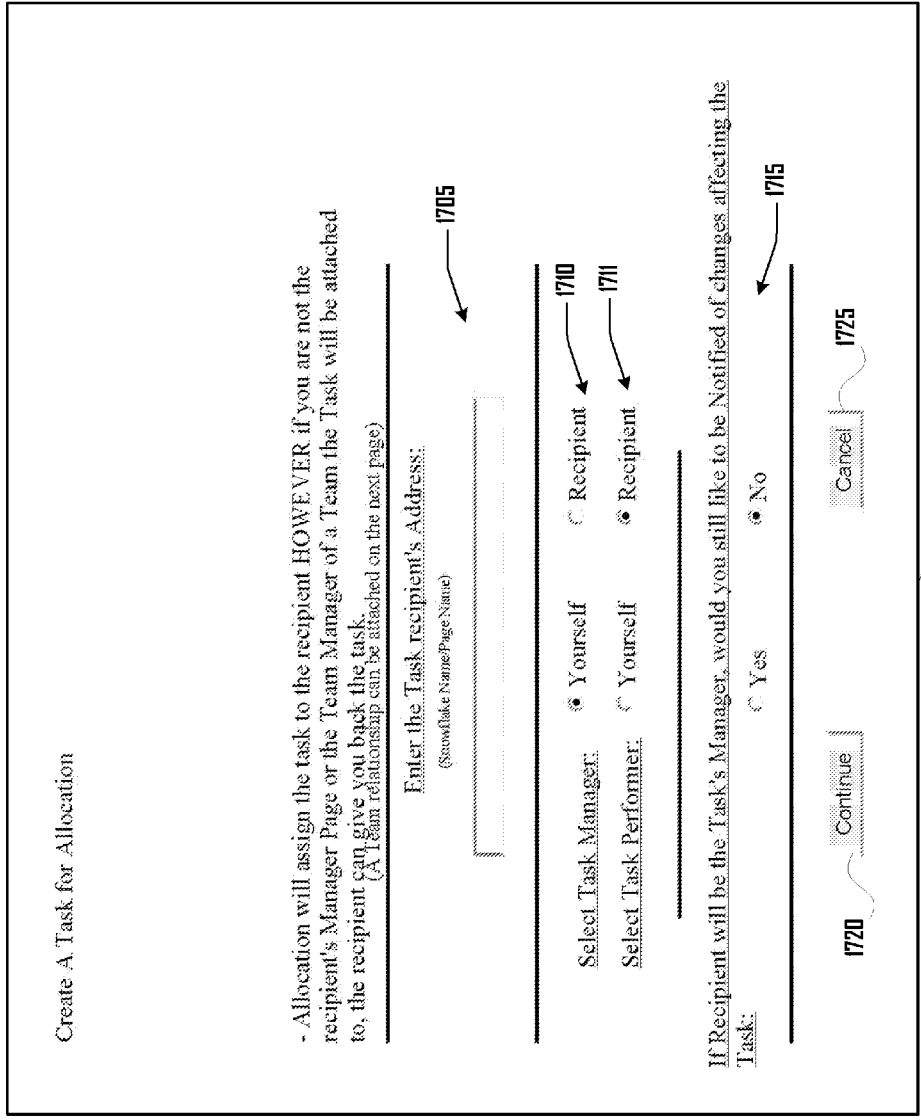

Task Allocation Request

Please Accept or Reject this Task:

To see Task's Definition click linkclick Here To View Task

(The Task is already on your list, you must select reject and submit this form to send the task back to its creator)

○ Accept  1805

○ Reject  1810

Add a Comment if you would like:
(An Acceptance Notice will be sent to The task's Creator, Team Manager, Team Manager if a Team Task & your Manager Page)
(A Rejection Notice will only be sent to the Task's Creator)

[ Submit & Close ] 1815

Create New Sub-Page For Bob

Enter the name of the new sub page: ———— 1905
(Page name will be checked for uniqueness throughout this Snowflake)

Select the department in which the page resides: ———— 1910
Same    HQ
○ New
○ Existing  [- select from list below - ▼] ———— 1915

Enter the Email Address for the new Page: 
(an email notice will be sent to the New Pages owner)

[Submit] ———— 1920           [Cancel] ———— 1925

Modify Sub-Page: Jim

Input fields show the Page's current data. ← 2205

Sub-Page Name:
(a modified Page name will be checked for uniqueness throughout this Snowflake)
[Jim]

Department: ← 2210

2225 ● Current: HQ
2230 ○ Same as Manager Page: HQ
2235 ○ New [____]
2240 ○ Existing - select from list below - ▼

[Submit]   [Cancel] ← 2220
 2215
(sense of Name modification will be sent to the Page and its Member and Managed Groups as well as its fellow Team members.)

Move Sub-Pages: Julie

- For Moves within the Same Snowflake, or to a Different Snowflake, this Form will ask the Proposed Manager Page to accept this Page as one of its Sub-Pages. You will receive an email notice that the X either been Accepted or Rejected
- Moves to Create a new Snowflake are implemented immediately upon the submittal of this Form and notices are sent to all moved Pages.

- For moves within the Same Snowflake, to a Different Snowflake, or a single Page move to a New Snowflake; The Moved Page's Sub-Pages (if any) will move up one level in the hierarchy and become Sub-Pages to your Page.

Select Destination of Move: — 2305

Select New Manager Page:
– select from list below –  — 2365

○ Same Snowflake — 2330

Enter New Manager Page's Address, Snowflake Name, Page Name: — 2345

○ Different Snowflake — 2335

Enter New Snowflake's Name: — 2360

○ Start New Snowflake: — 2340 — 2310

Select Type of Move (Only for Start New Snowflake):
● Move selected Page Only — 2350
○ Move selected Page and ALL the Pages that branch under it, as many levels deep as exist. (This type of Move will keep the branch's hierarchy in tact) — 2355

Add a comment for the Potential New Manager Page or the New 1st User Page: — 2315

[                    ] — 2325

[Submit] — 2320          [Cancel]

Delete Sub-Page: Steve

Are You Sure You Want To Delete This Sub-Page?

The Deleted Page's Sub-Pages (if any) will move up one level in the hierarchy and become your Sub-Pages.

You will also become the New Manager of any Standard Visibility Teams that the Sub-Page is the current Manager of. Hidden Visibility Teams Managed by the Sub-Page will be Deleted.

Tasks on the Deleted Sub-Page are automatically dealt with by the System as follows:

(Standard Visibility Tasks)
a) IF the Deleted Page is Task Performer only THEN Task Manager becomes Performer & Manager
b) IF Deleted Page is Task Manager only THEN the Deleted Page's Manager Page (page doing the deleting) Becomes the Task Manager UNLESS the Task is attached to a Team AND the Manager Page is NOT a Team member or Manager THEN The Team Manager becomes the Task Manager
c) If the Deleted Page is Task Manager AND Task Performer THEN the Deleted Page's Manager Page (page doing the deleting) Becomes the Task Manager & Task Performer UNLESS the Task is attached to a Team AND the Manager Page is NOT a Team member THEN The Team Manager becomes the Task Performer (Hidden Visibility Tasks)
a) IF the Deleted Page is Task Performer only THEN Task Manager becomes Performer & Manager
b) IF the Deleted Page is Task Manager only THEN:
 - IF the Task is attached to a HIDDEN Team THEN The Team Manager becomes the Task Manager AND Task is NOT attached to a HIDDEN Team THEN Task Performer becomes Performer & Manager
c) IF the Deleted Page is Task Manager AND Task Performer THEN:
 - IF the Task is attached to a HIDDEN Team THEN The Team Manager becomes the Task Manager AND the Task is NOT attached to a HIDDEN Team THEN Task is Deleted (Upon deletion, notice will be set to the deleted page, it's former sub-pages (if any) and it's former member group. notice will also be sent to the pages managed and member teams (both hidden and standard visibility))

[ Delete Sub-Page ]  2405    2400    [ Cancel ] 2410

*Fig. 24*

Create A New Team

You will be the initial Team Manager.

Enter Team Name: ⎯2505
(the team name must be unique in this Snowflake; the system will check for you)

Enter Team Goal/Purpose:
(one must be entered)

⎯2510
⎯2515

Select the Visibility of the new Team:
(hidden visibility teams can only be seen by their manager and members; they will also be deleted when/if their manager page is deleted)

● Standard    ○ Hidden
2535        2530

[Submit]    [Cancel]
2520        2525

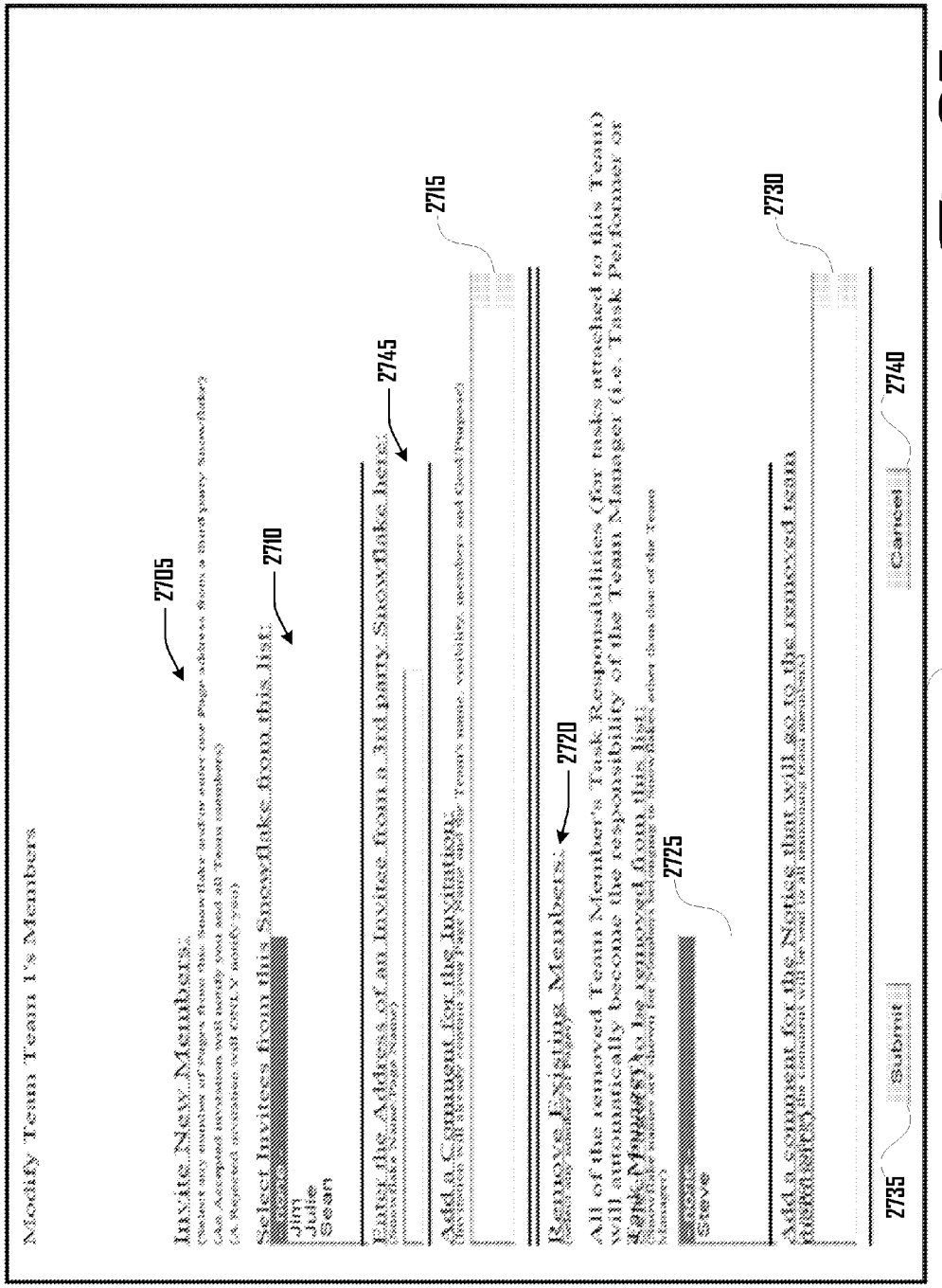

Team Membership Invitation

Your Snowflake Page: Organization/Sean, has been invited to join Team: Organization/Team 1

The Invitation was made by the Team Manager: Organization/Bob

The Team's Visibility is: Standard

Current Team Members are:
(Snowflake names are shown for Members belonging to Snowflakes other than that of the Team Manager)

Steve

The Goal/Purpose of the Team is:
Example: Team

Additional comments from the Team Manager are:
Example: Team Invitation

Please Accept or Reject the Invitation:
○ Accept    2820    ○ Reject
2805

Add a Comment if you would like:
(An Acceptance Notification will be sent to all Team Members)
(A Rejection Notice will be seen only to the Team Manager)

2810

2815  Submit

Modify Team: Team 1

Input fields show the teams current data.
(modify input fields as necessary)

Team Name: — 2905
Team 1
(the team name must be unique in this Snowflake; the system will check for you)

Team Goal/Purpose:
(one must be entered)
Example Team

Team Visibility:
(hidden visibility teams can easily be seen by their manager and members; they will also be deleted when/if their manager page is deleted)
● Standard    ○ Hidden
  2935          2930

(notice of modifications(s) will be sent to all Team members)
Submit    Cancel
2920      2925

Allocate Team: Team 1

If potential new Team Manager is from this Snowflake or Team, click the "Same" button and Select from the dropdown list:
● Same (Snowflake or Team)- select from list below - ▸   — 3035

If Potential New Manager is from a 3rd Party Snowflake, click the "Different Snowflake" button and enter their Address:
                        (Snowflake Name/Page Name)
○ Different Snowflake [         ]  — 3010

Add a comment for the Allocation Invitation:
(Invitation will already contain your Page Name and the Team's name, visibility, members and Goal/Purpose)

[                                                    ] — 3015

☐ Check Here If You Wish To Remain A Team Member  — 3020

IF You choose Not to remain part of the team And the Team Management Allocation is Accepted, the New Team Manager Will receive all of Your Task Responsibilities for Tasks attached to this Team.

(A Rejected Allocation will ONLY notify you)
(This Form will ask the Proposed New Team Manager Page to accept Management responsibility for the Team. You will receive an email notice that the Allocation has either been Accepted or Rejected)
(An Accepted Allocation will notify you and all Team members)

3025 — [Submit]    [Cancel] — 3030

— 3005 (arrow to dropdown)
— 3000 (overall form)

*Fig. 30*

Team Management Invitation

Your Snowflake Page: Organization/Steve, has been asked to take over Management Responsibilities for Team: Organization/Team 1

The Request was made by the Team's current Manager: Organization/Bob (will remain in the group as a member if allocation is accepted)

The Team's Visibility is: Standard

Current Team Members are:
(Snowflake current are shown for Members other than that of the Team Manager)

Steve
Sean

The Goal/Purpose of the Team is:

Additional comments from the current Team Manager are:

Please Accept or Reject the Invitation:
3105 ● Accept    3120 ○ Reject

If You accept the Team Management Invitation AND the current Team Manager chooses Not to remain part of the same TEAM You will receive all of The current Team Manager's Task Responsibilities for Tasks attached to this Team Add a Comment if you would like:
(Acceptance Notice will be sent to all Team Members)
(A Rejection Notice will only be seen by the current Team Manager)

3115 [Submit]

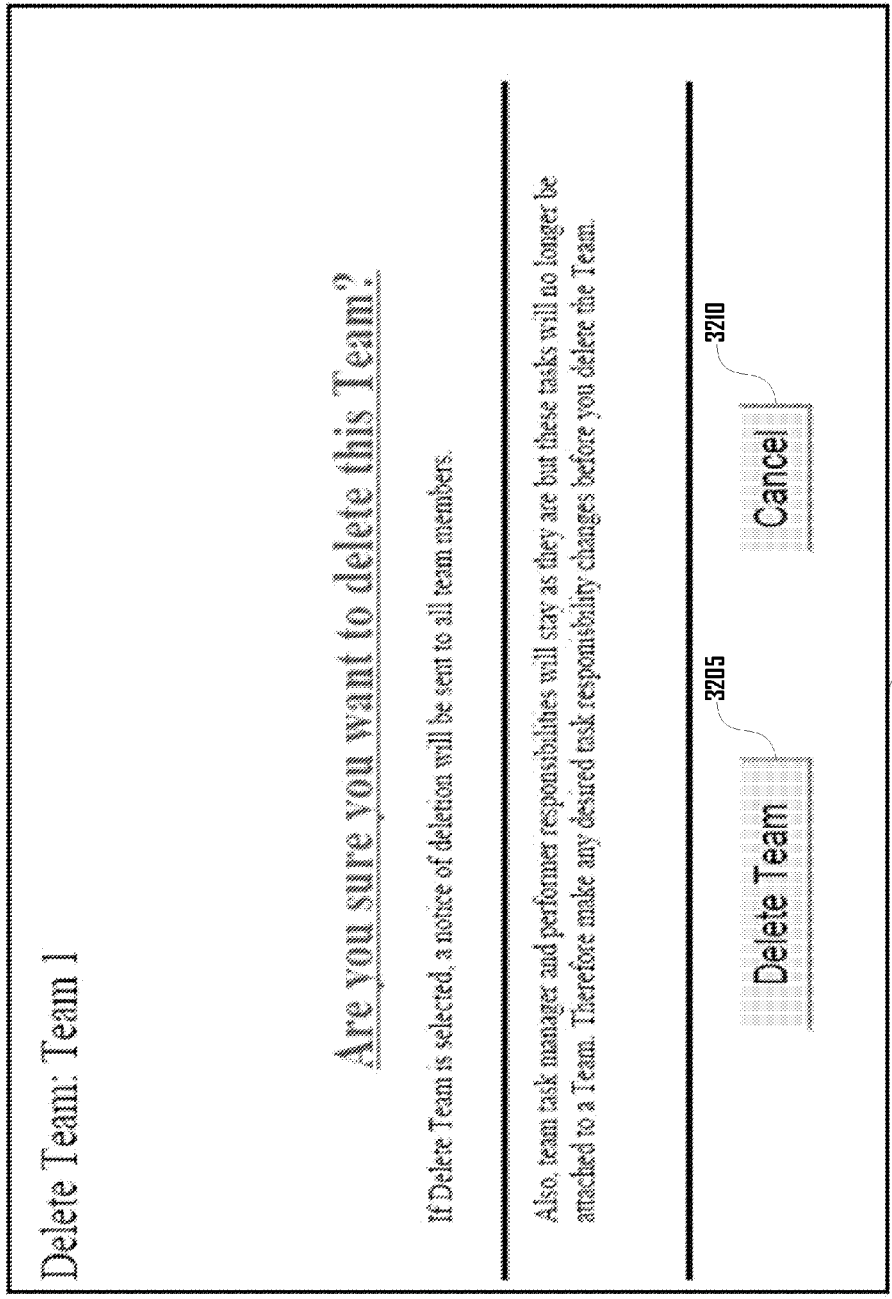

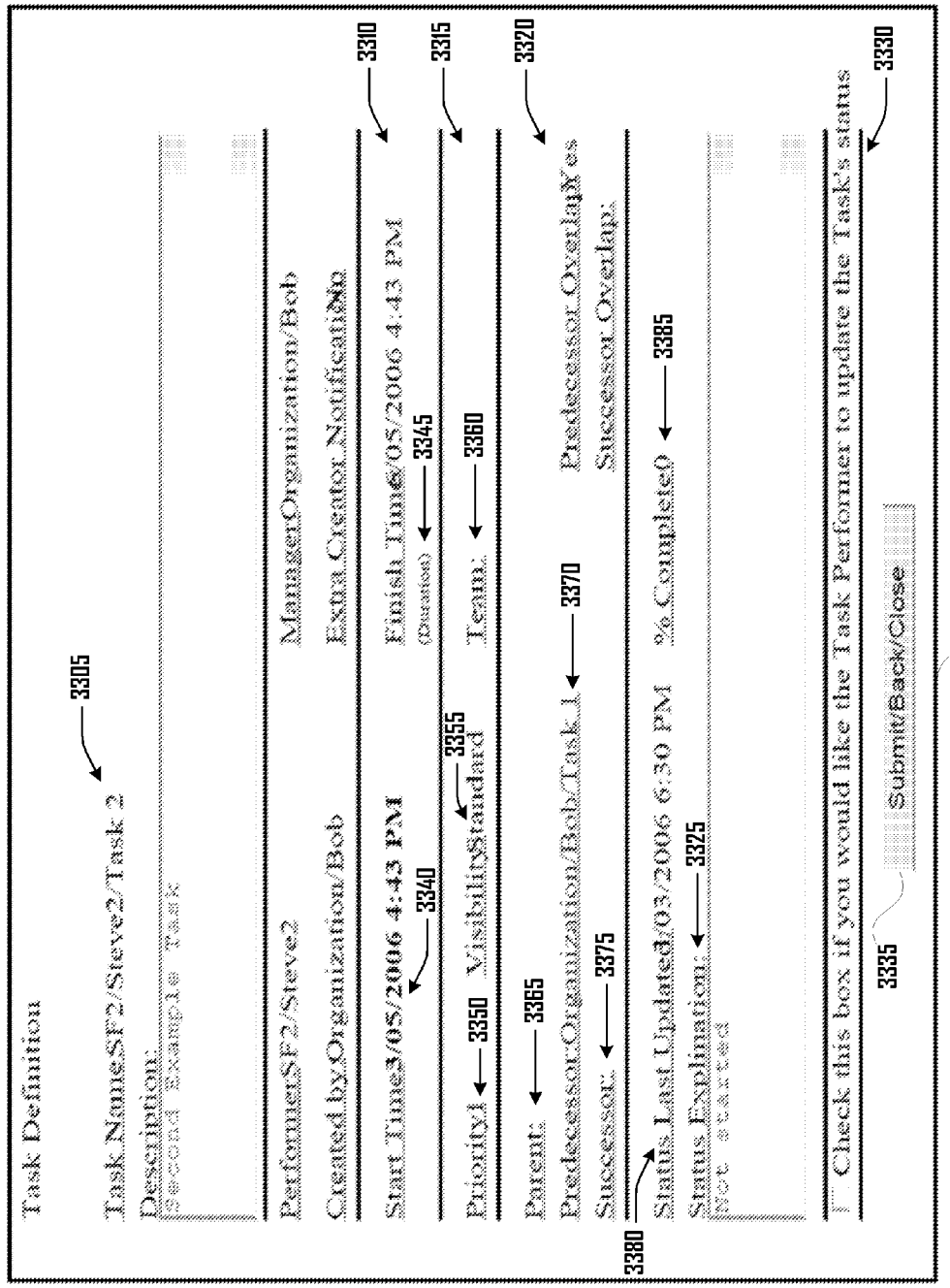

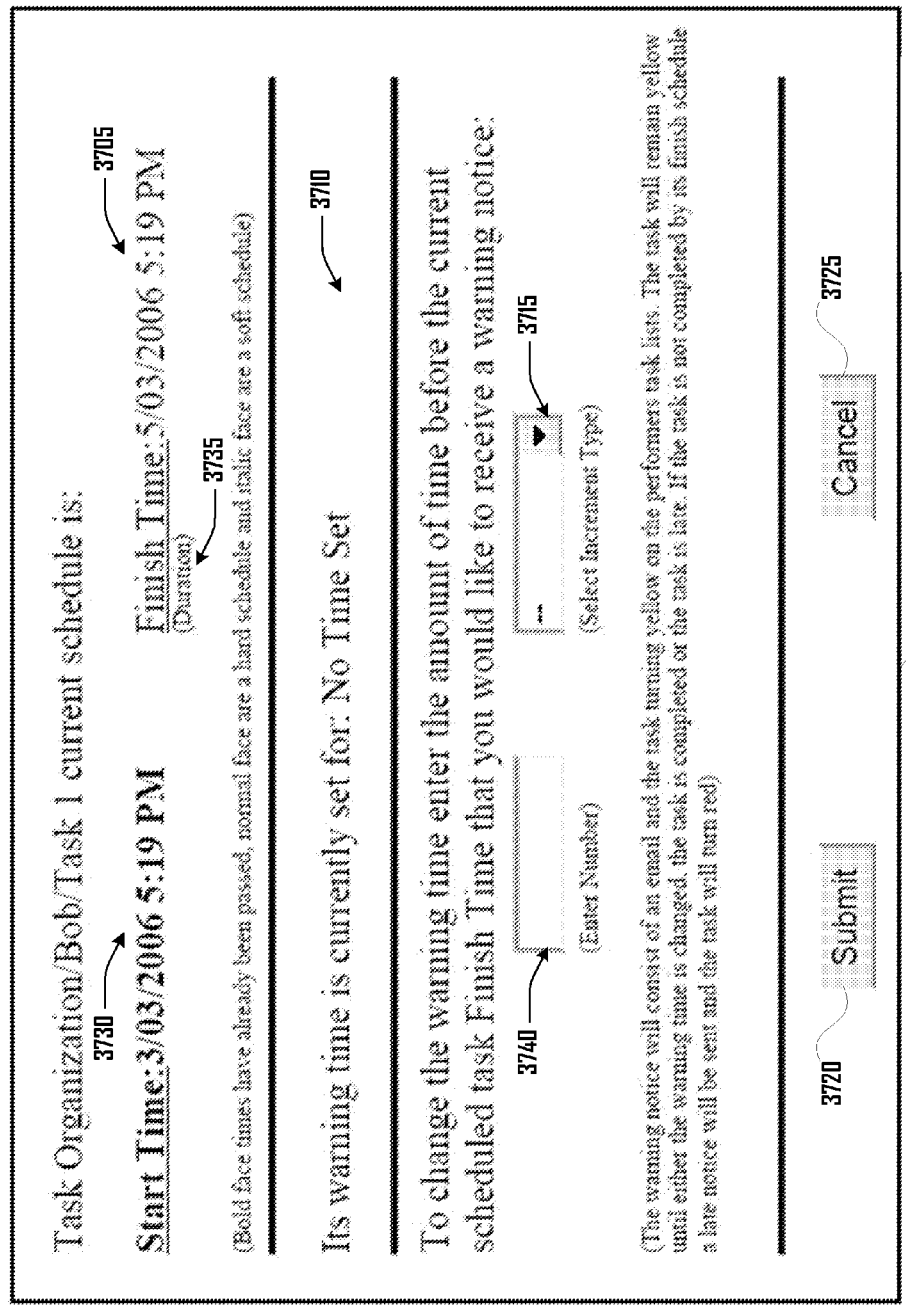

Change Task Manager

Changing Task Manager of Task: Organization/Bob/Task 1. Current task manager is Organization/Bob ← 3805

If potential new Task Manager is from your Snowflake or the selected Task is a Team Task, click the "Same Snowflake Or Team" button and Select from the dropdown (Bob will not be listed) ← 3810

● Same Snowflake Or Team: [ -- Select A Page -- ▼ ] ← 3840

If Potential New Task Manager is from a Different Snowflake, click the "Different Snowflake" button and enter their Address:
(Snowflake Name/Page Name)

○ Different Snowflake: [                    ] (Cannot be current Task Manager)
  ↑                      (Changes to current Task Manager)
  3815                   ← 3845

Add a comment for the Request or notice: ← 3820
(Recipient will already contain your Page Name and the Task's Definition)

[                                              ]
[                                              ]

If you are a Team Manager changing Task Management from one Team Member to another OR you are the Task Manager changing Task Management to one of your immediate Sub-Pages THEN the change will be implemented and the appropriate notices will be sent out.

If you are the Task Manager changing Task Management to a Page that is NOT one of your immediate Sub-Pages THEN a change request will be sent to and must be Accepted by the potential new Task Manager. ← 3825

All other changes will be sent to the Task Manager for approval and if necessary final Acceptance must be received from the potential new Task Manager.
(You will receive email notices, as necessary, regarding each of the above situations and their Progress)

[ Submit ]   [ Cancel ]
   ↑            ↑
  3830         3835

Task Manager Change Request

Organization/Bob has asked your Snowflake Page Organization/Sean to take over management responsibilities for Task Organization/Bob/Task 1.

To see Task's Definition click link-Click Here To View The Task

Additional comments from Organization/Bob are:
Example Task Manager Change

Please Accept or Reject the Request:
● Accept    3905    ○ Reject    3910
(If you accept the Request THEN the change will be implemented)

Add a Comment if you would like: ← 3915
(An Acceptance Notification will be sent to the appropriate User Pages including the request initiator)
(A Rejection Notice will be sent to you, the request initiator and the task manager if they forwarded this request)

3920

Submit & Close

Task Performer Change Request

Organization/Bob has asked that your Snowflake Page Organization/Sean take over performer responsibilities for Task Organization/Bob/Task 1.

To see Task's Definition click linkClick Here To View Task

Additional comments from Organization/Bob are:
Example change Task Performer Rule 2

Please Accept or Reject the Request:

● Accept    4205    ○ Reject    4210

(If you accept the Request THEN the change will be implemented)

Add a Comment if you would like:
(An Acceptance Notification will be sent to the appropriate User Pages including the request initiator)
(A Rejection Notice will be sent to you, the request initiator and the task managers if they forwarded this request)

4215

[ Submit & Close ]    4220

Change Task Performer Request

Organization/Bob has asked your Snowflake Page SF2/Steve2 to change the Task performer of Task Organization/Bob/Task 2 to Organization/Sean.

To see Task's Definition click link(Click Here To View Task

Additional comments from Organization/Bob are:
Example Change Task Manager- Rule 3

Please Forward/Accept or Reject the Request:
• Forward/Accept    ○ Reject ← 4310
          ↑
        4305

(If you accept the request and the potential new Task Performer is your Sub-Page of the Request initiator, the Request initiator or this is a team task and you are the Team Manager and task performance is being transferred from one team member to another THEN the request is implemented)

(Otherwise if you forward the Request THEN a Request will be forwarded to the potential new Task Performer)

Add a Comment if you would like:
An explanation could be sent to the appropriate User Pages including the request initiator
(A Rejection Notice will be sent to you and the request initiator when a requested operation will be sent to the potential new task performer) — 4315
(A Forward Notice will be seen by you and the request initiator)

[Submit & Close]
    ↑
  4320

Change Task Description Request

Organization/Bob has asked your Snowflake Page SF2/Steve2 to approve the following modifications to Task you Manage Organization/Bob/Task 2

Additional comments from Organization/Bob are: — 4505
Task Change Example — 4510

Current Task Name: — 4515
Task 2

Suggested Task Name: — 4525
Task 2 (Change) — 4520

Current Task Description:
Second Example Task

Suggested Task Description: — 4530
Second Example Task (Changed)

Current Task Priority: 1 — 4535

Current Task Visibility: — 4540
Standard

Current Team Attachment: — 4545
No Team Attachment

Please Accept or Reject the Request:
• Accept   ○ Reject — 4555
— 4550
(If you accept the Request THEN the change(s) will be implemented)

Add a Comment if you would like: — 4560
(An Acceptance Notification will be sent to the appropriate User Pages including the request initiator)
(A Rejection Notice will be sent to you and the request initiator)

Submit & Close

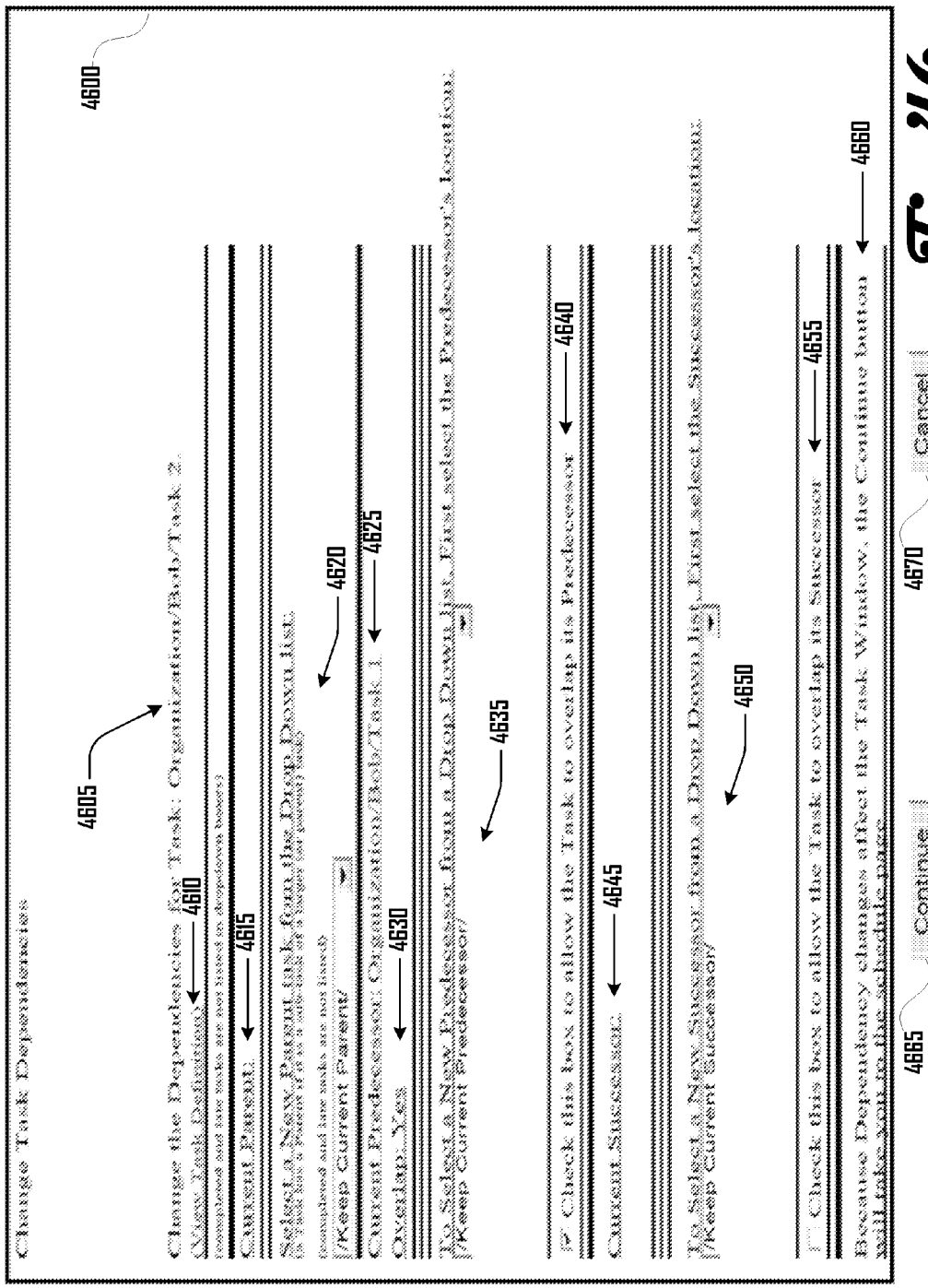

Change Task Schedule

Change/request the change of Task: Organization/Bob/Task 2's Schedule. — 4700
New Task Definition
 Today is: 03/05/2006 — 4705

Current task window: — 4715
Earliest possible start is: Open                  Suggested task window:
Earliest possible finish is: Open                 Earliest possible start is: 5/03/2006 5:10 PM
Latest possible finish is: Open                   Latest possible finish is: Open Current Start Time: 3/05/2006 4:43 PM — 4720     Current Finish Time: 6/05/2006 4:43 PM — 4725
                                   4726

Change/request a new schedule:

START — 4730
○ Use Current Start Time — 4735
○ Activate Task Now — 4740
● Activate Upon Completion of Predecessor — 4745
● Select Start Date & Time
  March 2006
  Sun Mon Tue Wed Thu Fri Sat
   26  27  28   1   2   3   4
    5   6   7   8   9  10  11
   12  13  14  15  16  17  18
   19  20  21  22  23  24  25
   26  27  28  29  30  31   1
    2   3   4   5   6   7   8

FINISH — 4750
○ Use Current Finish Time — 4755
○ Enter Task Duration [   ]
● Select Completion Date & Time — 4760
  March 2006
  Sun Mon Tue Wed Thu Fri Sat
   26  27  28   1   2   3   4
    5   6   7   8   9  10  11
   12  13  14  15  16  17  18
   19  20  21  22  23  24  25
   26  27  28  29  30  31   1
    2   3   4   5   6   7   8

— 4765

If you are the task's Task Manager for you are the Task Manager of a Team that this task is
attached to THEN this task will be changed when you submit this form and the appropriate
persons will be notified.

Otherwise your requested changes will be routed to the task's Task manager for Approval.
You will be notified of their response.

Add a comment or notice: — 4770
                                                                    — 4775
                             — 4780        — 4785

Fig. 47

Change Task Dependencies Request ← 4805

Organization/Job has requested the following modifications to the Dependencies -
Schedule of Task: Organization/Job/Task 2 which you Manage.
View Task Definition ← 4810

Additional comments from Organization/Bob are: ← 4815
[New Schedule]

Click on the Current or Suggested Parent, Predecessor or Successor to see its Definition
Current Parent Task:                    Suggested Parent Task: ← 4840
← 4820
Current Predecessor:                    Suggested Predecessor:
Organization/Job/Task 1 ← 4825          Organization/Bob/Task 1 ← 4845
Overlap: Yes ← 4830                     Overlap: No ← 4850
Current Successor: ← 4835               Suggested Successor: ← 4855

Today is: 03/06/2006 ← 4860
Current task window:                    Suggested task window: ← 4865
Earliest possible start is: Open        Earliest possible start is: 5/02/2006 8:10 PM
Latest possible finish is: Open         Latest possible finish is: Open ← 4875
Current Start Time: 5/05/2006 4:43 PM   Suggested Start Time: 5/08/2006 8:00 AM
Current Finish time: 6/05/2006 4:43 PM  Suggested Finish Time: 6/05/2006 4:43 PM
                 ↑ 4871                                        ↑ 4870

Please Accept or Reject the Request:
○ Accept ← 4880   ○ Reject ← 4885

Add a Comment if you would like:
(An Acceptance Notice will be sent to the appropriate User Pages including the requester
A Rejection Notice will be sent to you and the original requester)

[Submit & Close] ← 4895
                    ↑ 4890

Fig. 48

Change Task Schedule Request

Organization/Bob has requested the following modifications to the Schedule of Task: Organization/Bob/Task 2 which you Manage.
(View Task Definition) ← 5010

Additional comments from Organization/Bob are: ← 5005
Example: Change Schedule ← 5015

Today Is: 03/07/2006

Current task window: ← 5020
Earliest possible start is: Open
Earliest Possible Finish is: 3/03/2006 5:20 PM
Latest possible finish is: Open Current Start Time: 3/05/2006 4:43 PM    Suggested Start Time: 3/07/2006 11:11 AM ← 5030
                    ↑ 5026
Current Finish time: 6/05/2006 4:43 PM    Suggested Finish Time: 6/05/2006 4:43 PM
                     ↑ 5025

Please Accept or Reject the Request:
○ Accept  ○ Reject ← 5040
         ↑ 5035
(If you accept the Request THEN the change(s) will be implemented)

Add a Comment if you would like: ← 5045

(An Acceptance Notification will be sent to the appropriate User Pages (including the request initiator).)
(A Rejection Notice will be sent to you and the request initiator.)

[ Submit & Close ] ← 5050

Figure 51:
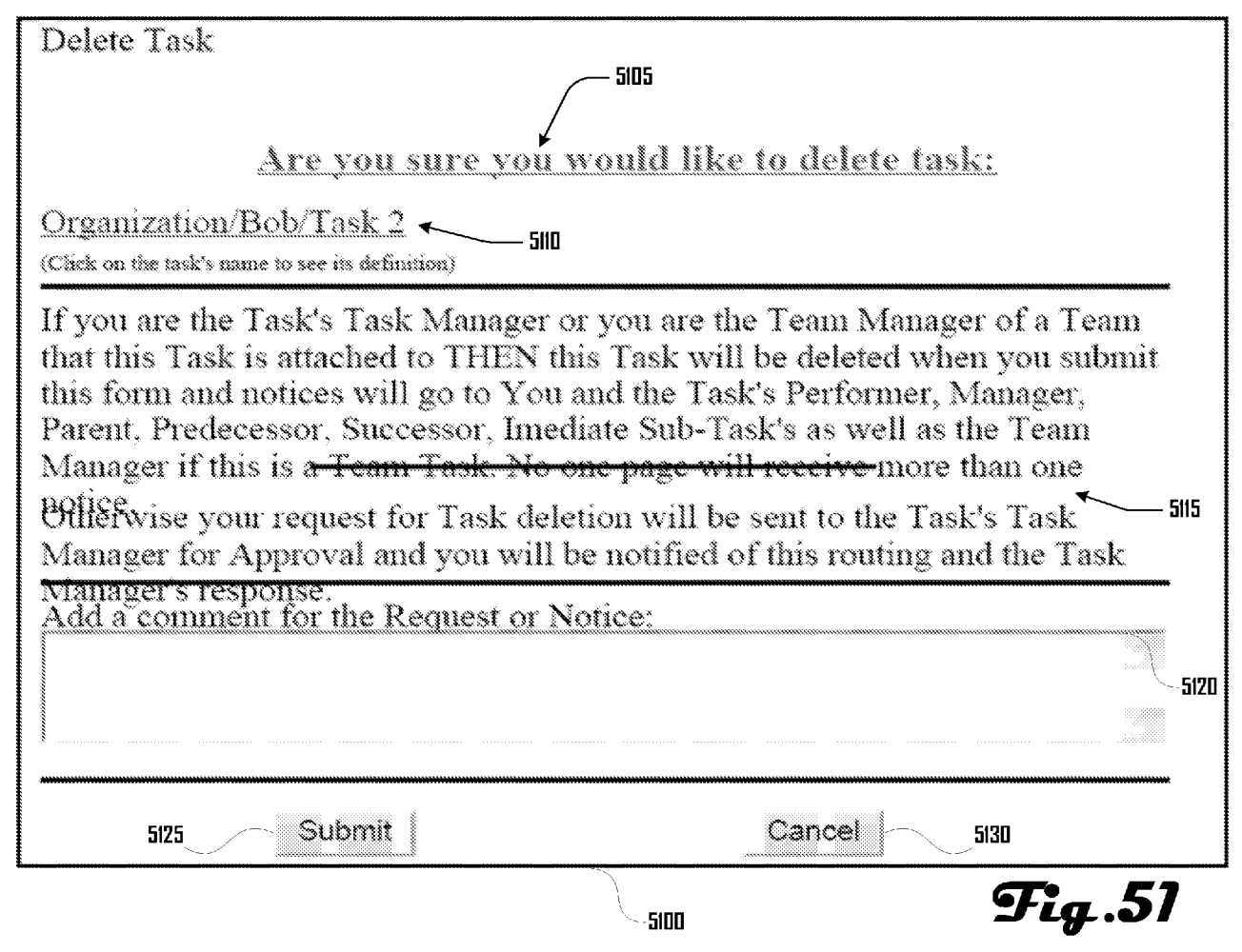

Delete Task

Are you sure you would like to delete task: — 5105

Organization/Bob/Task-2 — 5110
(Click on the task's name to see its definition)

If you are the Task's Task Manager or you are the Team Manager of a Team that this Task is attached to THEN this Task will be deleted when you submit this form and notices will go to You and the Task's Performer, Manager, Parent, Predecessor, Successor, Immediate Sub-Task's as well as the Team Manager if this is a Team Task. No one else will receive more than one notice. — 5115

Otherwise your request for Task deletion will be sent to the Task's Task Manager for Approval and you will be notified of this routing and the Task Manager's response.
Add a comment for the Request or Notice:

5125

[ Submit ]   [ Cancel ] — 5130

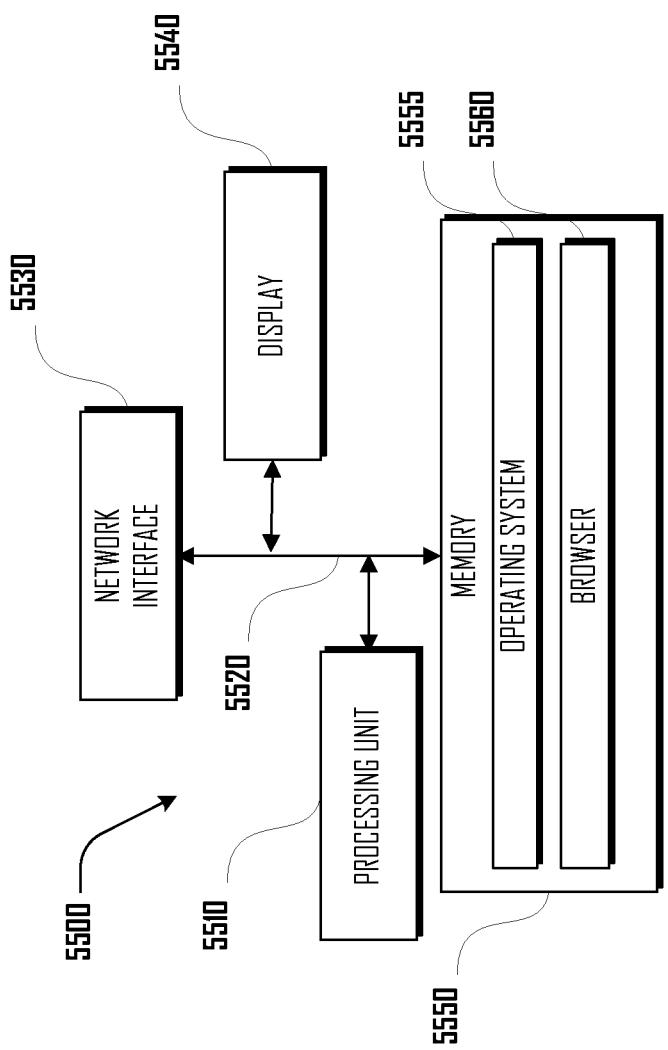

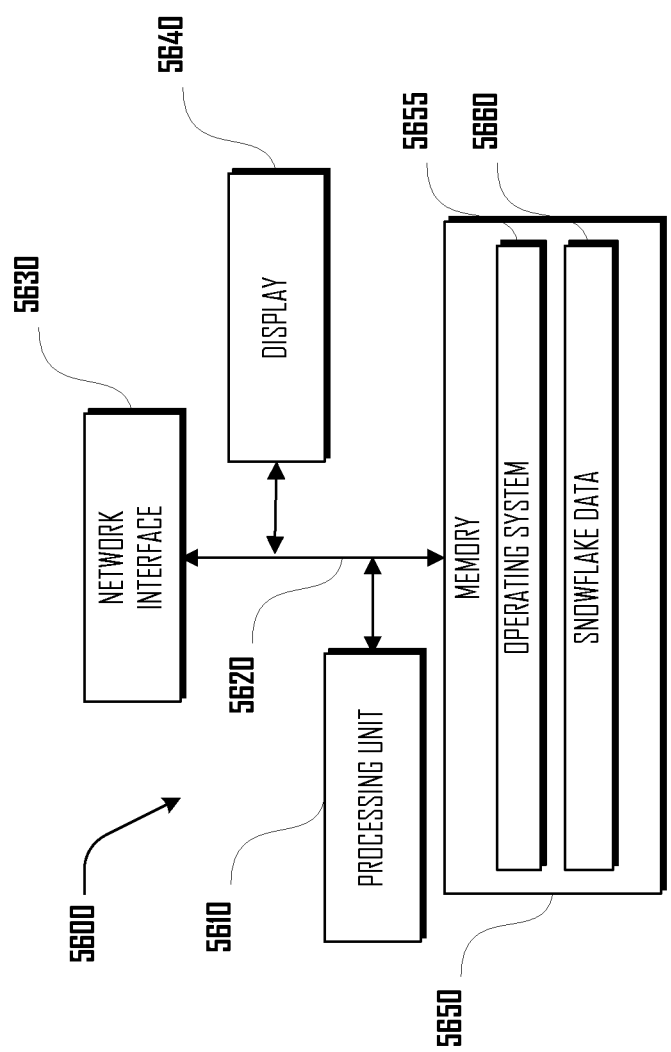

TASK BASED ORGANIZATIONAL MANAGEMENT SYSTEM AND METHOD

RELATED APPLICATIONS

This application is a non-provisional patent application claiming the benefit of U.S. Provisional Patent Application No. 60/743,860 entitled TASK BASED ORGANIZATIONAL MANAGEMENT SYSTEM AND METHOD with the named inventor Steven J. Johnson, filed on Mar. 28, 2006, which is hereby incorporated in its entirety by reference.

FIELD

The present invention relates to the field of organizational management and more specifically to a rule-based platform for implementing organizational activities.

BACKGROUND

Communication networks are well known in the computer communications field. By definition, a network is a group of computers and associated devices that are connected by communications facilities or links. Network communications can be of a permanent nature, such as via cables, or can be of a temporary nature, such as connections made through telephone or wireless links. Networks may vary in size, from a local area network ("LAN"), consisting of a few computers or workstations and related devices, to a wide area network ("WAN"), which interconnects computers and LANs that are geographically dispersed, to a remote access service, which interconnects remote computers via temporary communication links. An internetwork, in turn, is the joining of multiple computer networks, both similar and dissimilar, by means of gateways or routers that facilitate data transfer and conversion from various networks. A well-known abbreviation for the term internetwork is "internet." As currently understood, the capitalized term "Internet" refers to the collection of networks and routers that use the Internet Protocol ("IP"), along with higher-level protocols, such as the Transmission Control Protocol ("TCP") or the Uniform Datagram Packet ("UDP") protocol, to communicate with one another.

"Organizations" pursuing cost reductions and productivity increases continue to become more fluid and decentralized with multiple lines of authority and low head counts. The structure of these organizations is complex, changing and can include third parties as well as long-standing and ad-hoc teams, projects and processes.

The result of this trend is a lack of visibility, coordination and control that leads to reduced organizational performance, wasted time and money, lost revenue, burnout and turnover. This problem is recognized, existing, strong and growing.

Technical applications that address this problem available in the market, such as personal task lists, project management, Business performance management ("BPM") and collaboration tools, are only partial solutions to the market problem. Current applications are positioned at the edges and cannot provide overall visibility, coordination or control.

BRIEF DESCRIPTION OF THE DRAWINGS

FIG. 1 is an illustration of a Create a New Snowflake form, in accordance with one embodiment.

FIG. 5 is an illustration of Email Modification form, in accordance with one embodiment.

FIG. 6 is an illustration of a Modify First User Page form, in accordance with one embodiment.

FIG. 7 is an illustration of a Move First User Page form, in accordance with one embodiment.

FIG. 8 is an illustration of a Move Page Request form, in accordance with one embodiment.

FIG. 10 is an illustration of a Delete First User Page form, in accordance with one embodiment.

FIG. 12 is an illustration of a Create the Task form, in accordance with one embodiment.

FIG. 14 is an illustration of a New Task Schedule form, in accordance with one embodiment.

FIG. 15 is an illustration of a Create Task for Sub-Page form, in accordance with one embodiment.

FIG. 16 is an illustration of a Create Task for Team form, in accordance with one embodiment.

FIG. 17 is an illustration of a Create Task for Allocation form, in accordance with one embodiment.

FIG. 18 is an illustration of a Task Allocation Request form, in accordance with one embodiment.

FIG. 19 is an illustration of Create New Sub-Page form, in accordance with one embodiment.

FIG. 22 is an illustration of a Modify Sub-Page form, in accordance with one embodiment.

FIG. 23 is an illustration of a Move Sub-Page form, in accordance with one embodiment.

FIG. 24 is an illustration of a Delete Sub-Page confirmation form, in accordance with one embodiment.

FIG. 25 is an illustration of a Create a New Team form, in accordance with one embodiment.

FIG. 27 is an illustration of a Modify Team Members form, in accordance with one embodiment.

FIG. 28 is an illustration of a Team Membership Invitation form, in accordance with one embodiment.

FIG. 29 is an illustration of a Modify Team form, in accordance with one embodiment.

FIG. 30 is an illustration of an Allocate Team form, in accordance with one embodiment.

FIG. 31 is an illustration of a Team Management Invitation form, in accordance with one embodiment.

FIG. 32 is an illustration of Delete Team confirmation form, in accordance with one embodiment.

FIG. 33 is an illustration of a Task Definition form, in accordance with one embodiment.

FIG. 37 is an illustration of a Task Schedule form, in accordance with one embodiment.

FIG. 38 is an illustration of a Change Task Manager form, in accordance with one embodiment.

FIG. 39 is an illustration of a Task Manager Change Request form, in accordance with one embodiment.

FIG. 42 is an illustration of a Task Performer Change Request form, in accordance with one embodiment.

FIG. 43 is an illustration of a Change Task Performer Request form, in accordance with one embodiment.

Figure 44:
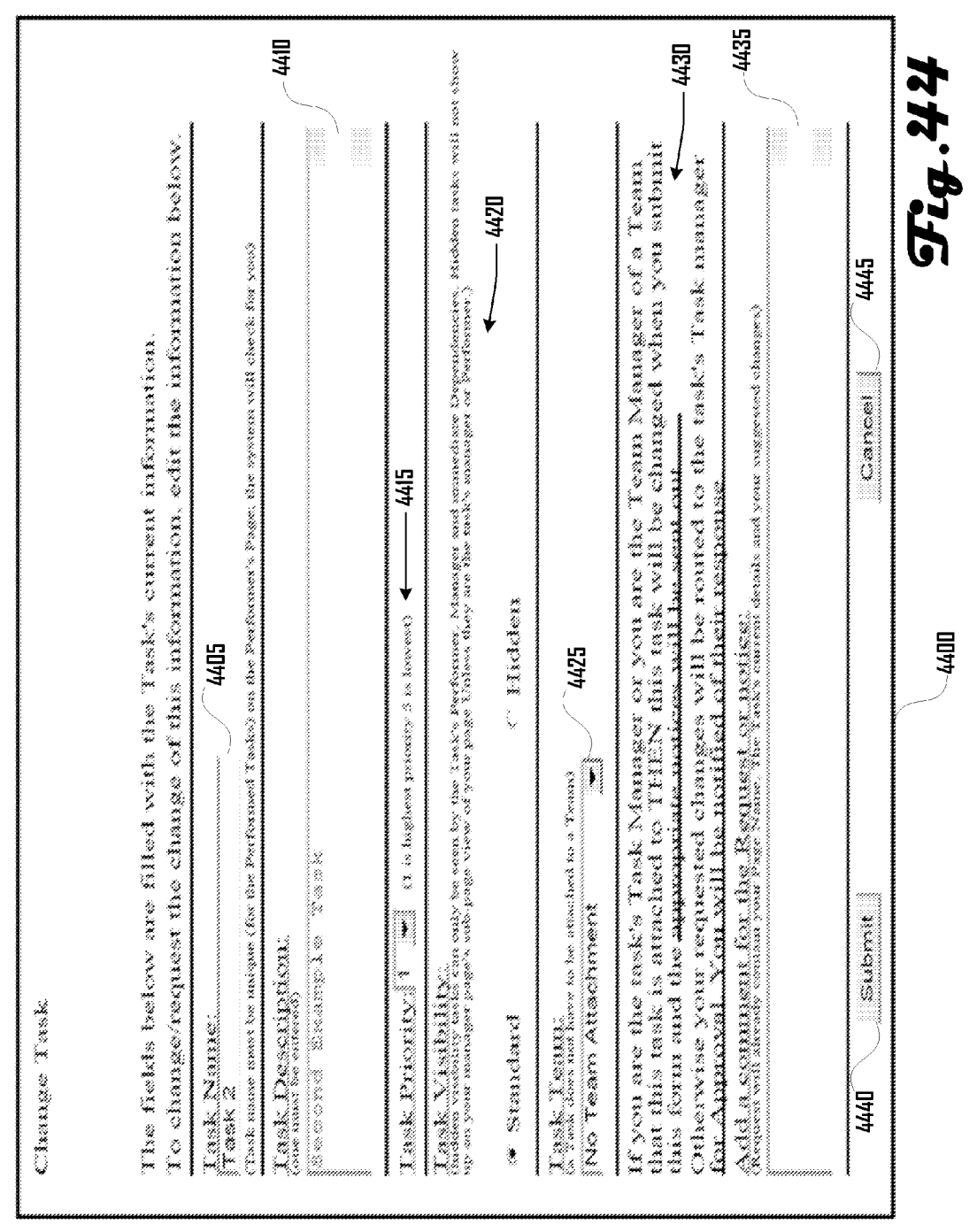

FIG. 44 is an illustration of a Change Task form, in accordance with one embodiment.

FIG. 45 is an illustration of a Change Task Description Request form, in accordance with one embodiment.

FIG. 46 is an illustration of a Change Task Dependencies form, in accordance with one embodiment.

FIG. 47 is an illustration of a Change Task Schedule form, in accordance with one embodiment.

FIG. 48 is an illustration of a Change Task Dependencies Request form, in accordance with one embodiment.

FIG. 50 is an illustration of a Change Task Schedule Request form, in accordance with one embodiment.

FIG. 51 is an illustration of Delete Task Confirmation form, in accordance with one embodiment.

FIG. 55 is a diagram of an exemplary user device, in accordance with one embodiment.

FIG. 56 is a diagram of an exemplary server, in accordance with one embodiment.

DETAILED DESCRIPTION

Figure 2:
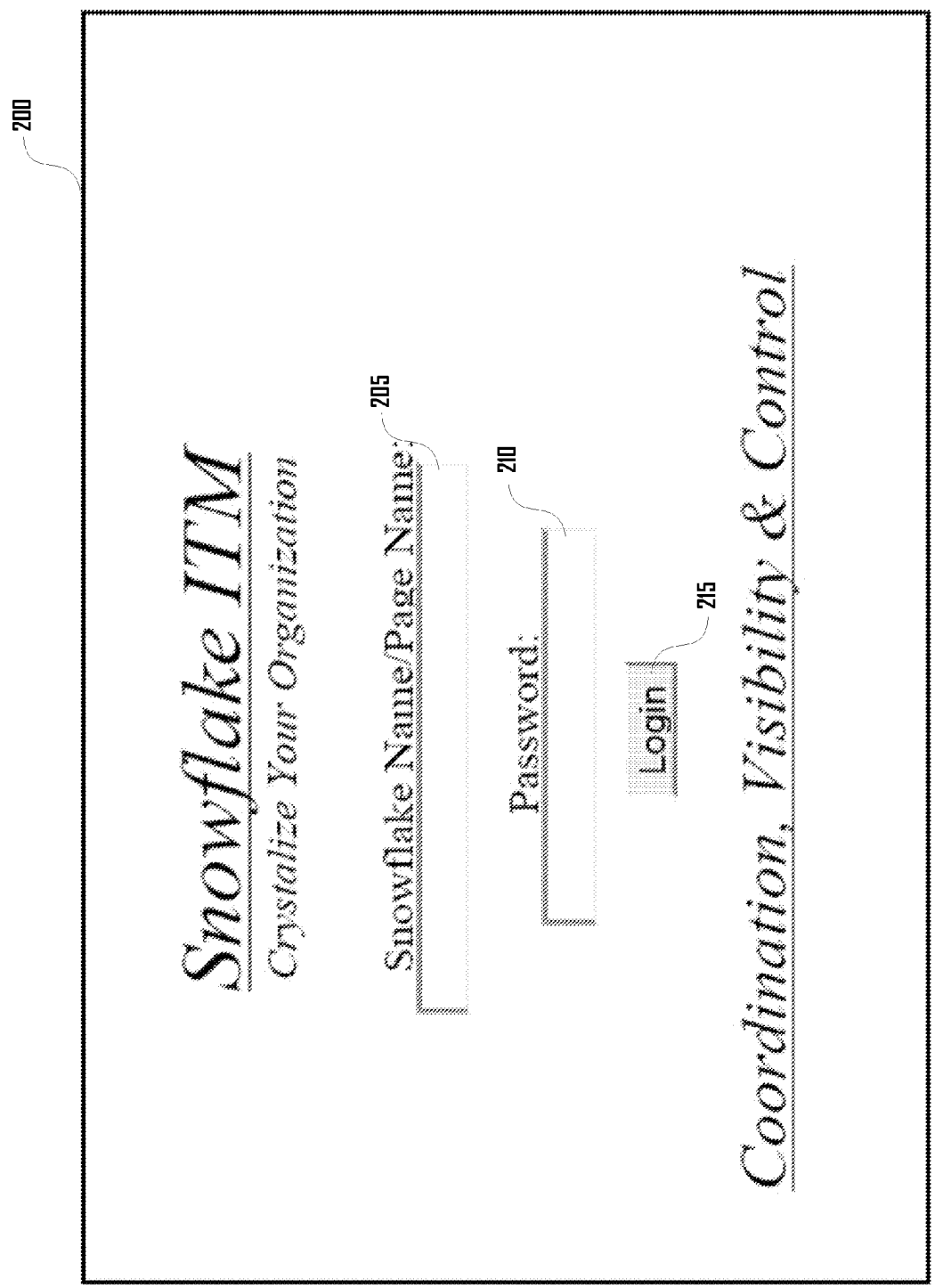
FIG. 2 is an illustration of a Log-on form, in accordance with one embodiment.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file Servers, computer Servers and memory storage devices. Each of these conventional distributed computing components is accessible by the processor via a communication network.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. Those of ordinary skill in the art will appreciate that other embodiments, including additional devices, or combinations of illustrated devices, may be added to, or combined, without limiting the scope to the embodiments disclosed herein.

Exemplary embodiments can expand outwardly while many current applications are not constructed in a way that will allow them to fill in the center of various exemplary embodiments' positioning (the gap) unless they completely restructure their offerings. Some advantages stem from exemplary embodiment's foundation Framework, Methodology and Implementation Architecture.

Because various exemplary embodiments deal with user functionality common to many, if not all, types of operations they are not limited to any particular vertical. While various exemplary embodiments can certainly be customized for particular verticals they are not limited to them.

Embodiments can pull organizations back together and enable new levels of efficiency and productivity.

An embodiment of an exemplary implementation is an on-demand rules-based Organizational Management Solution and functionality integration Platform. For the purpose of this document an exemplary embodiment will be referred to as the Snowflake Platform or the "SP." The SP provides Integrated Task Management (coordination, visibility and control) for individuals, organizations and multiple organization partnerships and alliances. It manages organizations, at various levels, as they are actually structured and operate. Additionally, the SP is designed to become a hub of on-demand functionality integration. The SP is an intelligent system that, without the need of an analyst, administrator or system integrator, creates flexible virtual representations of user organizations that actively manage the layers of relationships between people and between their tasks (including third parties). Its design and rules automatically guide proper management process flow and provide security while enabling coordination, visibility and seamless integration internally and with outside organizations. The SP and the Integrated Task Management ("ITM") environment that rides upon it improve a rules-based organization's ability to articulate task assignments, coordinate timing of their performance and monitor status while maintaining appropriate managerial authorities in today's complex, constantly changing and multi-party "organizations".

A snowflake, in accordance with one embodiment, is the data used by the SP to embody an organization, its member, rules and activities.

As a Snowflake forms it automatically maps the organization's hierarchy, establishing authorities and visibility. Teams can also be created that consist of members from any number of Snowflakes with each Team having its own authority hierarchy and visibility that are automatically integrated into those of their member's Snowflakes. Tasks and processes then ride on this structural foundation. Tasks also have an authority structure that is integrated into the system and the embodiment's scheduling engine oversees the coordination of task performance.

The SP manages this overall authority, visibility and coordination structure for the users. The result is an intuitive implementation and user experience. The SP enables flexibility while maintaining proper controls and automatically providing appropriate notifications.

The SP benefits both individuals and organizations. It helps manage each user's activities and provides them with a concise custom real-time window into their organization. It acts as their agent by automatically performing time consuming functions, watching their back and allowing them to know "what's going on" at all times. The SP changes an organization (including 3rd parties) from an unconnected group of people and tasks to a real-time integrated and optimized whole, ensuring maximum resource utilization and optimum performance of the "machine". It acts as a force multiplier and eliminates the huge and costly "gray areas" of uncertainty that exist in organizations.

An initial exemplary embodiment of the SP may comprise the SP platform and what can be called ITM functionality. An array of additional functionality has been designed and, depending on user and market feedback, will be added through a combination of internal development and the integration of third party "partner" functionality.

Figure 53:
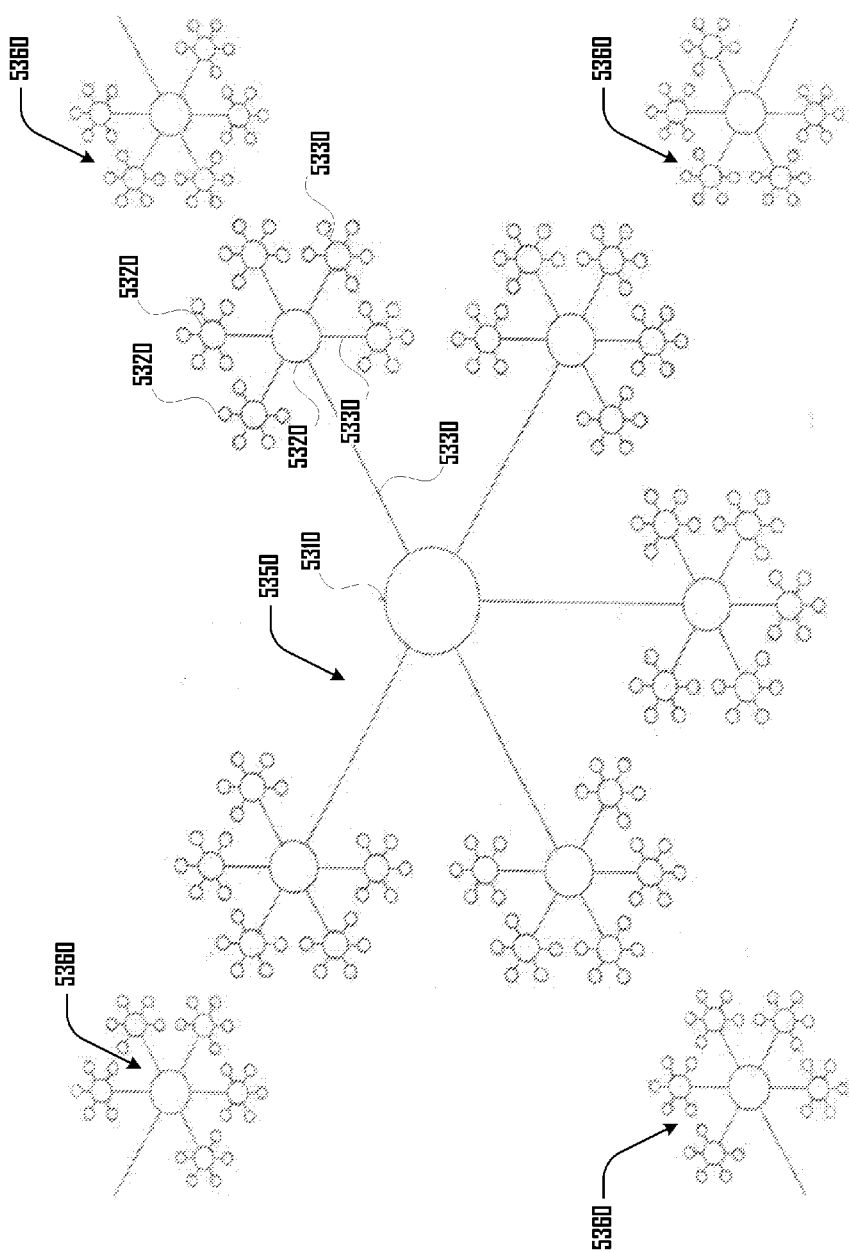
FIG. 53 is an illustration of a snowflake structure, in accordance with one embodiment.

Overview:

FIG. 53 shows parts of five Snowflakes 5350, 5360. One Snowflake 5350 in the center is surrounded by four partial Snowflakes 5360. The Snowflakes 5350, 5360 in FIG. 53 are made up of Circles 5320 and Lines 5330. The circles 5320 represent what can be called the "User Pages" of Task Performers/Managers (i.e. individuals, groups, machines, etc) and the lines 5330 represent (hierarchical) relationships between the Circles/User Pages. A Snowflake 5360, 5360 can combine any combination of Task Performer types. For the purpose of discussion, suppose that the circles 5320 shown in FIG. 53 represent individual people that work for an organization. A Snowflake can consist of any number of User Pages.

Generally, the Snowflake system is contained within:
Snowflake Platform;
Which houses the Snowflake Universe
Comprising a Data structure 5660 containing a number of Snowflakes
Snowflakes generally
Must have a Unique Name within the Snowflake Universe
Can contain one to any number of User Pages
Can only have one page that has no manager
A Snowflake/Company Name cannot have a "/" (or other designated delimiter)
Department/division is an optional structure within a Snowflake
A department/division must have a Name
A department/division must be attached to a Snowflake
A department/division's Name must be unique within a company/Snowflake
User Page In one embodiment a User Page has attributes such as: ID#, Company ID, Department ID, Visibility, Manager ID, Name, Creation Date & Time, Email, and Password. Other embodiments may have more or less attribute for user pages.

A "User Page" is a building block of a Snowflake. As described below a User Page is a customized integrated real-time web site (or other linked document) that is automatically built/updated for each User/Task Performer in real time. Every User Page's Name is unique within its Snowflake and every Snowflake Name is Unique within the—data structure(s) that contains the Snowflakes (this data structure(s) can be referred to as the Snowflake Universe). Therefore every User Page is uniquely Identified by its Snowflake Address (Snowflake Name/User Page Name). All but one User Page in a Snowflake has what can be called a Manager Page (the page above it in the hierarchy). These Manager Page 5305 to User Page 5310 (Sub-Page/Direct Report) relationships are shown by the Lines 5315 in FIG. 53. The "Top" page 5305 in the organizational hierarchy can be called a First User Page 5305 and because it does not have a Manager Page it has some unique functionality described below. For Non-First User Pages 5310, certain functionality is routed through their Manager Page for approval etc.

User Pages also belong to Departments/Divisions and Groups within their Snowflake. Other Relationships between User Pages that are not shown in FIG. 53 include Team Management/Membership and Processes. These relationships are not confined within any particular Snowflake or Snowflakes.

Tasks are "Performed" and/or "Managed" by User Pages. Every Task Performed by a User Page must have a unique name (on that User Page). This enables every task in the Snowflake Universe to be uniquely identified by the combination of its Performers Snowflake Name/Performers Page Name/Task Name.

As described below, Tasks can be connected to other Tasks by various dependency relationships including Parent Tasks, Sub-Tasks, Predecessor Tasks and Successor Tasks. The SP system uses these dependency relationships to coordinate the performance of tasks within the Snowflake Universe. As described below, a Task's dependencies combine to create a window of time ("Window") that the Task is to be performed within. The system calculates and enforces this Window when the task is created and throughout the "life" of the Task. A Task's Window may change throughout its life due to the addition, removal or rescheduling of its dependencies, the modification of overlap allowances or the early or late completion of its dependencies. A Task's dependencies may be "from" any Snowflake.

"Soft" Task Schedules as described below are designed to change based on the status of the Task's Predecessor(s). A Tasks start time is Soft if it is defined to be equal to the actual finish time of its predecessor(s) and a Tasks finish time is Soft if its start time is Soft and its finish time is scheduled as a duration of time after the start time.

Tasks can have a visibility of either Standard or hidden. A Hidden visibility Task can only be seen by its Manager, Performer and some Dependencies (Possibly including: immediate Predecessor(s), immediate Successor(s), Parent(s) and immediate sub-task(s)).

Teams may have one Manager Page and can have any number of Member Pages from any number of Snowflakes. Each Snowflake Team is uniquely identified by the combination of its Manager's Snowflake Name and its Team Name (Team Managers Snowflake Name/Team Name). Every Team Managed by a member of a particular Snowflake must have a different Name than any other Team Managed by a member of that same Snowflake.

A Team Rule regarding Tasks is that the Task Performer and Task Manager of a Task Attached to a Team Must be the Manager or Members of the team the Task is attached to.

Teams are given a visibility, either Hidden or Standard. A Hidden Visibility Team can only be seen by its Manager and Members. Hidden visibility Teams may also be deleted when/ if their Team Manager's Page is Deleted.

The SP's security includes the appropriate Visibility of elements and its ability to recognize the Viewer/User and dynamically create and enforce "Drill Over" walls that will not allow Penetration Past certain points (i.e. into other Snowflake's beyond "immediate" Dependencies)

Figure 54:
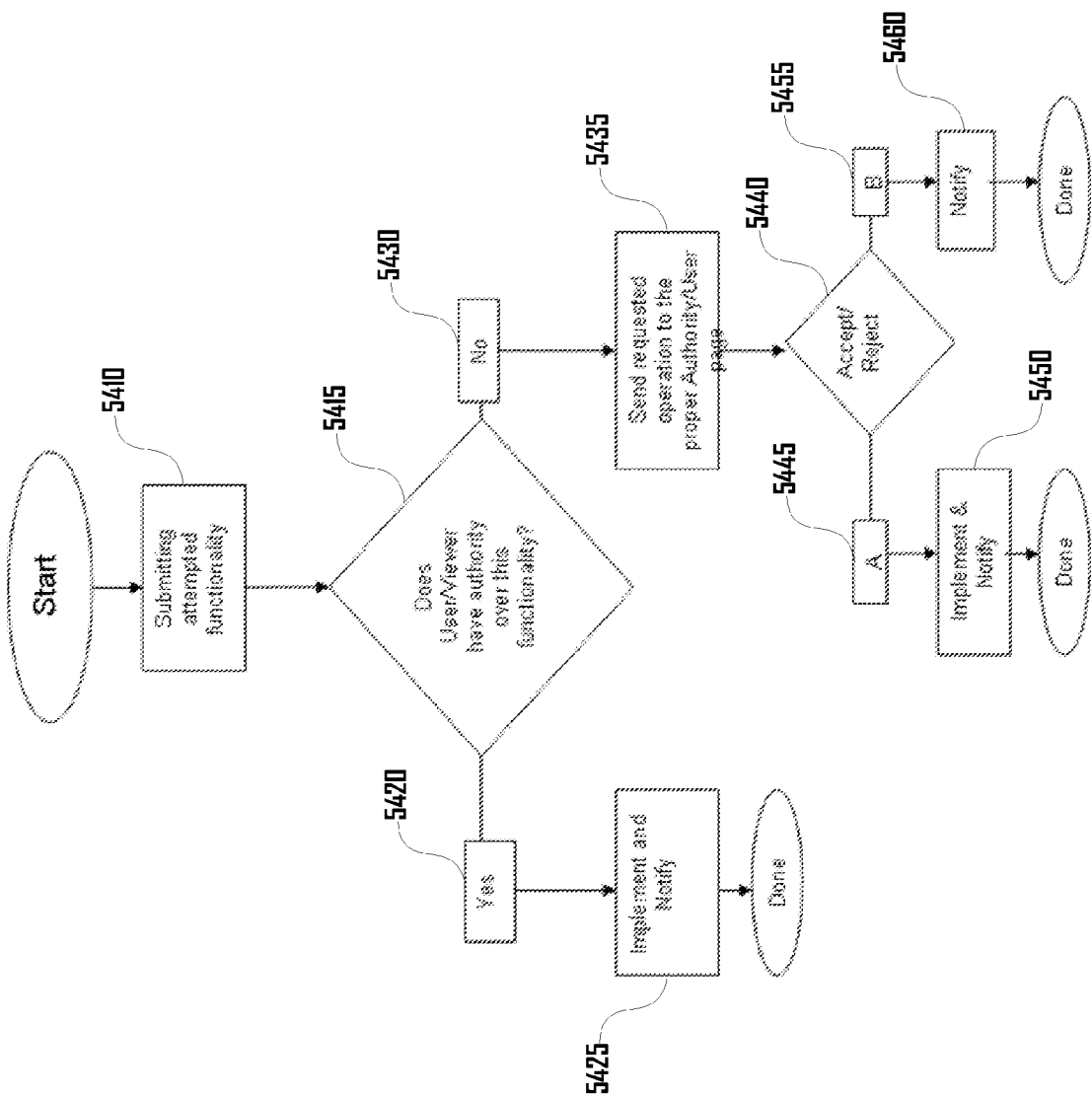
FIG. 54 is a flowchart illustrating a Requested Operation sequence.

The SP automatically implements an authority hierarchy that determines the flow of the system's processes. As described in detail below, Manager Pages have certain authority over their Sub-Pages, Task Managers have certain authority over the Tasks they Manage and Team Managers have certain authority over their Teams. Because the SP has rules defining the specific authority required for Changes, Allocations, Moves and Invitations etc and recognizes the Viewer/User and what they are attempting to do, control within the organization is maintained. When the system determines/recognizes that the User does not have authority to directly implement a particular functionality that they are attempting, the system automatically routes a request to the User Page that has the appropriate authority. The request can then either be Rejected or Accepted by the appropriate authority. Accepted requests are then implemented. These Requests are referred to as Requested Operations. (FIG. 54 shows a generic example Requested Operation flow.)

A user first submits an attempted function. 5410. After the submission, the SP determines whether the user has authority to complete the attempted function 5415. If the SP determines that the user does have authority 5420, the SP will complete the function and will notify the appropriate users via email 5425. If the SP determines that the user does not have the authority to complete the attempted function 5430, the SP will send the requested operation to a User Page that has authority to complete the function 5435. The user with authority may then accept or reject the attempted function 5440. If the authorized user accepts the function 5445, the SP completes the function and notifies the appropriate users 5450. If the user with authority rejects the attempted function 5455, the SP will merely notify the requestor 5460. Requested Operations can be sent via any appropriate technology and are managed by the system including their removal when completed, what happens when they are ignored, what happens when a Request is Made Multiple times and what happens when Authority changes while a Request is "out" (management includes notifications).

Software "agents" will run on the servers checking for and making required modifications, notifications and system maintenance, etc. for system elements including the Scheduling engine and Requested operations.

The SP elements including Snowflakes, User Pages, Tasks and Teams can all be Created, Viewed, Modified, Moved and Deleted.

FIG. 55 illustrates several components of an exemplary user device 5500. In some embodiments, the user device 5500 may include many more components than those shown in FIG. 55. However, it is not necessary that all of these generally conventional components be shown in order to disclose an illustrative embodiment. As shown in FIG. 55, the user device 5500 includes a network interface 5530 for connecting to the network 150. Those of ordinary skill in the art will appreciate that the network interface 5530 includes the necessary circuitry for such a connection and is constructed for use with the appropriate protocol.

The user device 5500 also includes a processing unit 5510, a memory 5550 and may include an optional display 5540, all interconnected along with the network interface 5530 via a bus 5520. The memory 5550 generally comprises a random access memory ("RAM"), a read only memory ("ROM"), and a permanent mass storage device, such as a disk drive. The memory 5550 stores program code for browser 5560 and an operating system 5555. It will be appreciated that these software components may be loaded from a computer readable medium into memory 5550 of the user device 5500 using a drive mechanism (not shown) associated with a computer readable medium, such as a floppy disc, tape, DVD/CD-ROM drive, memory card, via the network interface 5530 or the like.

Although an exemplary user device 5500 has been described that generally conforms to conventional general purpose computing devices, those of ordinary skill in the art will appreciate that a user device 5500 may be any of a great number of devices capable of communicating with a server 5600.

FIG. 56 illustrates several components of an exemplary server 5600. In some embodiments, the server 5600 may include many more components than those shown in FIG. 56. However, it is not necessary that all of these generally conventional components be shown in order to disclose an illustrative embodiment. As shown in FIG. 56, the server 5600 includes a network interface 5630 for connecting to the network 150. Those of ordinary skill in the art will appreciate that the network interface 5630 includes the necessary circuitry for such a connection and is constructed for use with the appropriate protocol.

The server 5600 also includes a processing unit 5610, a memory 5650 and may include an optional display 5640, all interconnected along with the network interface 5630 via a bus 5620. The memory 5650 generally comprises a random access memory ("RAM"), a read only memory ("ROM"), and a permanent mass storage device, such as a disk drive. The memory 5650 stores program code for the snowflake platform 5660 and an operating system 5655. It will be appreciated that these software components may be loaded from a computer readable medium into memory 5650 of the server 5600 using a drive mechanism (not shown) associated with a computer readable medium, such as a floppy disc, tape, DVD/CD-ROM drive, memory card, via the network interface 5630 or the like.

Although an exemplary server 5600 has been described that generally conforms to conventional general purpose computing devices, those of ordinary skill in the art will appreciate that a server 5600 may be any of a great number of devices capable of communicating with a user device 5500.

Figure 1:
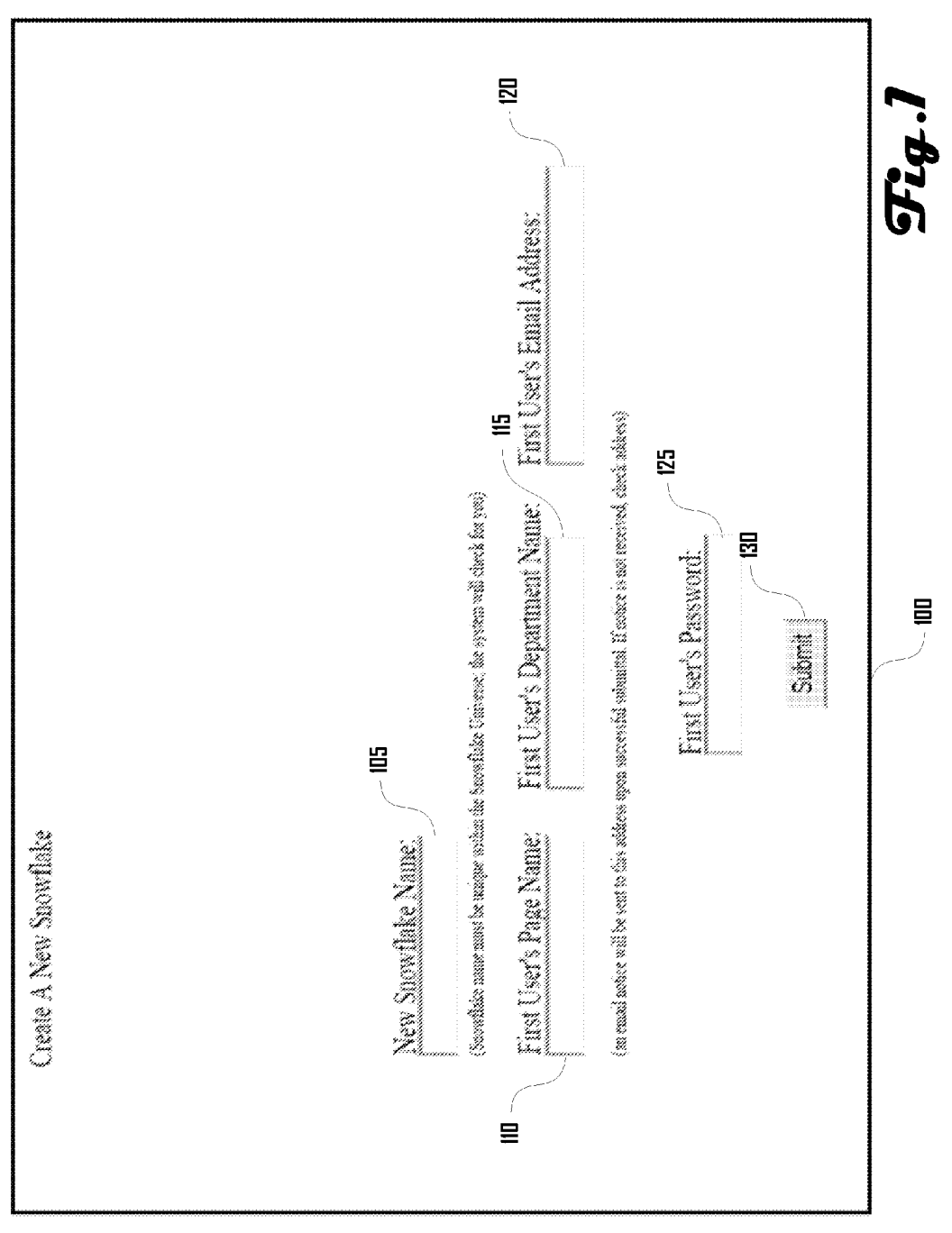
Figure 52:
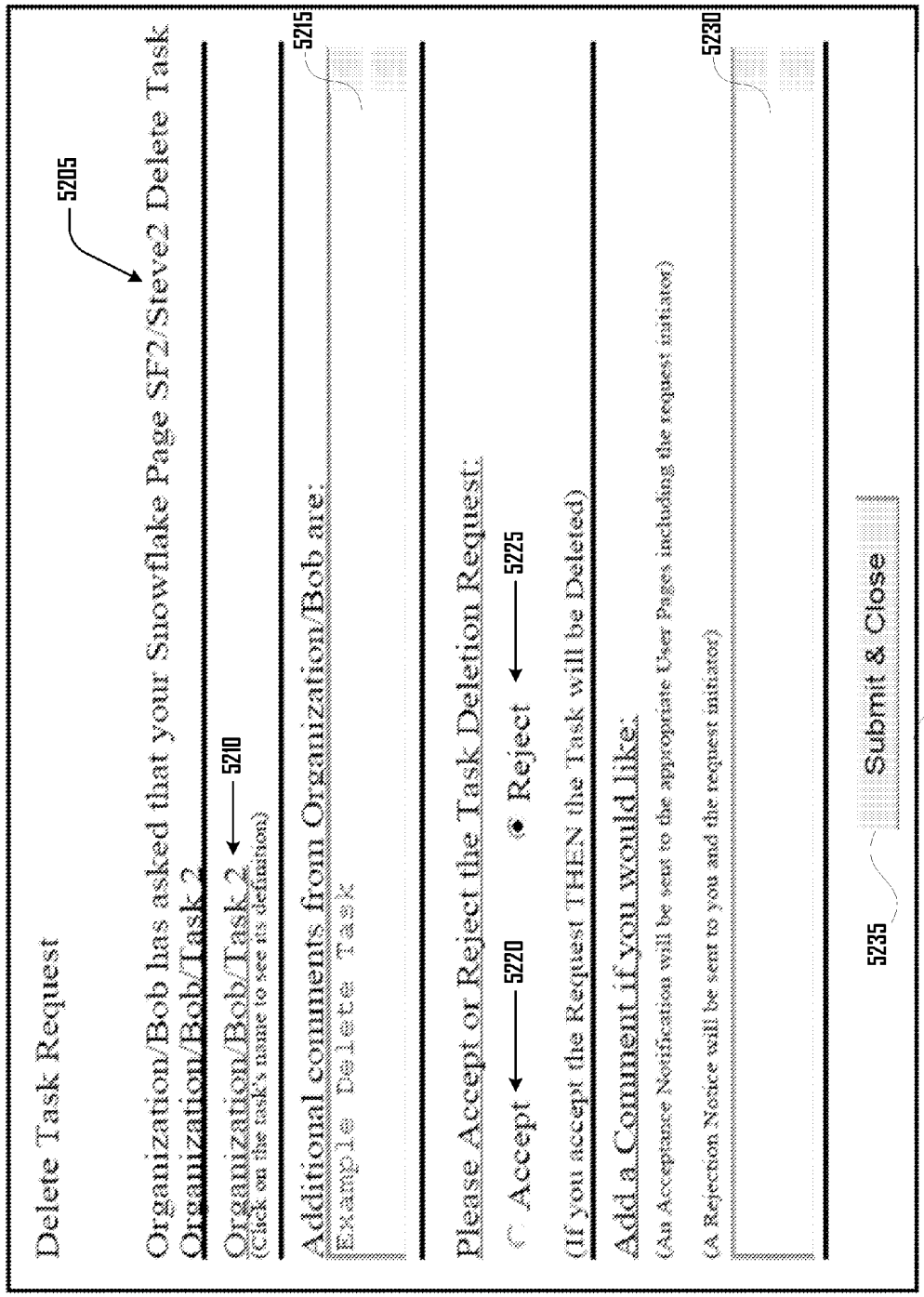
FIG. 52 is an illustration of a Delete Task Request form, in accordance with one embodiment.

Functionality Details for an exemplary embodiment (as discussed above, currently referred to as the SP) may Include but are not limited to the following figures and descriptions. An exemplary walkthrough of the SP is illustrated in FIGS. 1-52.

FIG. 1: New Snowflake form 100. The inputs on the New Snowflake form 100 are:
   New Snowflake Name 105: User inputs the name they wish to call their Snowflake.
   First User's Page Name 110: User inputs the name they wish to call their Page within this Snowflake.
   First User's Department Name 115: User inputs the name of the Division within this Snowflake that their page belongs to.
   First User's Email Address 120: User inputs their email address.
   First User's Password 125: User enters their password
   Submit button 130
   Activating the submit button 130 causes the application to take a number of actions including: Checking that there is not already a Snowflake with the entered New Snowflake Name 105 in the data structure/Snowflake Universe and making sure that the required inputs have been populated. If there is a naming conflict or an empty required field then an appropriate error message is posted instructing the User of the problem(s). The User must then correct the problem(s) if they wish to continue. If no input errors are found then the application creates the new Snowflake, its First User Page and its first Department and redirects the browser 5560 to the new First User Page while sending an email notice to the input email address that contains, among other things, login information and a link to the Login Page.

FIG. 2 shows the Login form 200 that is used to log a user into/onto their Snowflake Page. The inputs on this form are:
   Snowflake Name/Page Name 205: As discussed above, every Snowflake's Name is unique within a Snowflake Universe. Also every Page Name is Unique within a particular Snowflake. This means that every User Page is uniquely identified by the combination of its Snowflake Name and its Page Name. In one embodiment, the SP separates these by a "/". Accordingly, no Names within the system can contain a "/". Thus entering Snowflake Name/Page Name 205 is part of the login process.

Password 210: Each user Page has a password associated with it. Entering the password that matches the one associated with the identified User Page is required for login.

Login 215: Activating the Login button causes the application to take a number of actions including: Checking that the Snowflake Name/Page Name 205 combination exists and that the entered Password is the one associated with the identified User Page. If there is an error an appropriate error message is posted instructing the User of the problem(s). The User must then correct the problem(s) if they wish to continue. If no input errors are found then the application redirects the browser 5560 to the User's User Page.

FIG. 3

The User Page 300 is the User's primary interface with the application. Among other things it identifies the Snowflake Name/Page Name 310 of the displayed page as well as the Department 315 the Page is a member of. Other major elements contained on the Page currently are:

Navigation Bar 320
Task List 330
Managed group 340
Member group 350
Teams Managed 360
Teams Member 370

Currently there are three primary variations of the User Page 300. They are the First User Page 300, the User Page 300 and the Sub-Page View of the User Page 300. The First User Page 300 of a Snowflake is the only Page in a Snowflake that does not have a Manager Page. (Within a Snowflake, Pages are arranged in an organizational hierarchy similar to an organizational chart. A Manager Page can be thought of as the Page immediately above another Page in the organizational hierarchy/chart.) Because the First User Page 300 has no manager page (it is on the top of the chart—only one per Snowflake) and as described below, it has some unique capabilities relative to the other Pages in a Snowflake.

The User Page 300 is the standard variation and the Sub-Page View is the view presented to a viewer/user as they drill down underneath their Page into the organization/Snowflake.

Navigation Bar: The Navigation bar includes the following major categories:

Password 322
Email Address 326
First User Page 321
Create A Task 323
Sub-Page(s) 324

Team 325: (The Sub-Page view of the User Page 300 may not contain a Navigation Bar 320.) Password 322

Figure 4:
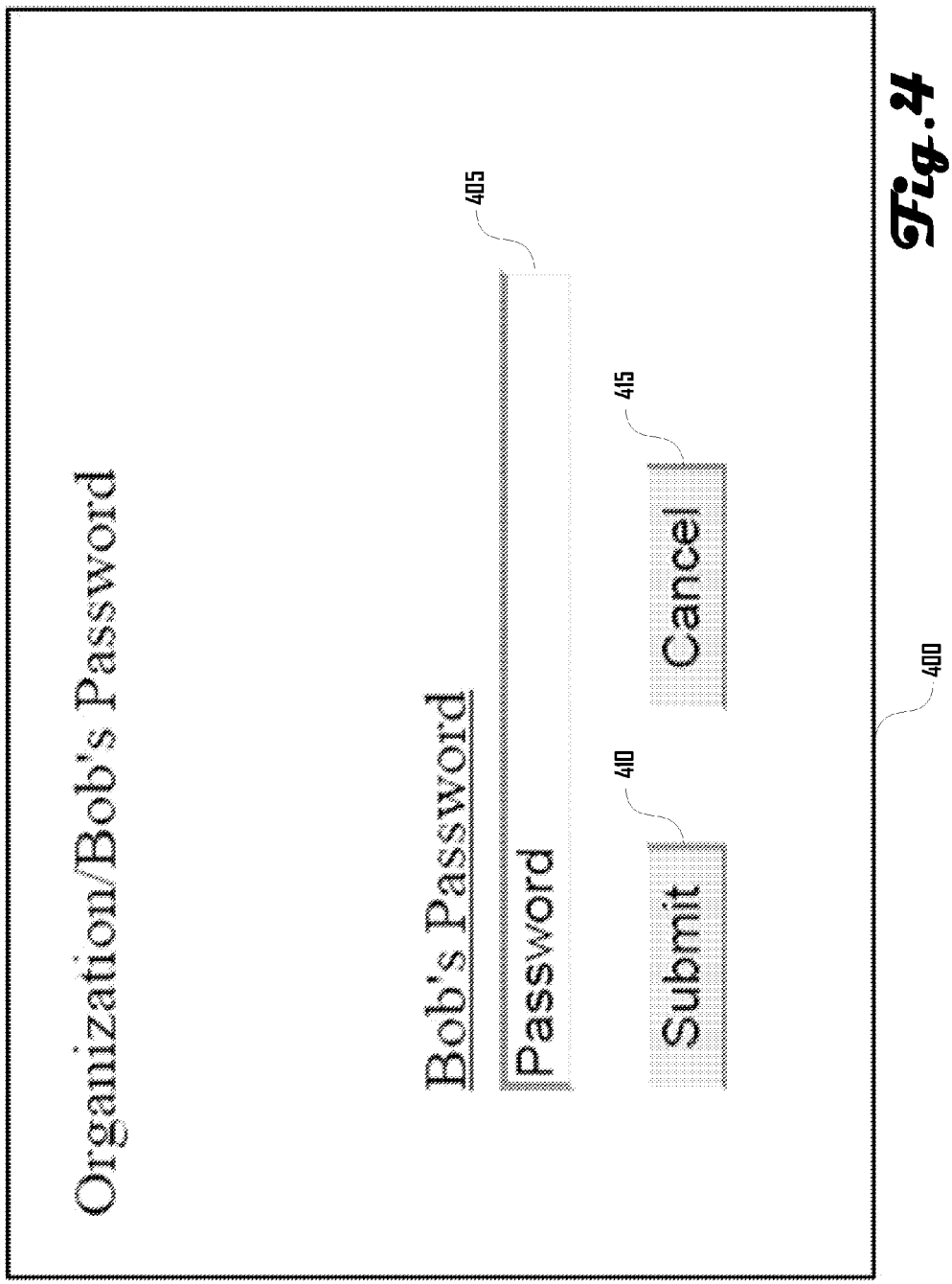
FIG. 4 is an illustration of a Password entry form, in accordance with one embodiment.

User Page 300s are Password protected. Selecting Password 322 from the navigation bar 320 takes the user to a form 400, illustrated in FIG. 4, where they can modify the Password 405 associated with their User Page 300 (FIG. 4). Selecting the Submit button 410 will modify the password and redirect the browser 5560 to the viewers User Page 300. Selecting the Cancel button 415 will just redirect the browser 5560 to the viewers User Page 300. Email Address 326

Selecting Email Address 326 from the navigation bar 320 takes the user to a form 500 where they can modify the email address 505 associated with their User Page 300 (FIG. 5). Selecting the Submit button 510 will modify the email address and redirect the browser 5560 to the viewers User Page 300. Selecting the Cancel button 515 will just redirect the browser 5560 to the viewers User Page 300. The SP works with the Snowflake Address of a User Page 300 (Snowflake Name/Page Name 205). Users do not need to know the email address of other users (system automatically manages user email address changes). This enables Users to change their email address (and even the mode of communication) at will without the need for them to notify other Snowflake Users of the change. Snowflake users can have a variety of options for making the change including entering a new address to selecting from a previously populated list. They will also have options for other modes of communication other than email. These may include such options as instant messaging, text messaging or some other appropriate form.

First User Page 321

As discussed above there is only one First User Page 300 per Snowflake. Only a First User Page 300 has this option on the Navigation Bar 320. This option presents the User with additional options (currently via a dropdown menu). These options are Modify, Move and Delete.

Modify (item in the First User Page 321 menu): (FIG. 6)

Selecting the Modify option from the First User Page 321 menu redirects the User to a Modify First User Page form 600 that enables the following modifications.

The inputs on the Modify First User Page form 600 are:

Change Snowflake Name 605: This enables the User to change the Name of the Snowflake. Only the First User has the authority to do this. If the Snowflake Name is changed in the form, the new name is checked upon submittal to make sure it is unique within the Snowflake Universe. If it is unique, the name is changed and if it is Not unique an error is posted instructing the user that the name is not available.

Change First User's Page Name 610: This enables the user to change the name of their Page. If the Page Name is changed in the form, the new name is checked upon submittal to make sure it is unique within the Snowflake. If it is unique, the name is changed and if it is Not unique an error is posted instructing the user that the name is not available.

Change First User Page 300's Department 640: This enables the user to change the Department their Page is attached to. Options in this part of the form are Current 615, New 620, and Existing 625. Current 615 keeps the current attachment. New 620 allows the User to Create a New Department within the Snowflake and attach itself to the New Department. Existing 625 enables the user to change their Pages Department attachment to a different Department that already exists within their Snowflake.

Selecting the Submit button 630 will make checks including those mentioned above. If there are problems, error messages are posted. If no problems, the changes are implemented, the browser 5560 is redirected to the viewer's User Page 300, notices are sent out and any unused department names are removed from the database. Selecting the Cancel button 635 will just redirect the browser 5560 to the viewers User Page 300. Move (item in the First User Page 321 menu): (FIG. 7)

Currently if the First User Page 300 has no Sub-Pages, selecting the Move option from the First User Page 321 menu redirects the User to a Move First User Page form 700 that enables the following. (FIG. 7)

The inputs on the Move First User Page form 700 are:

The Proposed New Manager Page's Address 705: User enters the Snowflake Address (Snowflake Name/Page Name 205) of the User Page 300 they wish to become their Manager Page. Upon Submittal the system checks to make sure that the entered Snowflake Address exists.

A comment for the Proposed New Manager Page 710: User enters a comment for the/their Page's proposed New Manager Page.

Selecting the Cancel button 720 will just redirect the browser 5560 to the viewer's User Page 300. Selecting the Submit button 715 will make checks including those mentioned above. If there are problems, error messages are posted. If no problems, a Requested Operation is launched and the browser 5560 is redirected to the viewer's User Page 300. This Requested Operation currently sends an email to the email address associated with the Snowflake Page that is being asked to take over Management responsibility for the Page. A link in the email takes the potential new Page Manager to a Move Page Request form 800 (FIG. 8). (The Potential New Page Manager must be logged into the SP to access the form.) Along with other information on the Move Page Request form 800, the inputs for the Viewer are:

- Accept 810: Selecting Accept on the form indicates that the proposed New Page Manager accepts the new Sub-Page.
- Reject 815: Selecting Reject on the form indicates that the proposed New Page Manager does Not accept the new Sub-Page.
- Department 850: This enables the New Manager Page to change the Department its new Sub-Page is attached to. Options in this part of the form are No Change 820, Change to same as Manager Page 825, New 830, and Existing 835. No Change 820 keeps the moved page attached to a department with the same name. (If the move was within the same Snowflake then it remains attached to the same Department. If the move is to a different Snowflake then this option attaches the moved page to the department in its new Snowflake with the same name and if no such department exists in the pages new snowflake then one is automatically created.) Change to same as Manager Page 825 attaches the moved page to the same department as its new Manager Page. New 830 allows the User to Create a New Department within its Snowflake and attach its new sub-page to the New Department. Existing 835 enables the user to change its new Sub-Page's Department attachment to a different Department that already exists within its Snowflake.
- Comment for Requestor 840: Enables the user to enter a comment that will be part of the notices generated upon submittal.

Selecting the Submit button 845 will make checks including those mentioned above. If there are problems, error messages are posted. If no problems, for an accepted request: the changes are implemented, the browser 5560 is closed, notices are sent out and any unused departments etc are removed from the database. For a rejected request, the browser 5560 is closed and notice is sent out.

An additional check that takes place when accept is selected and this form is submitted comes into play when the Page is being moved to a different Snowflake. Because every Page in a particular Snowflake Must have a unique name, upon such a submittal the system checks to make sure that the Page Name of the Moved Snowflake User Page 300 is Available in its new Snowflake. If the Name is not already used in the destination Snowflake then no additional step is required. If, however, the Name is not available an error is displayed upon the submittal this form and an additional section of the form is made visible. This section enables the User to enter a new Name for the Moved Page. This Name is also checked for availability and the process continues until an available name is entered or the request is rejected.

It can also be noted at this point that when a page(s) is Moved to another Snowflake, the Teams Managed by the Moved Page(s) will now be associated with the New Snowflake (the Team's Snowflake Name will change). This is Part of the Team Naming convention: A full Team Name is (Snowflake Name of Team Manager/Team Name). The Name of the Team must be unique within its Manager's Snowflake (i.e. Teams Managed by members of the Team Manager's Snowflake). Also, the Team Name cannot contain a "/". Team Name conflicts will also be dealt with.

Figure 9:
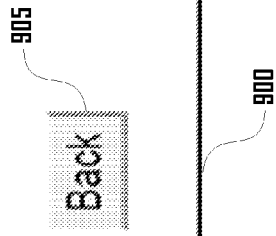
FIG. 9 is an illustration of Move First User Page error display, in accordance with one embodiment.

Currently If the First User Page 300 has Sub-Pages, selecting the Move option from the First User Page 321 menu redirects the User to a Move First User Page error display 900 that instructs them that and why the page can not currently be moved (FIG. 9). This restriction is due to the number of potential naming conflicts when merging two Snowflakes. A method of dealing with this situation may be implemented and is part of the Snowflake concept. Selecting the Back button 905 will just redirect the browser 5560 to the viewer's User Page 300. Delete (item in the First User Page 321 menu):

If the First User Page 300 has no Sub-Pages and is not the Manager of any Team(s) then Selecting the Delete option from the First User Page 321 menu redirects the User to a Delete First User Page form 1000 (FIG. 10) that allows the user to confirm their desire to delete the page and it also provides other information/instructions.

Selecting the Cancel button 1010 will just redirect the browser 5560 to the viewer's User Page 300. Selecting "Delete Page & Snowflake" 1015 on the form 1000 will Delete the Page and Snowflake from the Data base (including its Name and any departments etc associated with it). Notices go out and the Tasks on the Deleted First User's Page are automatically dealt with by the System as follows:

(Standard Visibility Tasks)

Task A1: IF the Deleted Page is Task Performer only THEN Task Manager becomes Performer & Manager Task A2: IF Deleted Page is Task Manager only THEN:
- IF the Task is attached to a Team THEN The Team Manager becomes the Task Manager (First User Page 300 can not currently be deleted if it is a Team manager)
- IF the Task is NOT attached to a Team THEN Task Performer becomes Performer & Manager Task A3: IF Deleted Page is Task Manager AND Task Performer THEN:
- IF the Task is attached to a Team THEN The Team Manager becomes the Task Manager & Task Performer (First User Page 300 cannot currently be deleted if it is a Team manager)
- IF the Task is NOT attached to a Team THEN Task is Deleted (Hidden Visibility Tasks)

Figure 11:
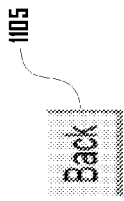
FIG. 11 is an illustration of a Delete First User Page error display, in accordance with one embodiment.

Task B1: IF the Deleted Page is Task Performer only THEN Task Manager becomes Performer & Manager Task B2: IF the Deleted Page is Task Manager only THEN:
- IF the Task is attached to a HIDDEN Team THEN The Team Manager becomes the Task Manager (First User Page 300 can not be deleted if it is a Team manager)
- IF the Task is NOT attached to a HIDDEN Team THEN Task Performer becomes Performer & Manager Task B3: IF Deleted Page is Task Manager AND Task Performer THEN:
- IF the Task is attached to a HIDDEN Team THEN The Team Manager becomes the Task Manager & Task Performer (First User Page 300 can not be deleted if it is a Team manager)
- IF the Task is NOT attached to a HIDDEN Team THEN Task is Deleted Currently, if the First User Page 300 has Sub-Page(s) and/or is the Manager of any Team, then Selecting the Delete option from the First User Page 321 menu redirects the User to a Delete First User Page error display 1100 (FIG. 11) that informs the user that they can not currently delete the Page and explains how they can. Selecting the Back button 1105 on this form redirects the browser 5560 to the viewer's User Page 300. A method of dealing with this restriction may be implemented and is part of the SP concept. Create A Task 323 This option allows the user to create New Tasks and presents the User with additional options (currently via a dropdown menu). These options include My Page, My Sub-Page(s), My Team and Allocation. The User is only given options that are appropriate to them (i.e. if they have no Sub-Pages they are not given this option)

My Page: Selecting this option from the Create A Task 323 menu begins the process of a User creating a task for their Page. Currently this process is contained on three forms. Create the Task form 1200 (FIG. 12):

Name 1205: This input allows the User to Name the Task they are creating. Rules affecting this input are that the Name can Not contain a "/" and that the page the task is being created for can not already be the Task Performer of a Task with the Same Name.

Description 1210: This input is used to describe the task. Users will also be able to attach Documents etc Priority 1215: Tasks are associated with a Priority.

Visibility 1265: Tasks are given a visibility, either Hidden 1225 or Standard 1220. A Hidden Visibility Task can only be seen by its Manager, Performer or Dependencies (Possibly including: Predecessor(s), Successor(s), Parent(s) and sub-task(s))

Team 1230: This allows the User to attach the new Task to a Team. This option is loaded with the Teams that the Task creator and the task recipient(s) have in common. (In the case described below where the User is creating a Task for "My Team", this option is loaded only with the Team the user is creating the task for.) The Task Manager and Performer of a Task that is Attached to a Team must be the Team Manager or Members of the Team the Task is attached to.

Responsibility 1235: This allows the user to attach the new task to a responsibility that is attached to the Task Recipient's User Page 300 Objective 1240: This allows the user to attach the new task to an objective that is attached to the Task Recipient's User Page 300

Parent 1245: This allows the user to attach the new task to a Parent Task. The New Task will be a Sub-Task of the Identified Parent Task.

The Create the Task form 1200 allows the User to Skip the Predecessor and Successor form 1300 (FIG. 13) by checking the appropriate box 1250.

Selecting the Continue button 1255 will make checks including those associated with the rules mentioned above. If there are problems, error messages are posted. If no problems, the browser 5560 is redirected to the next form (Predecessor and Successor form 1300 or New Task's Schedule form 1400, if the user checked the Skip the Predecessor and Successor box 1250). Selecting the Cancel button 1260 will just redirect the browser 5560 to the viewers User Page 300. (FIG. 13) New Task Predecessor and Successor Form 1300.

Predecessor(s) (w/ or w/o overlap): The User is able to Select Predecessor(s) 1310, 1315, 1320, 1325, 1330 with this form 1300 or identify that there are no Predecessor(s) 1305 for the New Task. The User can also Identify if the new Task will be allowed to overlap its predecessor(s) 1335. The User can also input a comment for the Predecessor(s) 1340.

Successor(s) (w/ or w/o overlap): The User is able to Select Successor(s) 1350, 1355, 1360, 1365 with this form 1300 or identify that there are no Successor(s) 1345 for the New Task. The User can also Identify if the new Task will be allowed to overlap its Successor(s) 1375. The User can also input a comment for the Successor(s) 1380.

A Task's Parent, Predecessor(s) and Successor(s) combine to form a window of time that the Task must be performed within. (This window calculation is described below) A window of time must exist for the performance of this Task or an error message will be posted.

Figure 14:
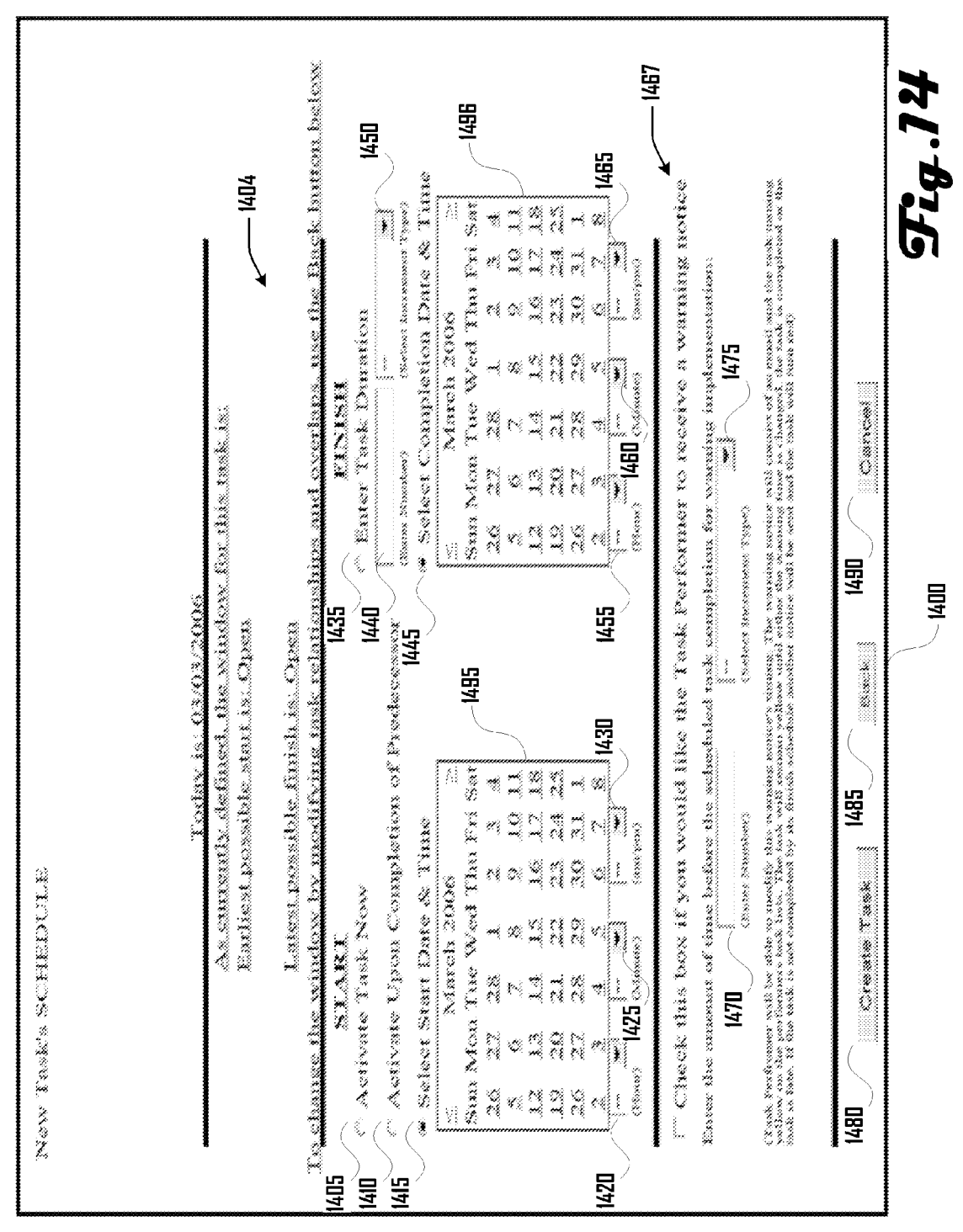

Selecting the Continue button 1385 will make checks including those associated with the rules mentioned above. If there are problems, error messages are posted. If no problems, the browser 5560 is redirected to the next form (FIG. 14). Selecting the Back button 1390 will redirect the browser 5560 back to the previous form (FIG. 12). Selecting the Cancel button 1395 will just redirect the browser 5560 to the viewers User Page 300. (FIG. 14) New Task's Schedule form 1400.

Task Window 1404: The Task window Identified in this form is determined by the New Task's Dependencies (Parent, Predecessor(s) and Successor(s)) and their allowed overlaps. A New Task must be scheduled between the Start and Finish time of its Parent task. If a New Task has Predecessor(s) and overlap is not allowed then the New Task cannot be scheduled to start until the Predecessor's finish time. If overlap is allowed then the New Task is Not allowed to be scheduled to finish until after the predecessor's finish time. If a New Task has Successor(s) and overlap is not allowed then the New Task must be scheduled to finish before (or equal) the Successor's start time. If overlap is allowed then the New Task must be scheduled to finish before the Successor's finish time. If there is no restriction "open" is shown. The Task Window is determined by combining these rules and a Task must be scheduled within its window.

Start Time (now 1405, upon completion of predecessor 1410, date & time 1415): There are three input options for the New Task's Start time. 1) Now 1405: This will use the time that the Submit button on this form is selected. 2) Upon Completion of Predecessor 1410: This option can only be used if the New Task has a Predecessor and Predecessor Overlap is not allowed. The Predecessor's scheduled finish time is used as the New Task's Start Time. 3) Select Start Date & Time 1415: The user inputs the Date 1495 and Time 1420, 1425, 1430 they wish the New Task to be scheduled to start.

Finish Time (duration 1435, 1440, 1450, date & time 1445, 1455, 1460, 1465): There are two input options for the New Task's Finish time. 1) Duration 1435: This enables the User to identify a period of time after the New Task is scheduled to Start that they want it to be scheduled to finish. 2) Select Completion Date & Time 1445: The user inputs the Date 1496 and Time 1455, 1460, 1465 they wish the New Task to be scheduled to Finish. Identified Start and finish times must be within the Task Window. Finish Time must be after Start Time.

Warning Notice 1467: These inputs allow the Task Creator to set a warning time 1470, 1475 for the New Task as described in FIG. 14 (e.g., Task Performer will be able to modify this warning notice's timing. The warning notice will consist of an email and the task turning yellow on the performer's task lists. The task will remain yellow until either the warning time is changed, the task is completed or the task is late. If the task is not completed by its finish schedule another notice will be sent and the task will turn red). (Notice can be sent by other than email (i.e. instant message, etc.).)

Selecting the Create Task button 1480 will make checks including those associated with the rules mentioned above. If there are problems, error messages are posted. If no problems, the Task is Created, appropriate notices go out and browser 5560 is redirected to the Task Creator's User Page 300.

Figure 13:
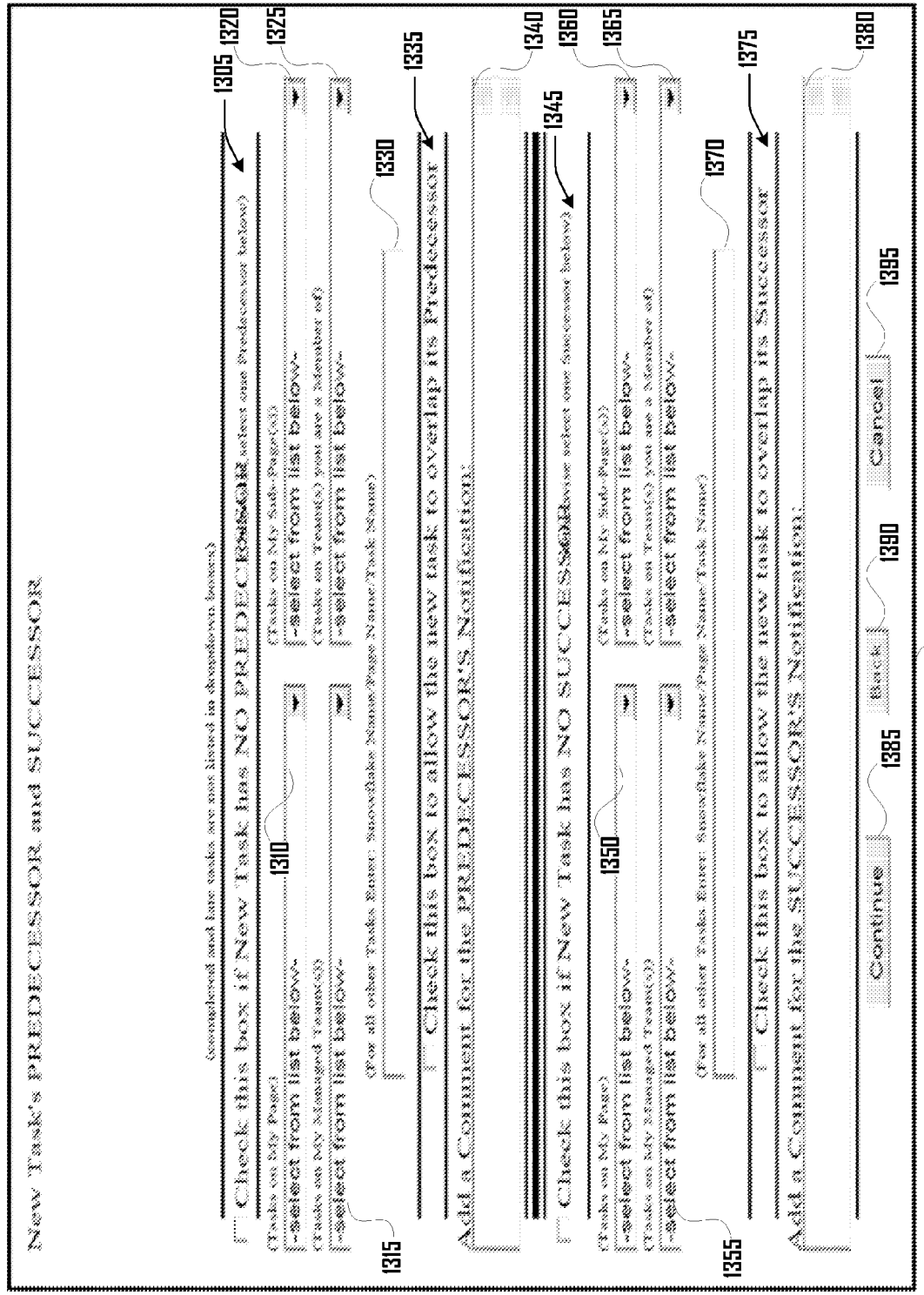
FIG. 13 is an illustration of a New Task Predecessor/Successor form, in accordance with one embodiment.

Selecting the Back button 1485 will redirect the browser 5560 back to the previous form (FIG. 13). Selecting the Cancel button 1490 will just redirect the browser 5560 to the viewers User Page 300. My Sub-Page(s) (item in the Create A Task 323 menu): (FIG. 15) (this option only presented to User if they have Sub-Pages) This form 1500 allows the User to:

Select any combination of Sub-Pages 1505 (one to all) that you would like to receive the task you are creating.

Identify Task Manager as task creator or Recipient(s) 1510: This allows the Task Creator to determine who will be the Task Manager (Themselves or the Recipient(s)).

This allows the Task Creator to determine who will be the Task Manager (Themselves or the Recipient(s))

Optionally Identify Task Performer as task creator or Recipient(s) (1511)

This allows the Task Creator to determine who will be the Task Performer (Themselves or the Recipient(s))

IF Task Manager and Performer is/are Recipient(s) the Task Creator can identify if they still want to receive task related notifications.

IF Task Manager is/are Recipient(s) the Task Creator can identify if they still want to receive task related notifications. 1515

Selecting the Continue button 1520 will make checks including those associated with the rules mentioned above. If there are problems, error messages are posted. If no problems, The browser 5560 redirects to the form 1200 in FIG. 12 and the task creation process proceeds as described above.

Selecting the Cancel button 1525 will just redirect the browser 5560 to the viewers User Page 300. Currently a Predecessor and/or Successor cannot be attached to this task if it is being created for more than one performer. Later versions will enable such attachments.

My Team: (this option in the Create A Task 323 menu is only presented to User if they have Teams)

Mousing over this option presents the User with another level dropdown from which they can select from the Teams they Manage or are members of. Team hierarchy recognition would determine task direct assignment or the launching of a Requested Operation. Selecting a team from this dropdown brings the User to a form 1600 (FIG. 16) that enables them to:

Select any combination of Team Members (1 to all) 1605 that they would like to receive the task they are creating. Task recipient(s) will be designated as the Task Performer.

Identify Task Manager as task creator or Recipient(s) 1610: This allows the Task Creator to determine who will be the Task Manager (Themselves or the Recipient(s))

Optionally Identify Task Performer as task creator or Recipient(s) (1611)

This allows the Task Creator to determine who will be the Task Performer (Themselves or the Recipient(s))

IF Task Manager and Performer is/are Recipient(s) the Task Creator can identify if they still want to receive task related notifications.

IF Task Manager is/are Recipient(s) the Task Creator can identify if they still want to receive task related notifications. 1615

Selecting the Continue button 1620 will make checks including those associated with the rules mentioned above. If there are problems, error messages are posted. If no problems, the browser 5560 redirects to the form 1200 in FIG. 12 and the task creation process proceeds as described above.

Selecting the Cancel button 1625 will just redirect the browser 5560 to the viewers User Page 300.

Currently a Predecessor and/or Successor cannot be attached to this task if it is being created for more than one performer. Later versions may enable such attachments.

Allocation (item in the Create A Task 323 menu): (FIG. 17) This form 1700 allows the User to:

Identify Recipient via its Snowflake Address (SF Name/Page Name) 1705 that they would like to receive the task they are creating. Task recipient will be designated as the Task Performer. Upon Submittal the system checks to make sure that the entered Snowflake Address exists.

Identify Task Manager as task creator or Recipient 1710: This allows the Task Creator to determine who will be the Task Manager (Themselves or the Recipient(s))

Optionally Identify Task Performer as task creator or Recipient(s) (1711)

This allows the Task Creator to determine who will be the Task Performer (Themselves or the Recipient(s))

IF Task Manager and Performer is/are Recipient(s) the Task Creator can identify if they still want to receive task related notifications.

IF Task Manager is/are Recipient(s) the Task Creator can identify if they still want to receive task related notifications 1715.

Selecting the Cancel button 1725 will just redirect the browser 5560 to the viewers User Page 300. Selecting the Continue 1720 button will make checks including those associated with the rules mentioned above. If there are problems, error messages are posted. If no problems, the browser 5560 redirects to the form 1200 in FIG. 12 and the task creation process proceeds as described above.

In this case however, when the task is created (upon the successful completion of the form 1400 in FIG. 14, the system checks for the rule outlined in FIG. 17 (i.e., "Allocation will assign the task to the recipient However if you are not the recipient's Manager Page or the Team Manager of a Team the Task will be attached to, the recipient can give you back the task") and if the recipient has the option to give the task back then a Requested Operation is launched and the Recipient is sent an email with a link to a form 1800 (FIG. 18) that will allow the Recipient to Accept or Reject 1805 the task and enter a comment 1810 for the notice(s) that will be sent. (The Task Recipient must be logged into the SP to access the form.) If Task is given back/Rejected, the Task Creator becomes the Task's Manager and Performer. If Accepted, no changes are made.

Submitting 1815 the form 1800 in FIG. 18 will close the window update the data as necessary and send notices.

Sub-Page(s) 324:

This option allows the user to work with its Sub-Pages by presenting the User with options (currently via a dropdown menu) including Create, View, Modify, Move and Delete.

Sub-Pages are Pages that have a User Page 300 as their Manager Page. A User Page 300's Sub-Pages are the User Page 300s it is the Manager Page of.

Create Sub-Page (item in the Sub-Page(s) 324 menu): Selecting this option takes the User to a Create New Sub-Page form 1900 (FIG. 19) that enables the User to create pages that will be their Sub-Pages.

Inputs Include:

Name 1905: This input allows the User to Name the Sub-Page it is creating (Page Names must be unique within each Snowflake)

Department 1910: This enables the user to Identify the Department their Sub-Page will be attached to. Options in this part of the form are Same, New and Existing. Same attaches the new Sub-Page to the same Department that the Page that created it is attached to. New allows the User to Create a New Department within the Snowflake and attach the Sub-Page to the New Department. Existing enables the user to attach the new Sub-Page to a different Department that already exists within their Snowflake.

Email address 1915: Sub-Page Creator must enter the email address of the recipient of the Sub-Page. This will be used for initial notification.

Selecting the Submit button 1920 will make checks including those mentioned above. If there are problems, error messages are posted. If no problems, the new Sub-Page is created, the browser 5560 is redirected to the viewer's User Page 300 and notices are sent out. Selecting the Cancel button 1925 will just redirect the browser 5560 to the viewers User Page 300.

View (item in the Sub-Page(s) 324 menu): (this option only presented to User if they have Sub-Pages)

Mousing over this option in the Sub-Page(s) 324 menu presents the User with another level dropdown from which they can select from the Pages they Manage (Their Sub-Pages). Selecting a Sub-Page from this dropdown opens a new window filled with their View of the selected Sub-Page 2000 (FIG. 20):

A Sub-Page View Does not currently have a Navigation Bar 320 but it does currently Identify items including the Page being Viewed 2005 and the Viewer 2040 and it has a Task List 2015 containing tasks Performed and/or Managed by the Sub-Page being Viewed as well as the Sub-Page's Managed Group 2020, Member Group 2025, Teams Managed 2030 and Teams Member 2035 lists. Additional functionality may be added to the Sub-Page View.

The System "knows" who the Viewer 2040 is (by their login) and Tasks 2015, and Teams 2030, 2035, etc shown on the View are only those that, by rule, the Viewer 2040 should be able to see. Currently a Hidden Visibility Task is only listed for its Manager or Performer's View. Additional Visibility Rules apply to other Task List functionality. A Hidden Visibility Team can only be seen by its Manager and Members.

All the Task List "Button" functionality described below is available to the Viewer 2040 of a Sub-Page View (at any sub-level). The System controls the implementation/request for implementation based on "who" the Viewer 2040 is and the Rules described in this document.

Selecting a Team on the Teams Managed 2030 or Teams Member 2035 lists Redirects the User/Viewer to the selected Team Page. Via this path the Team Page has a back button versus the close button discussed below. Team Pages and the Teams Managed and Teams Member lists are discussed in detail later in this document.

Figure 21:
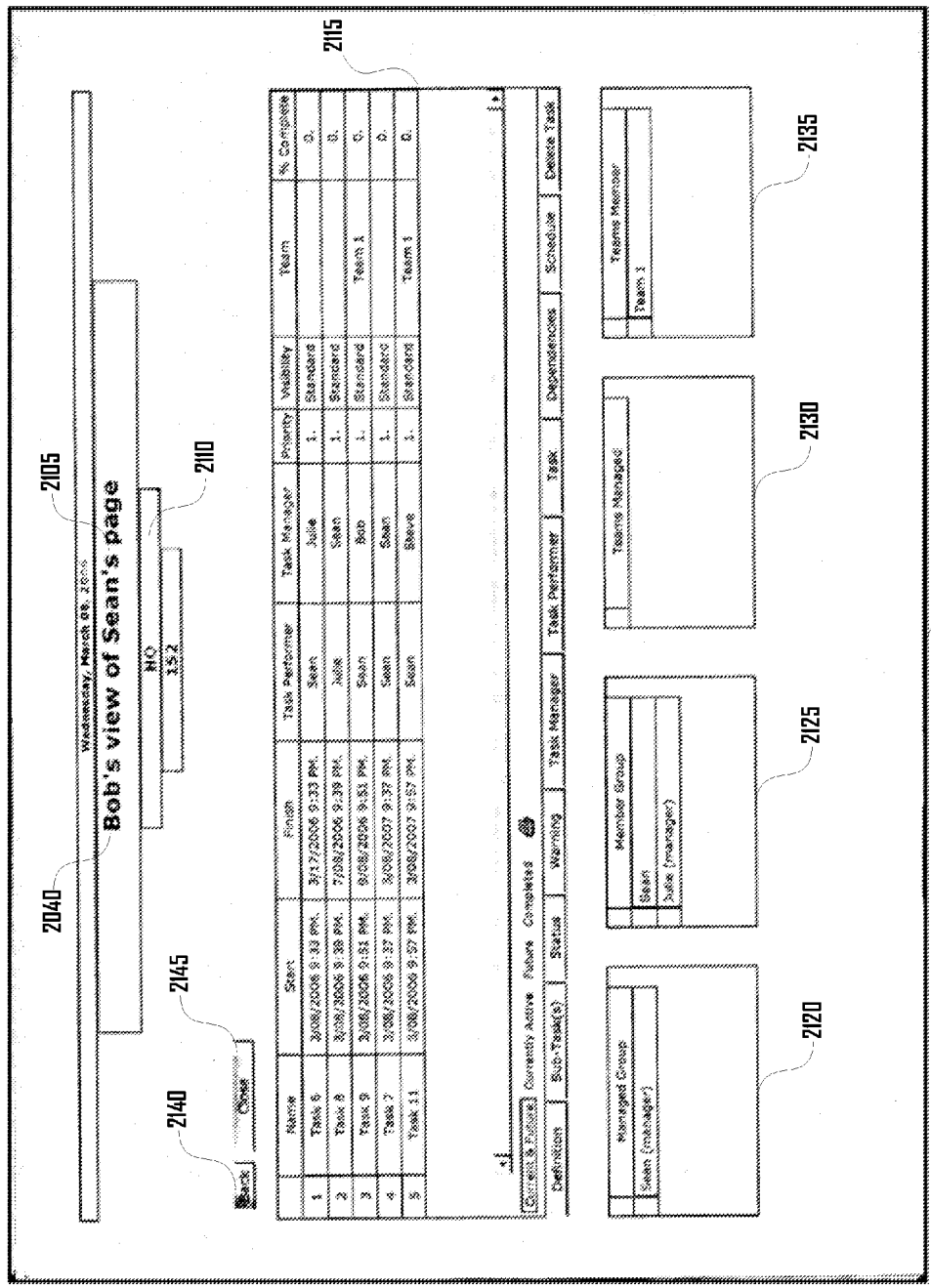
FIG. 21 is an illustration of a Sub-Page View of the selected Page, in accordance with one embodiment.

Selecting a Page on the Managed Group 2020 or Member Group 2025 lists Redirects the User/Viewer to their Sub-Page View of the selected Page. This enables the Viewer 2040 to "drill" down and around within their Snowflake (FIG. 21). Viewers 2040 are currently not allowed to view the pages of their peers (pages with their same Manager Page) or their Manager or above. Aids to expedite the drilling process may be added such as drop down lists loaded with Sub-Pages available for viewing. These lists are discussed in detail later in this document.

Figure 20:
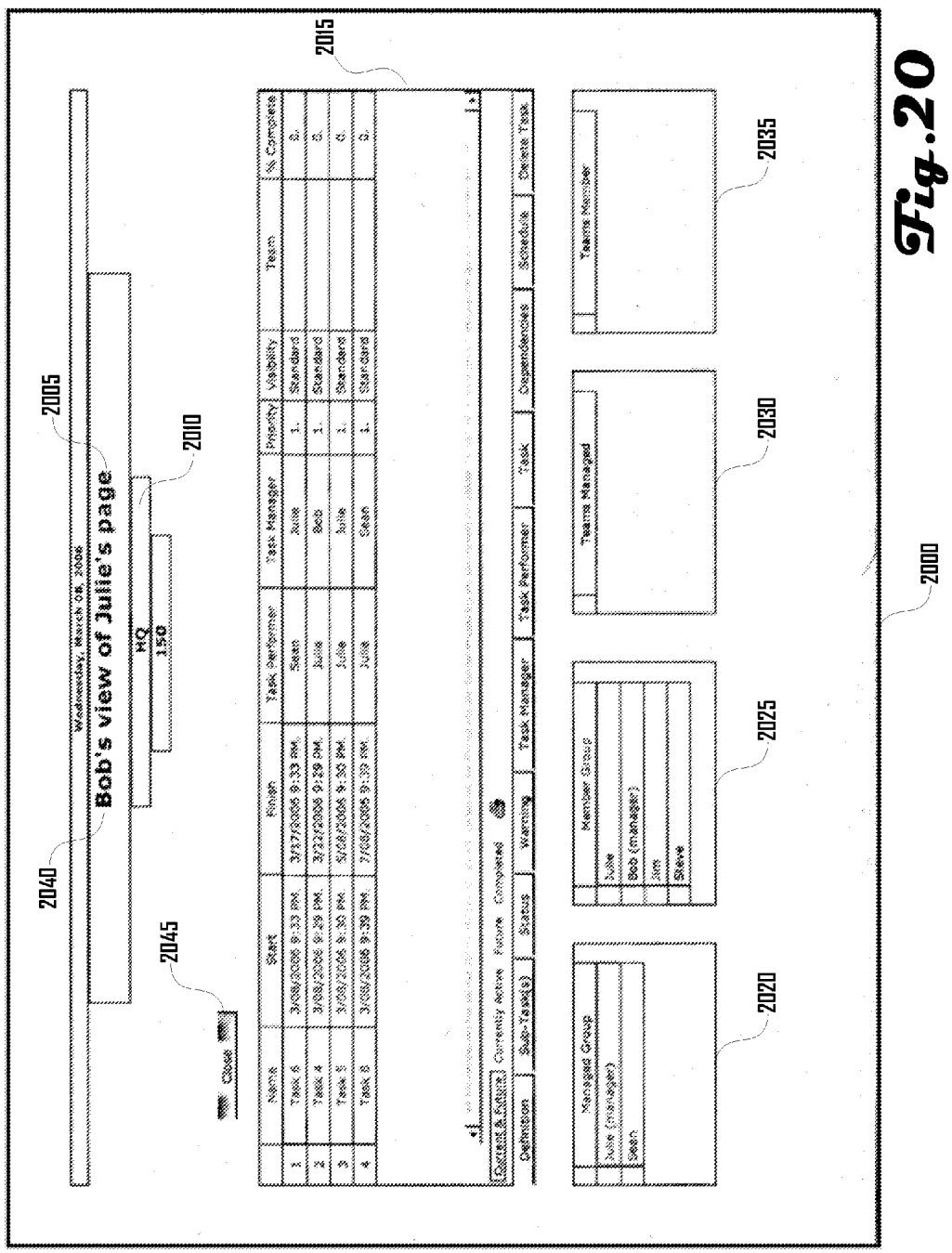
FIG. 20 is an illustration of a View of a selected Sub-Page, in accordance with one embodiment.

The First Level Sub-Page View FIG. 20 has a Close 2045 Button that will close the window that has been opened for the Sub-Page View.

Beyond the First level Sub-Page View 2100 (FIG. 21) a back button 2140 is added to the form. This enables the Viewer 2040 to step back through the path they drilled.

Modify (item in the Sub-Page(s) 324 menu): (this option only presented to User if they have Sub-Pages)

Mousing over this option presents the User with another level dropdown from which they can select from the Pages they Manage (Their Sub-Pages). Selecting a Sub-Page from this dropdown identifies which of its Sub-Pages they wish to Modify and takes the User to a Modify Sub-Page form 2200 (FIG. 22) that enables the User to make modifications to the selected Sub-Page.

Inputs Include:

Name 2205: This input allows the User to change the Name the Sub-Page (Page Names must be unique within each Snowflake)

Department 2210: This enables the user to Modify the Department their Sub-Page is attached to. Options in this part of the form are Current 2225, Same 2230, New 2235, and Existing 2240. Current 2225 keeps the current Department attachment. Same 2230 attaches the Sub-Page to the same Department as its Manager Page. New 2235 allows the User to Create a New Department within the Snowflake and attach the Sub-Page to the New Department. Existing 2240 enables the user to attach the new Sub-Page to a different Department that already exists within their Snowflake.

Selecting the Submit 2215 button will make checks including those mentioned above. If there are problems, error messages are posted. If no problems, the Sub-Page is modified, the browser 5560 is redirected to the viewer's User Page 300 and notices are sent out. Selecting the Cancel button 2220 will just redirect the browser 5560 to the viewers User Page 300.

Move (item in the Sub-Page(s) 324 menu): (this option only presented to User if they have Sub-Pages)

Mousing over this option presents the User with another level dropdown from which they can select from the Pages they Manage (Their Sub-Pages). Selecting a Sub-Page from this dropdown identifies which of its Sub-Pages they wish to Move and takes the User to a Move Sub-Page form 2300 (FIG. 23) that enables the User to select where and how they wish to move the Sub-Page and possibly all the Pages "beneath" it.

Inputs Include:

Selection of destination 2305, New Manager Page 2345, 2365 (if Any) and type of Move 2310. Same Snowflake 2330 as it is currently in, Different Snowflake 2335 or Start New Snowflake 2340. If Same Snowflake 2330 is selected, the User then chooses from a list 2365 of User Page 300*s* in the same Snowflake. If Different Snowflake 2335 is selected the User must enter the Snowflake Address (Snowflake Name/Page Name 205) of the User Page 300 they wish to be the New Manager Page of the Sub-Page (this will be checked upon submittal to make sure it is valid). If Start New Snowflake 2340 is selected, the User must first Enter the new Snowflake's Name 2360 (this input will be checked for uniqueness within the Snowflake Universe) then they must select the type of move 2310. The two types are: Just move the one Page 2350 or Move the Page and all Pages "beneath it" 2355. Comment 2315 for potential new Manager or new First User Page 300: This comment will be part of the Requested Operation for Same Snowflake 2330 and Different Snowflake 2335 Moves and part of the notices for New Snowflake 2340 moves.

Selecting the Cancel button 2325 will just redirect the browser 5560 to the viewers User Page 300. Selecting the Submit button 2320 will make checks including those mentioned above (e.g., "For Moves within the Same Snowflake, or to a Different Snowflake, this Form will ask the Proposed Manager Page to accept this Page as one of its Sub-Pages. You will receive an email notice that the either been Accepted or Rejected"; Moves to Create a new Snowflake are implemented immediately upon the submittal of this Form and notices are sent to all moved Pages" and "For moves within the Same Snowflake, to a Different Snowflake, or a single Page move to a New Snowflake: The Moved Page's Sub-Pages (if any) will move up one level in the hierarchy and become Sub-Pages to your Page"). If there are problems, error messages may be posted. If no problems, a Requested Operation may be launched or the change is implemented as described in FIG. 23 and the browser 5560 is redirected to the viewer's User Page 300. The Requested Operation currently sends an email to the email address associated with the Snowflake Page that is being asked to take over Management responsibility for the Page. A link in the email takes the potential new Page Manager to a Move Page Request form 800. (The Potential New Page Manager must be logged into the SP to access the form.) FIG. 8 is discussed in detail above.

In addition to the explanations given above and on FIG. 23, the system will also remove any unused Departments and perform other "clean up" activities after the move is implemented Eventually the system may be able to make Branch Moves within the same Snowflake and to different existing Snowflake's.

It is possible that under certain circumstances the User Page 300 Identified to Be Moved could be Moved without the Requested Operation process described above (i.e. the Potential New Manager Page is another Sub-Page of the current/old Manager Page).

Delete (item in the Sub-Page(s) 324 menu): (this option only presented to User if they have Sub-Pages)

Mousing over this option presents the User with another level dropdown from which they can select from the Pages they Manage (Their Sub-Pages). Selecting a Sub-Page from this dropdown identifies which of its Sub-Pages they wish to Delete and takes the User to a form 2400 (FIG. 24) that enables the User to Confirm that they wish to Delete the Sub-Page. FIG. 24 explains what will happen when the Sub-Page is Deleted (e.g., team task manager and performer responsibilities will stay as they are but these tasks will no longer be attached to a Team. Therefore should be made to any desired task responsibility before you delete the Team). In addition to the explanation on the form, the system will perform Department and other necessary "Clean Up" activities upon the Deletion of the Sub-Page. Selecting the Cancel button 2410 will just redirect the browser 5560 to the viewer's User Page 300. Selecting "Delete Sub-Page" 2405 on the Delete Sub-Page confirmation form 2400 will Delete the Page from the Data base, send out notices, perform other activities described on the form and the Tasks on the Deleted Sub-Page are automatically dealt with by the System as follows:

(Standard Visibility Tasks)

Rule G1: IF the Deleted Page is Task Performer only THEN Task Manager becomes Performer & Manager Rule G2: IF Deleted Page is Task Manager only THEN the Deleted Page's Manager Page (page doing the deleting) Becomes the Task Manager UNLESS the Task is attached to a Team AND the Manager Page is NOT a Team member or Manager THEN The Team Manager becomes the Task Manager Rule G3: IF Deleted Page is Task Manager AND Task Performer THEN the Deleted Page's Manager Page (page doing the deleting) Becomes the Task Manager & Task Performer UNLESS the Task is attached to a Team AND the Manager Page is NOT a Team member THEN The Team Manager becomes the Task Manager & Task Performer In Rules G2 and G3, the Team Manager cannot be the Deleted Page. IF the Deleted Page is a Team Manager of a Standard Visibility Team THEN the Manager Page (page doing the deleting) becomes the new Team Manager.

Also, Hidden Visibility Teams Managed by the Deleted Page are to be Deleted and Tasks are assigned as if there was no Team attachment.

(Hidden Visibility Tasks)
(1) IF the Deleted Page is Task Performer only THEN Task Manager becomes Performer & Manager
(2) IF the Deleted Page is Task Manager only THEN:
IF the Task is attached to a HIDDEN Team THEN The Team Manager becomes the Task ManagerIF the Task is NOT attached to a HIDDEN Team THEN Task Performer becomes Performer & Manager
(3) IF Deleted Page is Task Manager AND Task Performer THEN:
IF the Task is attached to a HIDDEN Team THEN The Team Manager becomes the Task Manager & Task Performer IF the Task is NOT attached to a HIDDEN Team THEN Task is Deleted Team 325:

This option allows the user to work with its Teams by presenting the User with options (currently via a dropdown menu) including Create, View, Members, Modify, Allocate and Delete.

Create (item in the Team 325 menu): Selecting this option takes the User to a Create a New Team form 2500 (FIG. 25) that enables the User to create a Team.

The User that creates the Team will be its first Manager. Inputs Include:

Name 2505: This enables the User to Name the Team they are Creating. The Name of the Team must be unique within its Manager's Snowflake (i.e. Teams Managed by members of the Team Manager's Snowflake). Also, the Name can Not contain a "/". A full Team Name is (Snowflake Name of Team Manager/Team Name)

Goal/Purpose 2510: This input is required to describe the Goal/Purpose of the newly created Team.

Visibility 2515: Teams are given a visibility, either Hidden 2530 or Standard 2535. A Hidden Visibility Team can only be seen by its Manager and Members. Hidden visibility Teams will also be deleted when/if their Team Manager's Page is Deleted.

Selecting the Submit button 2520 will make checks including those associated with the rules mentioned above. If there are problems, error messages are posted. If no problems, the Team is created and the browser 5560 is redirected back to the Team Creator's/Viewer's User Page 300. Selecting the Cancel button 2525 will just redirect the browser 5560 to the viewer's User Page 300. View (item in the Team 325 menu):: (this option only presented to User if they are the Manager or Member of a Team(s))

Figure 26:
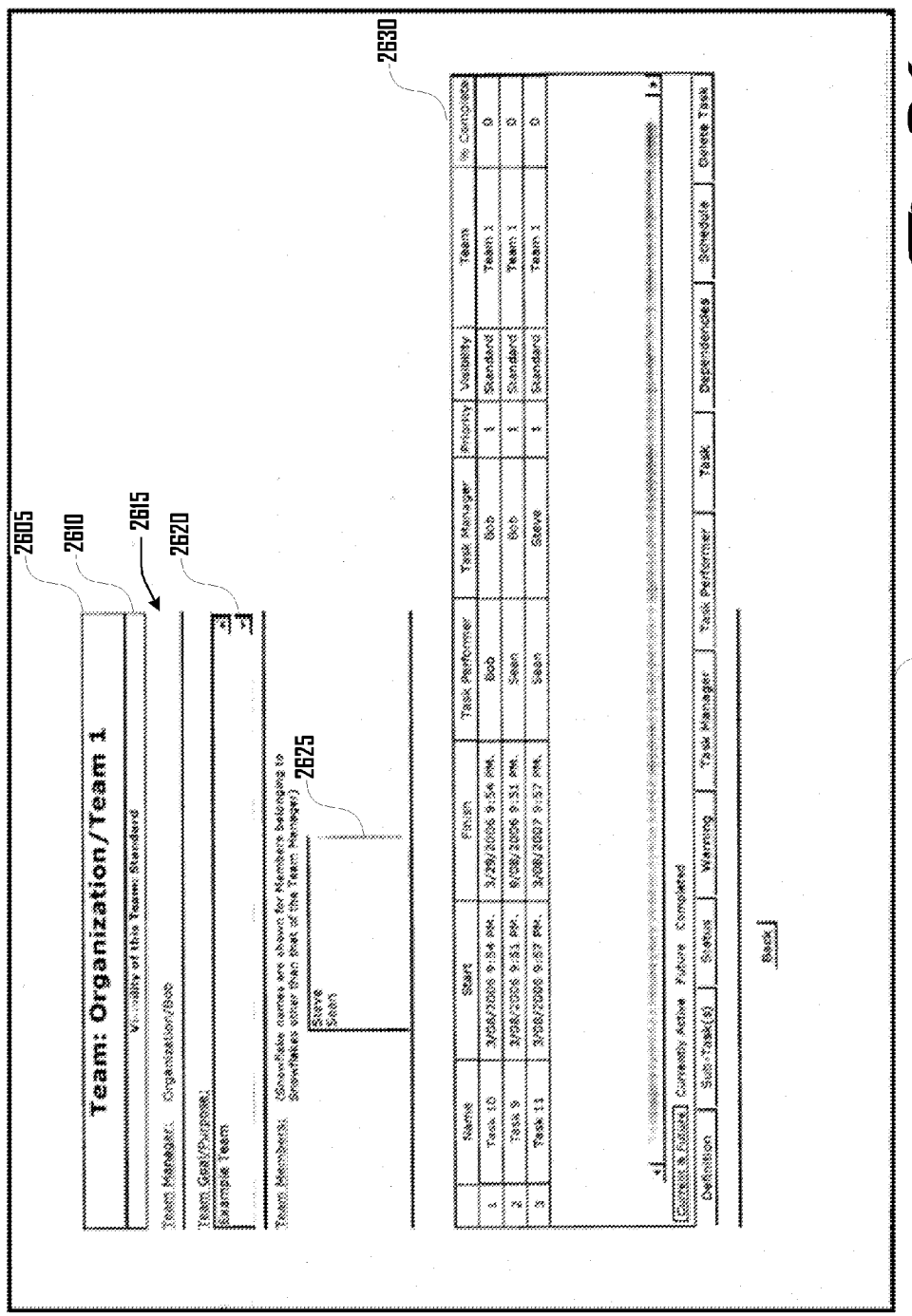
FIG. 26 is an illustration of a Users View of the selected Team's Team Page, in accordance with one embodiment.

Mousing over this option presents the User with another level dropdown from which they can select from the Teams they Manage or are a Member of. Selecting a Team from this dropdown opens a new window filled with The Users View of the selected Team's Team Page 2600 (FIG. 26):

The Team Page currently Identifies the Team 2605, its Visibility 2610, its Manager 2615, its Goal/Purpose 2620 and its Members 2625. A Task List 2630 for Tasks attached to the Team is also on the Team Page.

The System "knows" who the Viewer is (by their login) and Tasks shown on the Team Page are only those that, by rule, the Viewer should be able to see. Currently a Hidden Visibility Task is only listed for its Manager or Performer's View. Additional Visibility Rules apply to other Task List functionality.

All the Task List "Button" functionality described below is available to the Viewer of a Team Page. The System controls the implementation/request for implementation based on "who" the Viewer is and the Rules described in this document.

When a Team Page is reached via this Path it may have a Close button (not shown) that will close the window that has been opened to contain the Team Page.

Additional Team/Project functionality may be added to the Team Page.

Members (item in the Team 325 menu):: (Currently, this option only presented to User if they are the Manager of a Team(s))

Mousing over this option presents the User with another level dropdown from which they can select from the Teams they Manage. Selecting a Team from this dropdown brings the User to a Modify Team Members form 2700 (FIG. 27) that allows them to invite new team members and remove existing Team Members to and from the selected Team.

As described in the form inputs enable:
Inviting new members 2705, 2710 (3rd Party Invitee Snowflake Address 2745 is checked for validity)
Invitation Comment 2715
Remove existing Member(s) 2720
Removal Comment 2730

Selecting the Cancel button 2740 will just redirect the browser 5560 to the viewers User Page 300. Selecting the Submit button 2735 will make checks including those mentioned above. If there are problems, error messages are posted. If no problems, and 1) If Page(s) have been identified to be removed from the Team, they are Removed, Team Task responsibilities are automatically reassigned as described in the form and notices are sent out. 2) If User Page 300s have been asked to join the team, a Requested Operation is launched. The Requested Operation currently sends an email to the email address associated with the/each Snowflake Page that is being asked to join the Team. A link in the email takes the potential new Team Member to a Team Membership Invitation form 2800 (FIG. 28). (The Potential New Team Member must be logged into the SP to access the form.) Along with other information on the form 2800, the inputs for the Viewer are:

Accept 2805: Selecting Accept on the form indicates that the proposed New Team Member accepts the Invitation to become a Team Member.
Reject 2820: Selecting Reject on the form indicates that the proposed New Team Member does Not accept the Invitation to become a Team Member.
Comment 2810: Enables the User to enter a comment that will be part of the notices generated upon submittal.

Selecting the Submit button 2815 will make checks including those mentioned above. If there are problems, error messages are posted. If no problems, for an accepted request: the changes are implemented (The Recipient Page becomes a team member), the browser 5560 is closed and notices are sent out. For a rejected request, the browser 5560 is closed and notice is sent out.

It is possible that under certain circumstances the User Page 300 Identified to Become a Team Member could be Made a Team Member without the Requested Operation process described above (i.e. the "invited" Page is a Sub-Page of the Team Manager).

It is also possible that a form similar to the Modify Team Members form 2700 could be made available to Team Members other than the Team Manager. In this situation ALL the inputs (additions or removals) would likely first be routed to the Team Manager for their approval (Probably via a Requested Operation). Approval could mean Member(s) are removed, added or Requested Operations (as described above) are sent out.

Modify (item in the Team 325 menu):: (this option only presented to User if they are the Manager of a Team(s))

Mousing over this option presents the User with another level dropdown from which they can select from the Teams they Manage. Selecting a Team from this dropdown brings the User to a form 2900 (FIG. 29) that allows them to modify the selected Team.

As described in the form inputs enable:
Name Modification 2905 (Same rules apply as when the Team is Created): The Name of the Team must be unique within its Manager's Snowflake (i.e. Teams Managed by members of the Team Manager's Snowflake). Also, the Name can Not contain a "/".
Goal/Purpose 2910 (One must be entered)
Visibility 2915: Teams are given a visibility, either Hidden 2930 or Standard 2935. A Hidden Visibility Team can only be seen by its Manager and Members. Hidden visibility Teams will also be deleted when/if their Manager Page is Deleted.

Selecting the Submit button 2920 will make checks including those associated with the rules mentioned above. If there are problems, error messages are posted. If no problems, the Team is Modified, notices are sent out and the browser 5560 is redirected back to the Team Manager's User Page 300. Selecting the Cancel button 2925 will just redirect the browser 5560 to the viewer's User Page 300. It is also possible that a form similar to the Modify Team form 2900 could be made available to Team Members other than the Team Manager. In this situation the inputs would likely first be routed to the Team Manager for approval (Probably Via a Requested Operation). Allocate (item in the Team 325 menu):: (this option only presented to User if they are the Manager of a Team(s))

Mousing over this option presents the User with another level dropdown from which they can select from the Teams they Manage. Selecting a Team from this dropdown brings the User to a Allocate Team form 3000 (FIG. 30) that allows them to Request another Snowflake User Page 300 to take over Management of the Team.

Inputs Include:
Identification of Potential new Team Manager 3005. Same Snowflake 3035 as Viewer or Different Snowflake 3010. If Same Snowflake 3035 is selected, the User then chooses from a list of User Page 300s in the same Snowflake or Team. If Different Snowflake 3010 is selected, the User must enter the Snowflake Address (Snowflake Name/Page Name 205) of the User Page 300 they wish to be the New Team Manager (this will be checked upon submittal to make sure it is valid). Comment for potential new Team Manager 3015: This comment will be part of the Requested Operation.
Selection of current Team Manager to remain a Team Member or Not 3020: IF the Team Manager chooses Not to remain part of the team And the Team Management Allocation is Accepted, the New Team Manager Will receive all of the old Team Managers Task Responsibilities for Tasks attached to this Team.

Selecting the Cancel button 3030 will just redirect the browser 5560 to the viewers User Page 300.

Selecting the Submit button 3025 will make checks including those mentioned above. If there are problems, error messages are posted. If no problems, a Requested Operation is launched. The Requested Operation currently sends an email to the email address associated with the Snowflake Page that is being asked to take over Management responsibility for the Team. A link in the email takes the potential new Team Manager to a Team Management Invitation form 3100 (FIG. 31). (The Potential New Team Manager must be logged into the SP to access the form.) It is possible that under certain circumstances the User Page 300 Identified to Become a Team Manager could be Made the Team Manager without the Requested Operation process described above (i.e. the "invited" Page is a Sub-Page of the current/old Team Manager).

Along with other information on the Team Management Invitation form 3100 (FIG. 31), the inputs for the Viewer are:

Accept 3105: Selecting Accept on the form indicates that the proposed New Team Manager accepts the Team Manager role.

Reject 3120: Selecting Reject on the form indicates that the proposed New Team Manager does Not accept the Team Manager role.

Comment for Requestor 3110: Enables the user to enter a comment that will be part of the notices generated upon submittal.

Selecting the Submit button 3115 will make checks including those mentioned above. If there are problems, error messages are posted. If no problems, for an accepted request: the change is implemented, the browser 5560 is closed and notices are sent out. For a rejected request, the browser 5560 is closed and notice is sent out.

An additional check that takes place comes into play when the Team Management is being Allocated to A User Page 300 in a different Snowflake. Because there is a rule that every Team Managed by a User Page 300 in a particular Snowflake Must have a unique name, upon such a submittal the system checks to make sure that the Team Name of the Allocated Snowflake is Available in its new Snowflake. If the Name is available in the destination Snowflake then no additional step is required. If, however, the Name is not available an error is displayed upon the submittal this form and an additional section of it is made visible. This section enables the User to enter a new Name for the Allocated Team. This Name is also checked for availability and the process continues until an available name is entered or the request is rejected.

It is also possible that a form similar to the Allocate Team form 3000 could be made available to Team Members other than the Team Manager. In this situation the inputs would likely first be routed to the Team Manager for approval (Probably Via a Requested Operation). Delete (item in the Team 325 menu):: (this option only presented to User if they are the Manager of a Team(s)).

Mousing over this option presents the User with another level dropdown from which they can select from the Teams they Manage. Selecting a Team from this dropdown brings the User to a Delete Team confirmation form 3200 (FIG. 32) that enables the User to Confirm that they wish to Delete the Team (Selecting "Delete Team" 3205 will remove the Team from the Data base). FIG. 32 also explains some of the other things that will happen when the Team is Deleted. Selecting the Cancel button 3210 will just redirect the browser 5560 to the viewers User Page 300. It is also possible that a form similar to the Delete Team form 3200 could be made available to Team Members other than the Team Manager. In this situation the request would likely first be routed to the Team Manager for approval (Probably Via a Requested Operation).

Task Lists 330

The next Major element of a User Page 300 is the Task List 330.

Figure 3:
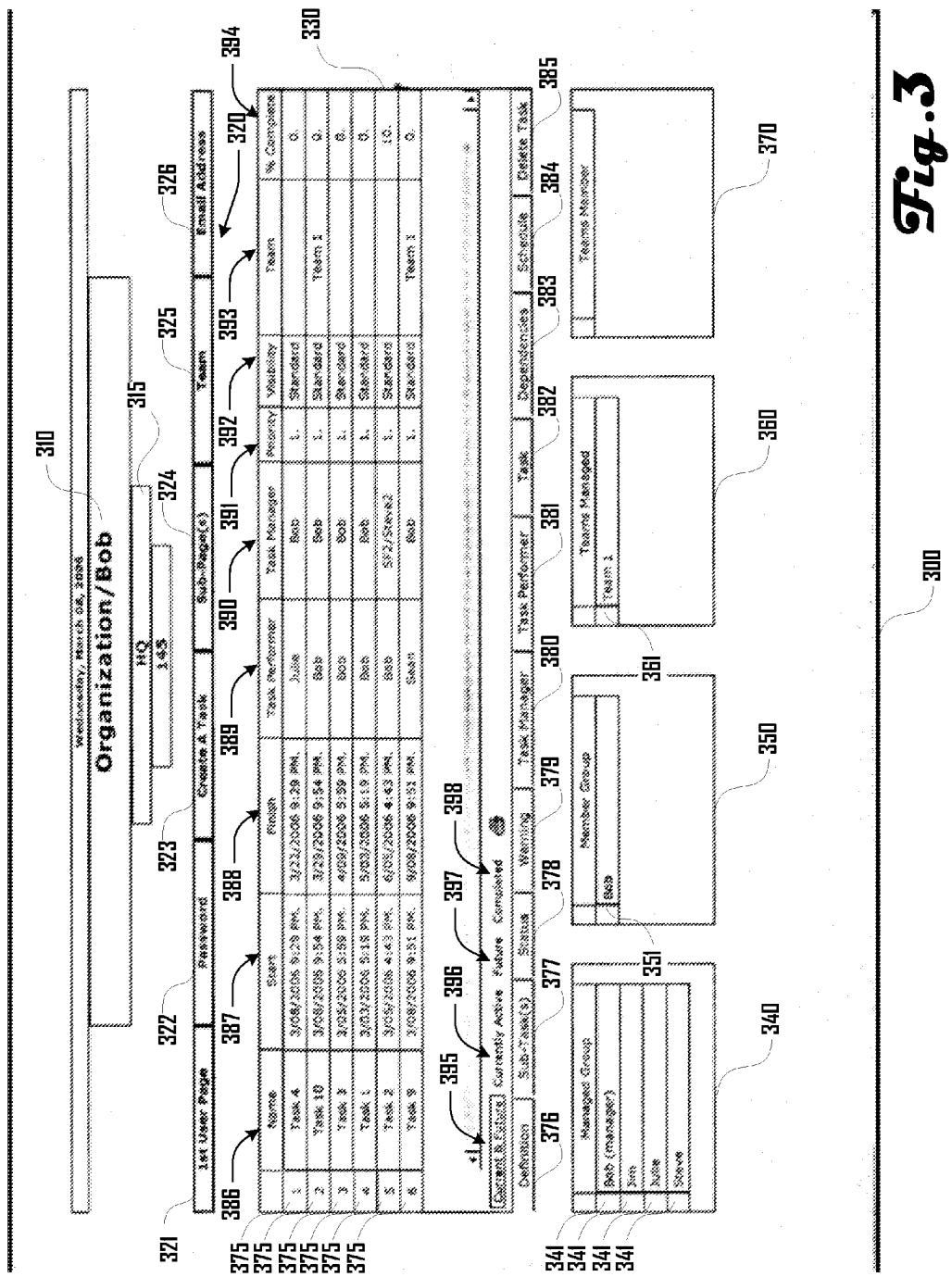
FIG. 3 is an illustration of a User Page, in accordance with one embodiment.

FIG. 3 shows the User Page 300 Task List 330. As can be seen in the Figure, the List consists of Rows 375, Columns 386-94, Filters/Sheets 395-98 and Buttons 376-85.

As described above Task Lists are also shown on Sub-Page Views and Team Pages. Task Lists contain tasks Performed and/or Managed by the Page or Team being Viewed. The System "knows" who the Viewer is (by their login) and Tasks shown on the View are only those that, by rule, the Viewer should be able to see. Currently a Hidden Visibility Task is only listed for its Manager or Performer's View. Additional Visibility Rules apply to other Task List functionality.

Rows 375:

Each task Performed and/or Managed by the User is Listed in a row on their User Page 300 Task List 330. The Background color of a row turns Yellow when the Task's warning time is passed and turns Red when the finish time is past. Yellow and Red Background colors are not used on the Completed Task Sheet. Columns 386-94:

The current Columns in the list are:

Name 386 (Task Name)

Start Time 387

Finish Time 388

Task Performer 389 (Task Performer's Page Name; Snowflake Name/Page Name 205 is used when Task Performer is in a Snowflake other than that of the Viewer)

Task Manager 390 (Task Manager's Page Name; Snowflake Name/Page Name 205 is used when Task Manager is in a Snowflake other than that of the Viewer)

Priority 391

Visibility 392 (Standard or Hidden)

Team 393 (Team Name (If Task is attached to a Team); Snowflake Name/Team Name is used when Team Manager is in a Snowflake other than that of the Viewer)

percent Complete 394

The Competed Sheet task list also contains a column for Date Completed, which shows the date and time that the Task performer entered that the Task was 100 percent complete.

The list 330 can be sorted by any of the columns 386-94.

Filters/Sheets 395-98: These selections load the list with the appropriate Tasks.

Currently Active 396: Shows Tasks that have passed their Scheduled Start time and are not yet 100 percent complete Future 397: Shows Tasks that have not yet reached their Scheduled Start time Current and Future 395: Shows Tasks that are both Currently Active and Future Completed 398: Shows Tasks that are 100 percent Complete Additional Filters/Sheets can be added.

Buttons 376-85:

Buttons initiate functionality for existing Tasks. The User must first select a task (by clicking on the task row 375, highlighting the task) then click the button 376-85 that represents the functionality the User wants to initiate. Currently only the Definition 376, Sub-Task(s) 377 and Delete Buttons 385 are available for a completed Task.

Definition 376:

Clicking the Definition 376 Button redirects the browser 5560 to a form 3300 that shows Task details (FIG. 33). In addition to what is shown in the figure, additional details include:

All Tasks in the Snowflake Universe are uniquely identified by the combination of their Snowflake Name/Page Name/Task Name 3305. The Snowflake Name/Page Name 205 are that of the Task's Performer.

If the Start time 3340 is passed, the time is in black bold font on the form. If the finish time 3310 is past and the task is Not 100 percent complete, the Finish time 3310 is in red bold font on the form. The Start time 3340 is also in italics if the Task is Scheduled to start Upon the Completion of its Predecessor (UCP). The Finish time 3310 is in italics if the Start 3340 is UCP and the Finish time 3310 was entered as a Duration 3345. (Upon Completion of Predecessor) and (Duration 3345) are shown under the Start 3340 and Finish 3310 time when appropriate.

Italics represent a "Soft" Start 3340 and Finish 3310 time. Soft schedules are schedules that are dependent upon the status of the Task's Predecessor. The system will automatically change these schedules, and send appropriate notifications, depending on the status of the Task's Predecessor(s). This enables "Pull" or "Demand Driven Scheduling". The Tasks Priority 3350, Visibility 3355, and Team 3360 attachment (if any) are shown.

Visibility Rules for both Teams and Tasks are implemented regarding if the Team Name and Parent, Predecessor(s) and Successor(s) (along with their associated overlaps) are shown. This mainly comes into play because Tasks can be on Task lists viewed by a User other than the Task's Manager or Performer. These situations can occur on Team Pages, Sub-Page Views and when the Viewer "drills" sideways via the Predecessor and Successor hyperlinks and up via the Parent Hyperlink (described below).

The Parent 3365, Predecessor 3370, and Successor 3375 tasks shown on a tasks Definition page 3300 are hyperlinks to the Definition pages 3300 of these Tasks. Along with other security measures, the system can ensure that the Viewer can not drill into a Snowflake that they are not a member of.

The latest status update 3325 is posted along with the time of the update 3380. If the Task has not been updated since its creation, its creation time is used as the time its status was last updated. When a task is created the percent complete 3385 is initially loaded as 0 and the status explanation 3325 is initially "Not Started".

Figure 34:
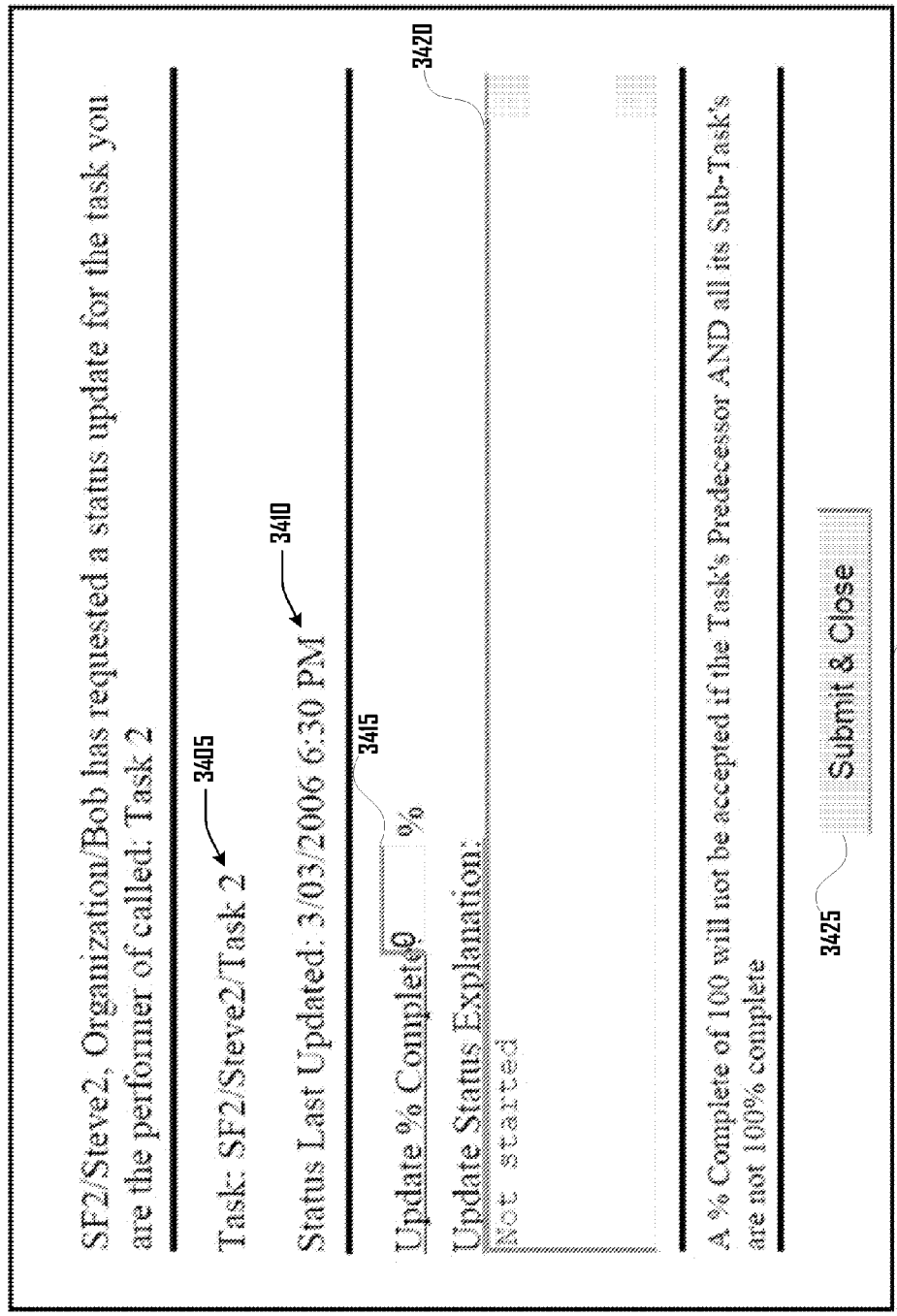
FIG. 34 is an illustration of a Status Update form, in accordance with one embodiment.

If the Viewer of the Task's Definition Page 3300 is not the Task performer then a check box 3330 is shown on the form that will enable the viewer to request the Task Performer for an update of the Task's Status. This request will send an email to the email address associated with the Snowflake Page that is the Task Performer. The email will have a link to a form 3400 (FIG. 34) that enables the Task Performer to update the Status of the Task. (The Task Performer must be logged into the SP to access the form.) The Update is entered into the Database and an email is sent to the status update requester that also contains the updated information.

Figure 35:
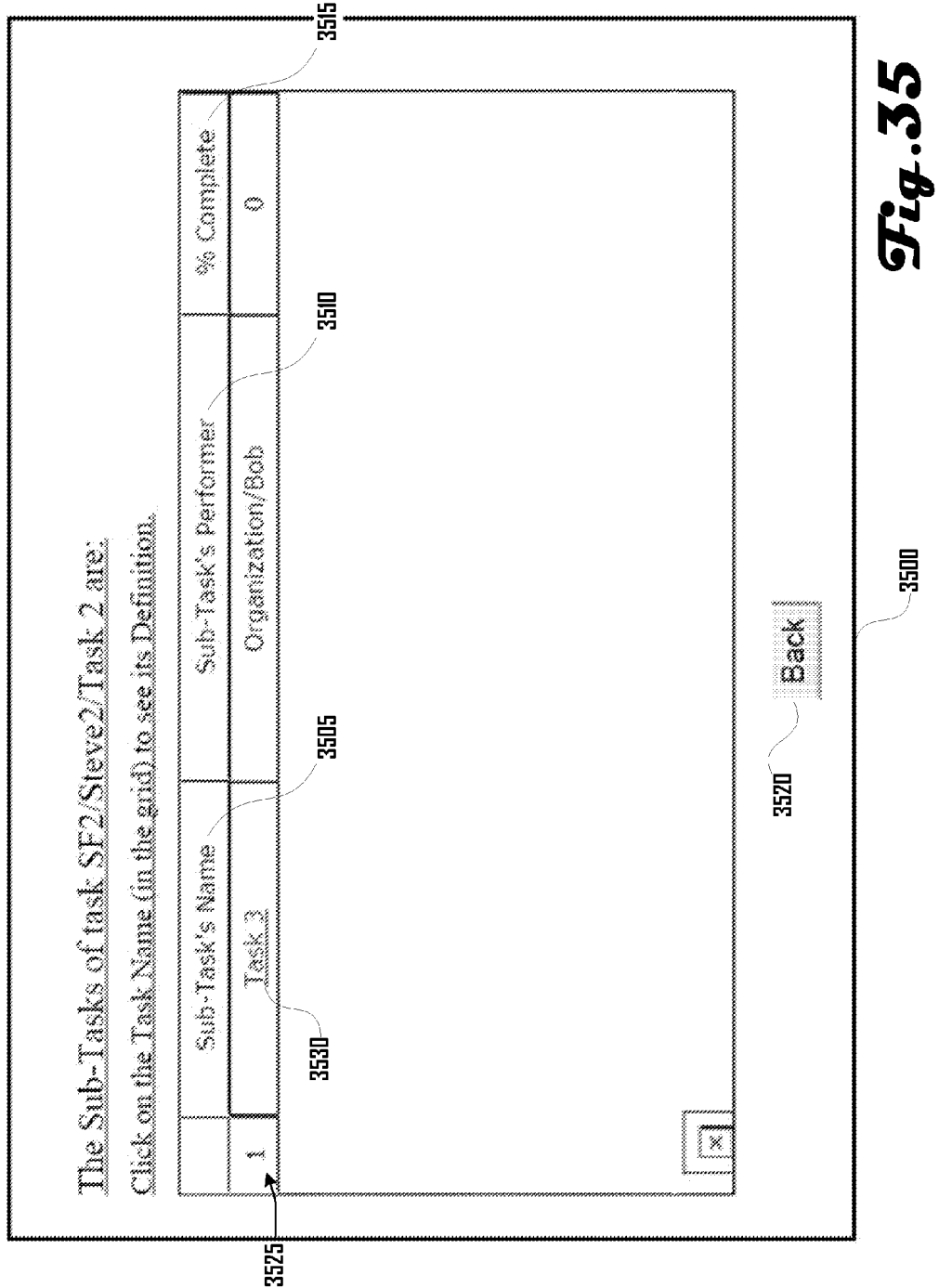
FIG. 35 is an illustration of a Sub-Task form, in accordance with one embodiment.

The Submit/Back/Close button 3335 on this form will close the window if the form was opened from an email. It will also Submit the request for a Task Status Update, described above, if one was made. The Back functionality of the button will take the viewer back to the User Page 300 that the Definition button 376 was selected on and it will also step back through the previous Definition Pages 3300 that the User may have drilled through via the hyperlinks in the Task Definition form 3300. Sub-Task(s) 377:

Clicking the Sub-Task(s) button 377 redirects the browser 5560 to a form 3500 that shows the selected Task's Sub-Tasks (FIG. 35). In addition to what is shown in the figure, additional details include: A Task has a Sub-Task if it is the Parent Task of another Task. The Task it is the Parent Task of is its immediate Sub-Task. The term Sub-Task also refers to Tasks that are beyond/below the immediate Sub-Task level (i.e. sub-tasks of the immediate sub-tasks of the selected Task etc). The Parent Task/Immediate Sub-Task relationship can create a network of Sub-Tasks for a Task that goes well beyond the selected Task's immediate sub-tasks. This network can have many levels and branches. At some point this form 3500 may diagram these networks (beyond just listing their members).

Task visibility rules are used when loading the sub-task list. (The listing of Hidden Visibility Tasks depends on who is viewing the list) It is likely that the complete list is shown to the Task Manager and Task Performer of the selected Task regardless of the Sub-Task's visibility (This is due to the 100 percent complete rules discussed below regarding Updating a Task's Status. Currently the Task's Sub-Tasks form 3500 lists the Name 3505, Performer 3510, and percent Complete 3515 of the Selected Task's Sub-Tasks 3525. Clicking on a Sub-Tasks Name 3530 will take the viewer to the selected sub-task's Definition Page 3300. The Definition form's 3300 back button 3335 also knows when it should take the user back to the Task's Sub-Tasks form 3500.

The Back button 3520 on the Task's Sub-Tasks form 3500 will take the User back to the page the Sub-Task(s) button 377 was selected on.

Figure 36:
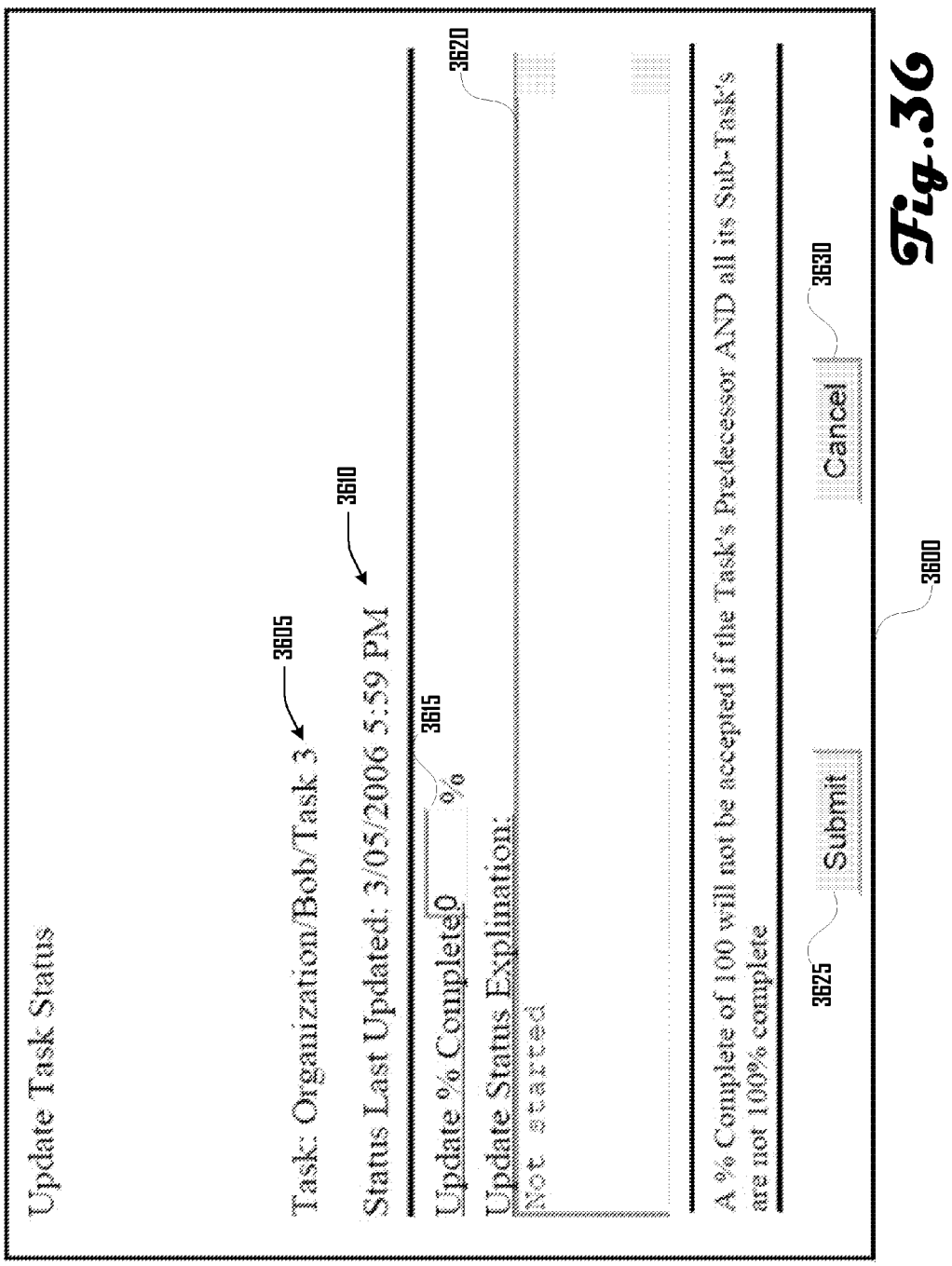
FIG. 36 is an illustration of a Task Status Update form, in accordance with one embodiment.

Status 378: Clicking the Status button 378 redirects the browser 5560 to the Update Task Status form 3600 that allows the selected Task's Performer to update the Status 3615, 3620 of the selected Task (FIG. 36). The Update Task Status form 3600 is only available to the selected Task's Performer. In addition to what is shown in the figure, additional details include: Task 3605: Shows the Tasks full name that uniquely identifies it within the Snowflake Universe. (Task Performers Snowflake Name/Task Performers Page Name/Task Name) Status Last Updated 3610: Shows the Time & Date that the Task's Status was last updated. If the Task's Status has never been updated then the Task's creation Time & Date are used.

The percent complete field 3615 will be filled with the number currently in the data base for this task (Newly created Tasks are given "0"). The Task's Performer can change this field to any number between 1 and 100 inclusive.

A Task's Predecessor(s) and all of its Sub-Tasks must be 100 percent complete before it can be 100 percent complete. If the User attempts to break this rule they will not be allowed and they will be given an error message. Dependencies can be viewed as described above and modified (including attachments removed) as described later in this document. Also, as discussed above Sub-Tasks include the entire potential network, not just the Immediate Sub-Tasks.

The written status explanation field 3620 will be filled with the Description currently in the data base for this task (Newly created Tasks are given "Not Started"). The Task's Performer can change this field to any description/status explanation.

Selecting the Cancel button 3630 will just redirect the browser 5560 to the page the Status button 378 was selected on.

Selecting the Submit button 3625 will make checks including those mentioned above. If there are problems, error messages are posted. If no problems, the updates are made, notices are sent out and the Viewer is taken back to the page the Status button 378 was selected on.

These details also apply to the Task Performer Update Status of Task form 3400, discussed above. The "Submit & Close" button 3425 on the Task Performer Update Status of Task form 3400 will make checks including those mentioned above. If there are problems, error messages are posted. If no problems, the updates are made, notices are sent out and the window is closed.

The Task Performer Update Status of Task form 3400 and the Update Task Status form 3600 allow the user to input that a task is Finished (early, on-time or late). This can affect the Task Window and/or Schedule for both the selected Task's Downstream Tasks and Sub-Tasks (and the Sub-Task's downstream tasks). (i.e. If a Successor of the Selected Task is scheduled to start UCP then its Start time is automatically modified based on the status of the Selected Task. Its finish Time may also be automatically modified).

The system will make the necessary and appropriate checks when the new status is submitted and the necessary and appropriate schedule modifications will be made and notifications will be sent out.

Warning 379:

Clicking the Warning button 379 redirects the browser 5560 to the Change Warning Time form 3700 that currently allows the selected Task's Performer to change the selected Task's warning time (FIG. 37). This form is only available to the selected Task's Performer. In addition to what is shown in the figure, additional details include: Start 3730 and Finish 3705 time along with UCP and Duration 3735 are presented as they are in the Definition form 3300, discussed above.

If no warning time is set, "No Time Set" is posted 3710.

Set or modify Warning time by entering the amount of time before the Task's scheduled Finish time that you wish the warning to be initiated. (Number 3740 and Increment 3715 (Minute, Hour, Day, Week, Month Year))

As explained on the form, when the warning time is reached Notice goes out & the tasks row background turns yellow.

Selecting the Cancel button 3725 will just redirect the browser 5560 to the page the Warning button was selected on. Selecting the Submit button 3720 will make checks including those mentioned above. If there are problems, error messages are posted. If no problems, the updates are made, and the Viewer is taken back to the page the Warning button 379 was selected on.

Task Manager 380:

Clicking the Task Manager 380 Button redirects the browser 5560 to the Change Task Manager form 3800 that allows the Viewer to change (or initiate the process of changing) the selected Task's Manager 3805 (FIG. 38). In addition to what is shown in the figure, additional details include: Identification of Potential new Task Manager 3810. Same Snowflake or Team 3840 as Viewer or Different Snowflake 3815. If Same Snowflake or Team 3840 is selected and the Task is not attached to a Team or is attached to a hidden visibility Team that the Viewer is not a member or manager of then the Viewer chooses from a list of User Page 300s in the same (their) Snowflake. If Same Snowflake or Team 3840 is selected and the Task is Attached to a Standard Visibility Team or a hidden visibility team that the viewer is a member or manager of then the Viewer chooses from a list of User Page 300s that are the Manager or Members of the Team that the Task is attached to. If Different Snowflake 3815 is selected, the User must enter the Snowflake Address 3845 (Snowflake Name/Page Name 205) of the User Page 300 they wish to be the New Task Manager (this will be checked upon submittal to make sure it is valid). The Task Manager and Performer of a Task that is Attached to a Team must be the Team Manager or Members of the Team the Task is attached to. For Hidden Team security reasons, the identification of a potential new Task Manager that is not the manager of or a member of a Hidden Team the Task is attached to is allowed on this form (if the viewer is not a member of the hidden Team the Task is attached to). This situation may be resolved later in the Change Task Manager process by the forced rejection of the request.

Comment for the new Task Manager's notice or the Request 3820 that is sent via a Requested Operation to the potential new Task Manager or the Request that is sent via a Requested Operation to the Current Task Manager. This routing is determined by the rules outlined on the Change Task Manager form 3800.

Selecting the Cancel button 3835 will just redirect the browser 5560 to the page the Task Manager button 380 was selected on.

Selecting the Submit button 3830 will make checks including those mentioned above. If there are problems, error messages are posted. If no problems, the change is either implemented and notices are sent out or the appropriate Requested Operation is launched. This routing is determined by the rules outlined on the Change Task Manager form 3800 and shown below.

Rule A1: If you are a Team Manager, changing task Management from one Team Member to another OR you are the Task Manager changing Task Management to one of your immediate Sub-Pages THEN the change will be implemented and the appropriate notices will be sent out.

Rule A2: If you are the Task Manager changing Task Management to a Page that is NOT one of your immediate Sub-Pages THEN a change request will be sent to and must be Accepted by the potential new Task Manager.

Rule A3: All other changes will be sent to the Task Manager for approval and if necessary final Acceptance must be received from the potential new Task Manager.

When Rule A2 is enforced, a Requested Operation is launched. This Requested Operation currently sends an email to the email address associated with the Snowflake Page that is being asked to take over Management responsibility for the Task. A link in the email takes the potential new Task Manager to a Task Manager Change Request form 3900 (FIG. 39). (The Potential New Task Manager must be logged into Snowflake to access the form.) Along with other information on the Task Manager Change Request form 3900, the inputs for the Viewer/Potential New Task Manager are:

Accept 3905: Selecting Accept on the form indicates that the proposed New Task Manager accepts the Task Manager role.

Reject 3910: Selecting Reject on the form indicates that the proposed New Task Manager does Not accept the Task Manager role.

Comment 3915: Enables the user to enter a comment that will be part of the notices generated upon submittal.

Selecting the Submit & Close button 3920 will make checks including those mentioned above and that the Task Manager of a Task attached to a Team must be the Manager or a Member of that Team. If there are problems, error messages are posted. If no problems, for an accepted request: the change is implemented, the browser 5560 is closed and appropriate notices are sent out. For a rejected request, the browser 5560 is closed and notice is sent out.

Figure 40:
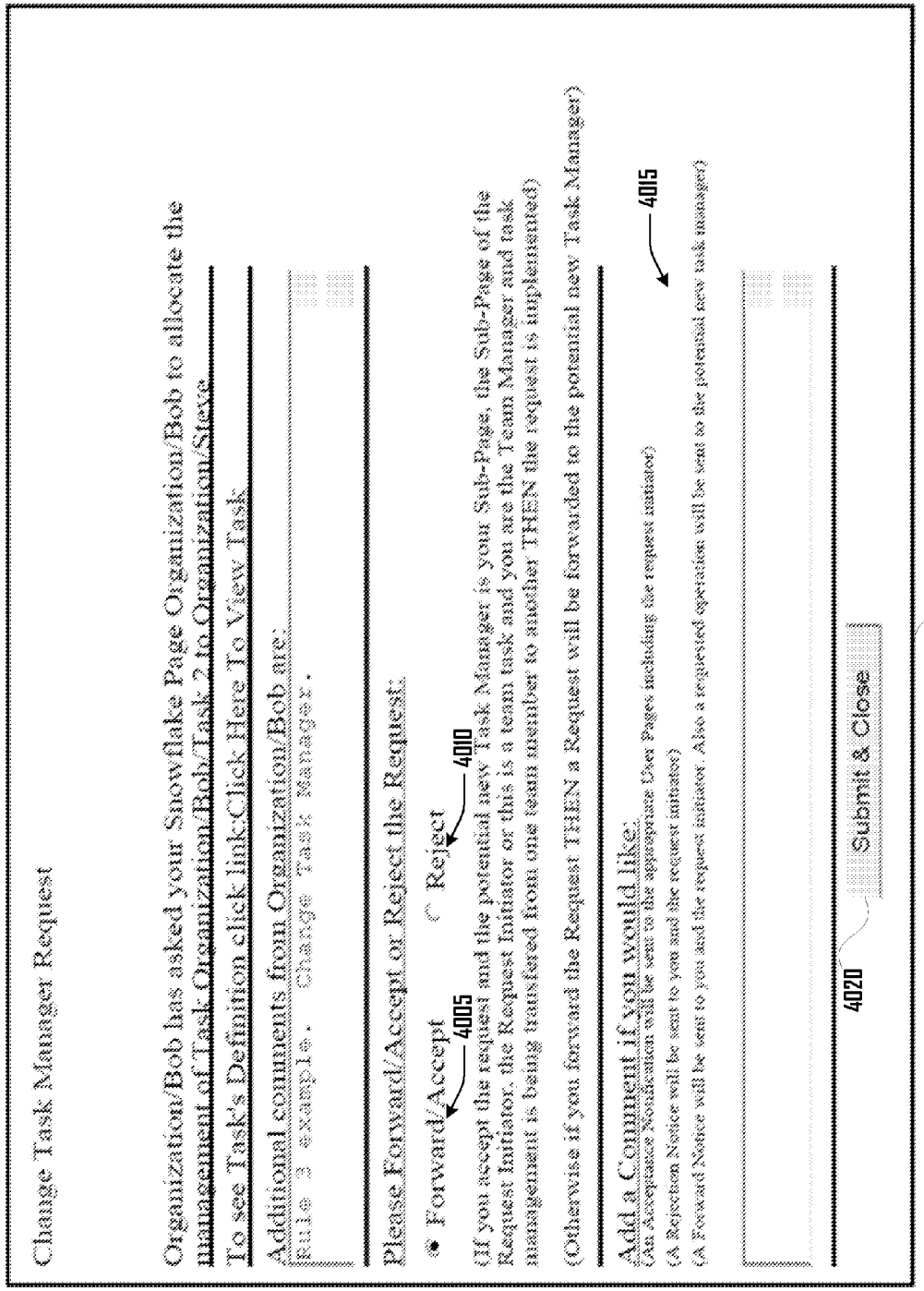
FIG. 40 is an illustration of a Change Task Manager Request form, in accordance with one embodiment.

When Rule A3 above is enforced a Requested Operation is launched. This Requested Operation currently sends an email to the email address associated with the Snowflake Page that is the current Task Manager. A link in the email takes the Task Manager to a Change Task Manager Request form 4000 (FIG. 40). (The Task Manager must be logged into the SP to access the form.) Along with other information on the Change Task Manager Request form 4000, the inputs for the Viewer/Task Manager are:

Forward/Accept 4005: Selecting Forward/Accept on the form indicates that the Task Manager accepts the proposed change.

Reject 4010: Selecting Reject on the form indicates that the Task Manager does Not accept the proposed change.

Comment 4015: Enables the user to enter a comment that will be part of the notices generated upon submittal.

Selecting the Submit & Close button 4020 will make checks including those mentioned above and that the Task Manager of a Task attached to a Team must be the Manager or a Member of that Team. If there are problems, error messages are posted. For a rejected request, the browser 5560 is closed and appropriate notices are sent out. For an accepted (Forward/Accept) request, If no problems and the proposed Task Manager of a Task attached to a Team is the Manager or a Member of that Team, the following rules are enforced:

Rule B1: If you accept the request and the potential new Task Manager is your Sub-Page, the Sub-Page of the Request Initiator, the Request Initiator or this is a team task and you are the Team Manager and task management is being transferred from one team member to another THEN the request is implemented Rule B2: Otherwise if you forward the Request THEN a Request will be forwarded to the potential new Task Manager For an Accepted request (Rule B1) changes are implemented, the browser 5560 is closed and appropriate notices are sent out. For an Accepted request (Rule B2) the process continues and as with Rule A2 and another Requested Operation is launched. This Requested Operation currently sends an email to the email address associated with the Snowflake Page that is being asked to take over Management responsibility for the Task. A link in the email takes the potential new Task Manager to a Task Manager Change Request form 3900. (The Potential New Task Manager must be logged into the SP to access the form.) And the process continues as described above. (An additional notice is sent to the original request initiator).

Figure 41:
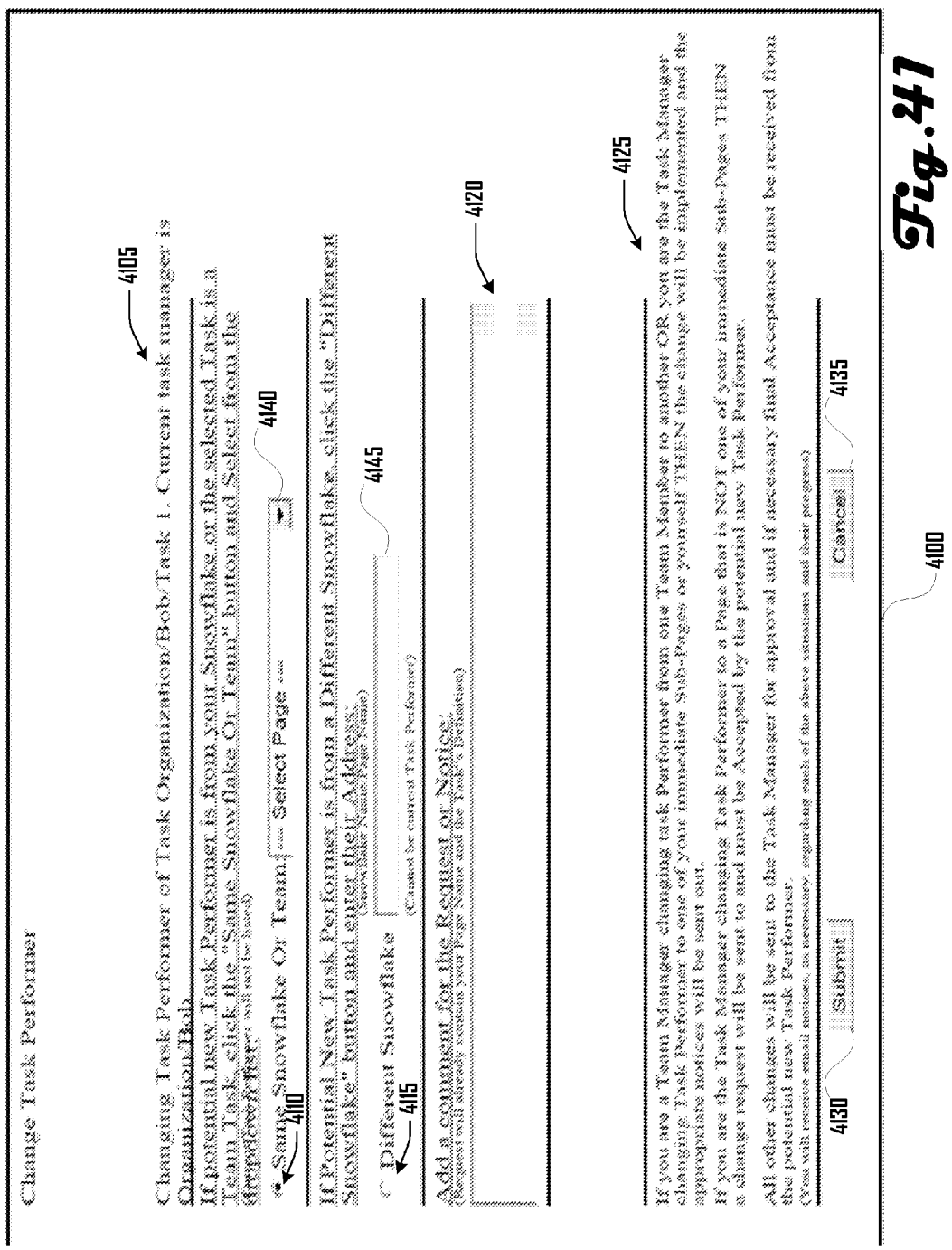
FIG. 41 is an illustration of a Change Task Performer form, in accordance with one embodiment.

Task Performer 381:

Clicking the Task Performer 381 Button redirects the browser 5560 to a Change Task Performer form 4100 that allows the Viewer to change (or initiate the process of changing) the selected Task's Performer (FIG. 41). In addition to what is shown in the figure, additional details include: This form identifies the selected task 4105 and:

Inputs Include:

Identification of Potential new Task Performer 4110. Same Snowflake or Team as Viewer 4140 or Different Snowflake 4115. If Same Snowflake or Team as Viewer 4140 is selected and the Task is not attached to a Team or is attached to a hidden visibility Team that the Viewer is not a member or manager of then the Viewer chooses from a list of User Page 300s in the same (their) Snowflake. If Same Snowflake or Team as Viewer 4140 is selected and the Task is Attached to a Standard Visibility Team or a hidden visibility team that the viewer is a member or manager of then the Viewer chooses from a list of User Page 300s that are manager or members of the Team that the Task is attached to. If Different Snowflake 4115 is selected the User must enter the Snowflake Address 4145 (Snowflake Name/Page Name 205) of the User Page 300 they wish to be the New Task Performer (this will be checked upon submittal to make sure it is valid). The Task Manager and Performer of a Task that is Attached to a Team must be the Team Manager or Members of the Team the Task is attached to. For Hidden Team security reasons, the identification of a potential new Task Performer that is not the manager of or a member of a Hidden Team the Task is attached to is allowed on this form (if the viewer is not a member of the hidden Team the Task is attached to). This situation will be resolved later in the Change Task Performer process by the forced rejection of the request.

Comment for the new Task Performer's notice or the Request 4120 that is sent via a Requested Operation to the potential new Task Performer or the Request that is sent via a Requested Operation to the Current Task Manager. This routing is determined by the rules outlined on the Change Task Performer form 4100.

Ability/Requirement to change the Task Performers Name 4125: Every Task that a particular User Page 300 is the performer of Must have a unique Name. Therefore changing the Task Performer can present a Naming Conflict if the proposed new Task Performer of a Task is already the Task Performer of a different Task with the same Name as the task they are the proposed new Task performer of. If the Naming Conflict exists, an error message is posted and the part of the form that enables/requires the User to input a different Name for the Task becomes visible upon submittal of the form. The new Name is also checked for availability and the process continues until an available name is entered or Cancel 4135 is selected.

Selecting the Cancel button 4135 will just redirect the browser 5560 to the page the Task Performer button 381 was selected on.

Selecting the Submit button 4130 will make checks including those mentioned above. If there are problems, error messages are posted. If no problems, the change is either implemented and notices are sent out or the appropriate Requested Operation is launched. This routing is determined by the rules outlined on the Change Task Performer form 4100 and shown below.

Rule C1: If you are a Team Manager changing task Performer from one Team Member to another OR you are the Task Manager changing Task Performer to one of your immediate Sub-Pages or yourself THEN the change will be implemented and the appropriate notices will be sent out.

Rule C2: If you are the Task Manager changing Task Performer to a Page that is NOT one of your immediate Sub-Pages THEN a change request will be sent to and must be Accepted by the potential new Task Performer.

If the new Task Performer is Task Manager THEN final acceptance or rejection is also made by the Task Manager/Performer on the Task Performer Change Request acceptance form 4200 (FIG. 42) Rule C3: All other changes will be sent to the Task Manager for approval and if necessary final Acceptance must be received from the potential new Task Performer.

When Rule C2 above is enforced, a Requested Operation is launched. This Requested Operation currently sends an email to the email address associated with the Snowflake Page that is being asked to take over Performer responsibility for the Task. A link in the email takes the potential new Task Performer to a Task Performer Change Request acceptance form 4200. (The Potential New Task Performer must be logged into the SP to access the form.) Along with other information on the Task Performer Change Request acceptance form 4200, the inputs for the Viewer/Potential New Task Performer are:

Accept 4205: Selecting Accept on the form indicates that the proposed New Task Performer accepts the Task Performer role.

Reject 4210: Selecting Reject on the form indicates that the proposed New Task Performer does Not accept the Task Performer role.

Comment 4215: Enables the user to enter a comment that will be part of the notices generated upon submittal.

Ability/Requirement to change the Task Performers Name: Every Task of which a particular User Page 300 is the Performer must have a unique Name. Therefore changing the Task Performer can present a Naming Conflict if the change is accepted and the proposed new Task Performer of a Task is already the Task Performer of a different Task with the same Name as the task they are the proposed new Task performer of. If the Naming Conflict exists, an error message is posted and the part of the form that enables/requires the User to input a different Name for the Task becomes visible. The new Name is also checked for availability and the process continues until an available name is entered or the request is rejected.

Selecting the Submit & Close button 4220 will make checks including those mentioned above and that the Task Performer of a Task attached to a Team must be the Manager or a Member of that Team. If there are problems, error messages are posted. If no problems, for an accepted request: the change is implemented, the browser 5560 is closed and appropriate notices are sent out. For a rejected request, the browser 5560 is closed and notice is sent out.

When Rule C3 above is enforced, a Requested Operation is launched. This Requested Operation currently sends an email to the email address associated with the Snowflake Page that is the current Task Manager. A link in the email takes the Task Manager to a Change Task Performer Request form 4300 (FIG. 43). (The Task Manager must be logged into the SP to access the form.) Along with other information on the Change Task Performer Request form 4300, the inputs for the Viewer/Task Manager are:

Forward/Accept 4305: Selecting Forward/Accept on the form indicates that the Task Manager accepts the proposed change.

Reject 4310: Selecting Reject on the form indicates that the Task Manager does Not accept the proposed change.

Comment 4315: Enables the user to enter a comment that will be part of the notices or Request generated upon submittal.

Ability/Requirement to change the Task Performers Name: Every Task of which a particular User Page 300 is the performer must have a unique Name. Therefore changing the Task Performer can present a Naming Conflict if the change is accepted and the proposed new Task Performer of a Task is already the Task Performer of a different Task with the same Name as the task they are the proposed new Task performer of. If the Naming Conflict exists, an error message is posted and the part of the form that enables/requires the User to input a different Name for the Task becomes visible. The new Name is also checked for availability and the process continues until an available name is entered or the request is rejected.

Selecting the Submit & Close button 4320 will make checks including those mentioned above and that the Task Performer of a Task attached to a Team must be the Manager or a Member of that Team. If there are problems, error messages are posted. For a rejected request, the browser 5560 is closed and appropriate notices are sent out. For an accepted (Forward/Accept) request, If no problems and the proposed Task Performer of a Task attached to a Team is the Manager or a Member of that Team, the following rules are enforced:

Rule D1: If you accept the request and the potential new Task Performer is your Sub-Page, the Sub-Page of the Request Initiator, the Request Initiator or this is a team task and you are the Team Manager and task performer is being transferred from one team member to another THEN the request is implemented Rule D2: Otherwise if you forward the Request THEN a Request will be forwarded to the potential new Task Performer For an Accepted request (Rule D1) changes are implemented, the browser 5560 is closed and appropriate notices are sent out. For an Accepted request (Rule D2) the process continues and as with Rule 2) above and another Requested Operation is launched. This Requested Operation currently sends an email to the email address associated with the Snowflake Page that is being asked to take over Performer responsibility for the Task. A link in the email takes the potential new Task Performer to a Task Performer Change Request acceptance form 4200. (The Potential New Task Performer must be logged into the SP to access the form.) And the process continues as described above. (An additional notice is sent to the original request initiator).

Task 382:

Clicking the Task 382 Button redirects the browser 5560 to a Change Task form 4400 that allows the Viewer to change (or initiate the process of changing) the selected Task's Definition (FIG. 44). In addition to what is shown in the figure, additional details include: Fields 4405, 4410, 4415, 4420, 4425 are pre-loaded with the Tasks current details. Submitting edited Details makes the Change(s) or initiates the Change process.

Name 4405: Task Name (Must be unique Per task performer): The rule that every Task that a particular User Page 300 is the performer of Must have a unique Name also comes into play on this form. Changing the Task Name can present a Naming Conflict if the Task Performer is already Performing a different Task with the proposed new Task Name. If the Naming Conflict exists, an error message is posted.

Description 4410: Task Description (Every Task must have one)

Priority 4415: Task's Priority

Visibility 4420: Tasks Visibility (Current Task Visibility is initially selected)

Team 4425: Lists the Task's Team Attachment options. Including "No Team Attachment" and the Task's Current Team Attachment if there is one. Tasks can only be attached to Teams that their Performer and Manager are the Manager or Members of. For Hidden Teams to be shown on this list the Viewer must be the Manager or a Member of the Hidden Team.

If the Task is attached To a Hidden Team that the Viewer is Not the Manager or a Member of then this Team is not Shown on this list and "No Team Attachment" is shown. In This Situation, If "No Team Attachment" is selected then the system treats the situation as if No Team Attachment change was requested.

Comment for the notice(s) or the Request 4435 that is sent via a Requested Operation to the Task's Manager. This routing is determined by the rules outlined on the Change Task form 4400.

Selecting the Cancel button 4445 will just redirect the browser 5560 to the page the Task button was selected on.

Selecting the Submit button 4440 will make checks including those mentioned above. If there are problems, error messages are posted. If no problems, the change is either implemented and notices are sent out or a Requested Operation is launched. This routing is determined by the rules outlined on the Change Task form 4400 and shown below. (These rules may be expanded for changing Team attachment from one Team to another)

Rule E1: If you are the task's Task Manager or you are the Team Manager of a Team that this task is attached to THEN this task will be changed when you submit this form and the appropriate notices will be sent out.

Rule E2: Otherwise your requested changes will be routed to the task's Task Manager for Approval. You will be notified of their response.

When Rule E2 is enforced, a Requested Operation is launched. This Requested Operation currently sends an email to the email address associated with the Snowflake Page that is the selected Task's Manager. A link in the email takes the selected Task's Manager to a Change Task Description Request form 4500 (FIG. 45). (The selected Task's Manager must be logged into the SP to access the form.) The information on the form includes: Identifying the Request 4505, Comment from the Requestor 4510, The Current "values" for each Task Definition element 4515, 4520, 4535, 4540, 4545 and the Suggested changes 4525, 4530 are also posted on the form. Along with other information on the Change Task Description Request form 4500, the inputs for the Viewer/Task Manager are:

Accept 4550: Selecting Accept on the form indicates that the Task Manager accepts the Requested Changes to the Task.

Reject 4555: Selecting Reject on the form indicates that the Task Manager does Not accept the Requested Changes to the Task.

Comment 4560: Enables the Viewer/Task Manager to enter a comment that will be part of the notices generated upon submittal.

Every Task that of which a particular User Page 300 is the performer must have a unique Name. Changing the Task Name can present a Naming Conflict if the change is accepted and the Task Performer is already Performing a different Task with the proposed new Task Name. If the Naming Conflict exists, an error message is posted indicating that the Request Must be Rejected.

Selecting the Submit & Close button 4565 will make checks including those mentioned above and that the Task Performer and Task Manager of the selected Task are the Manager or Members of the Team they are requested to be attached to. If there are problems, error messages are posted. If no problems, for an accepted request: the changes are implemented, the browser 5560 is closed and appropriate notices are sent out. For a rejected request, the browser 5560 is closed and notice is sent out.

Dependencies 383:

Clicking the Dependencies 383 Button redirects the browser 5560 to a Change Task Dependencies form 4600 that allows the Viewer to change (or initiate the process of changing) the selected Task's Dependencies (FIG. 46). In addition to what is shown in the figure, additional details include: The Task 4605 and its current Parent 4615 are Identified, and a link 4610 to the Task's 4605 definition is provided.

Parent 4620: This allows the Viewer to change/request the change of the selected Task's Parent Task. The Task will become a Sub-Task of the Identified Parent Task (if one is Identified and approved if necessary). "Keep Current Parent" and "No Parent" are added to the previous Parent Task selection list discussed above.

Predecessor(s) 4625 (w/ or w/o overlap 4630): The User is able to Select Different Predecessor(s) 4635 for the selected Task with this form, select that there are no Predecessor(s) for the Task or select to keep the Task's Current Predecessor(s). The User can also Identify if the Selected Task will be allowed to overlap its Predecessor(s) 4640. The User may also be able to input a comment for the Predecessor(s).

Successor(s) 4645 (w/ or w/o overlap): The User is able to Select Different Successor(s) 4650 for the selected Task with this form, Select that there are no Successor(s) for the Task or select to keep the Task's Current Successor(s). The User can also Identify if the Selected Task will be allowed to overlap its Successor(s) 4655. The User may also be able to input a comment for the Successor(s).

A Task's Parent, Predecessor(s) and Successor(s) combine to form a window of time that the Task must be performed within. (This window calculation is described above (with the FIG. 14 description) and below) A Rule is that a window of time must exist for the performance of this Task or an error message will be posted.

Selecting the Continue button 4665 will make checks including those associated with the rules mentioned above. If there are problems, error messages are posted. If no problems, the browser 5560 is redirected to the Change Task Schedule form 4700 (FIG. 47). Selecting the Cancel button 4670 will just redirect the browser 5560 to the Page that Dependencies button was selected on. Changing a Task's Dependencies can change its Task Window therefore the next step in this process is providing user with the opportunity/requirement to modify the Task's schedule on the Change Task Schedule form 4700. In addition to what is shown in the figure, additional details include: The Task is Identified 4705 and a link 4706 to its definition is provided.

The Change Task Schedule form 4700 contains a "Current task window" 4710 and a "Suggested task window" 4715. The Current task window 4710 is calculated using the selected Task's current dependencies. The Suggested task window 4715 is calculated using the selected Task's newly suggested dependencies.

A Task's Window is determined by the Selected Task's Dependencies (Parent, Predecessor(s) and Successor(s)) and their allowed overlaps. As described above, a Task must be scheduled between the Start and Finish time of its Parent task. If a Task has Predecessor(s) and overlap is not allowed then the Task cannot be scheduled to start until the Predecessor's finish time. If overlap is allowed then the Task is Not allowed to be scheduled to finish until after the predecessor's finish time. If a Task has Successor(s) and overlap is not allowed then the Task must be scheduled to finish before (or equal) the Successor's start time. If overlap is allowed then the Task must be scheduled to finish before the Successor's finish time. If there is no restriction "open" is shown. The Task Window is determined by combining these rules and a Task must be scheduled within its window.

The selected Task's Current Start 4720 and Finish 4725 times are also displayed along with their possibly associated UCP and Duration 4726.

Start Time (current 4730, now 4735, upon completion of predecessor 4740, date & time 4745)

(4) There are four input options for the selected Task's Start time. Current 4730: This will use the Task's currently scheduled start time. Now 4735: This will use the time that the Submit button on this form is selected. Upon Completion of Predecessor (UCP) 4740: This option can only be used if the selected Task has a Predecessor and Predecessor Overlap is not allowed. The Predecessor's scheduled finish time is used as the selected Task's Start Time. Select Start Date & Time 4745: The user inputs the Date and Time they wish the selected Task to be scheduled to start.

Finish Time (current 4750, duration 4755, date & time 4760)

(5) There are three input options for the selected Task's Finish time. Current 4750: This will use the Task's currently scheduled finish time. Duration 4755: This enables the User to identify a period of time after the selected Task is scheduled to Start that they want it to be scheduled to finish. Select Completion Date & Time 4760: The user inputs the Date and Time they wish the selected Task to be scheduled to Finish.

Identified Start and finish times must be within the Task Window. On this form, for the change Dependencies process, the Identified Start and Finish time for the selected task are checked against the Suggested task window.

A Task's Finish Time Must be after its Start Time.

Comment for the notice(s) or the Request that is sent via a Requested Operation to the Task's Manager. This routing is determined by the rules outlined on the Change Task Schedule form 4700.

Changing The selected Task's schedule can affect the Task Window and/or Schedule for both the selected Task's Downstream Tasks and Sub-Tasks (and the Sub-Task's downstream tasks). The system will make the necessary and appropriate checks when the new schedule is submitted (and approved if necessary) and the necessary and appropriate schedule modifications will be made and notifications will be sent out.

Selecting the Back button 4780 will redirect the browser 5560 back to the previous Change Task Dependencies form 4600. Selecting the Cancel button 4785 will just redirect the browser 5560 to the Page the Dependencies button 383 was selected on. Selecting the Submit button 4775 will make checks including those associated with the rules mentioned above. If there are problems, error messages are posted. If no problems, the changes are either implemented and the appropriate notices are sent out or a Requested Operation is launched. (Either way the browser 5560 is redirected to the Page the Dependencies button was selected on.) This routing is determined by the rules outlined on the Change Task Schedule form 4700 and shown below. Rule F1: If you are the task's Task Manager or you are the Team Manager of a Team that this task is attached to THEN this task will be changed when you submit this form and notices will go out.

Rule F2: Otherwise your requested changes will be routed to the task's Task Manager for Approval. You will be notified of their response.

When Rule F2 above is enforced, a Requested Operation is launched. This Requested Operation currently sends an email to the email address associated with the Snowflake Page that is The selected Task's Manager. A link in the email takes the selected Task's Manager to a Change Task Dependencies Request form 4800 (FIG. 48). (The selected Task's Manager must be logged into the SP to access the form.) The information on the Change Task Dependencies Request form 4800 includes: Identifying the Request 4805, A link to the task's definition 4810, Comment from the Requestor 4815, The Current Parent 4820, Predecessor(s) 4825 and Successor(s) 4835 (with their associated overlaps 4830) and the Suggested Parent 4840, Predecessor(s) 4845 and Successor(s) 4855 (with their associated overlaps 4850). The Current 4860 and Suggested Task Windows 4865 are also shown as are the Current 4870 and Suggested 4875 Start and Finish Times (with their associated UCP or Duration 4871).

Along with the other information on the Change Task Dependencies Request form 4800, the inputs for the Viewer/Task Manager are:

Accept 4880: Selecting Accept on the form indicates that the Task Manager accepts the Requested Task Dependencies Schedule Changes.

Reject 4885: Selecting Reject on the form indicates that the Task Manager does Not accept the Requested Task Dependencies Schedule Changes.

Comment 4890: Enables the Viewer/Task Manager to enter a comment that will be part of the notices generated upon submittal.

Start and finish times must be within the Task Window. On the Change Task Dependencies Request form 4800, for the change Dependencies process, the Suggested Start and Finish time 4875 for the selected task are checked against the Suggested task window.

Selecting the Submit & Close button 4895 will make checks including those mentioned above. If there are problems, error messages are posted. If no problems, for an Accepted request: the changes are implemented, the browser 5560 is closed and appropriate notices are sent out. For a Rejected request, the browser 5560 is closed and notice is sent out.

Figure 49:
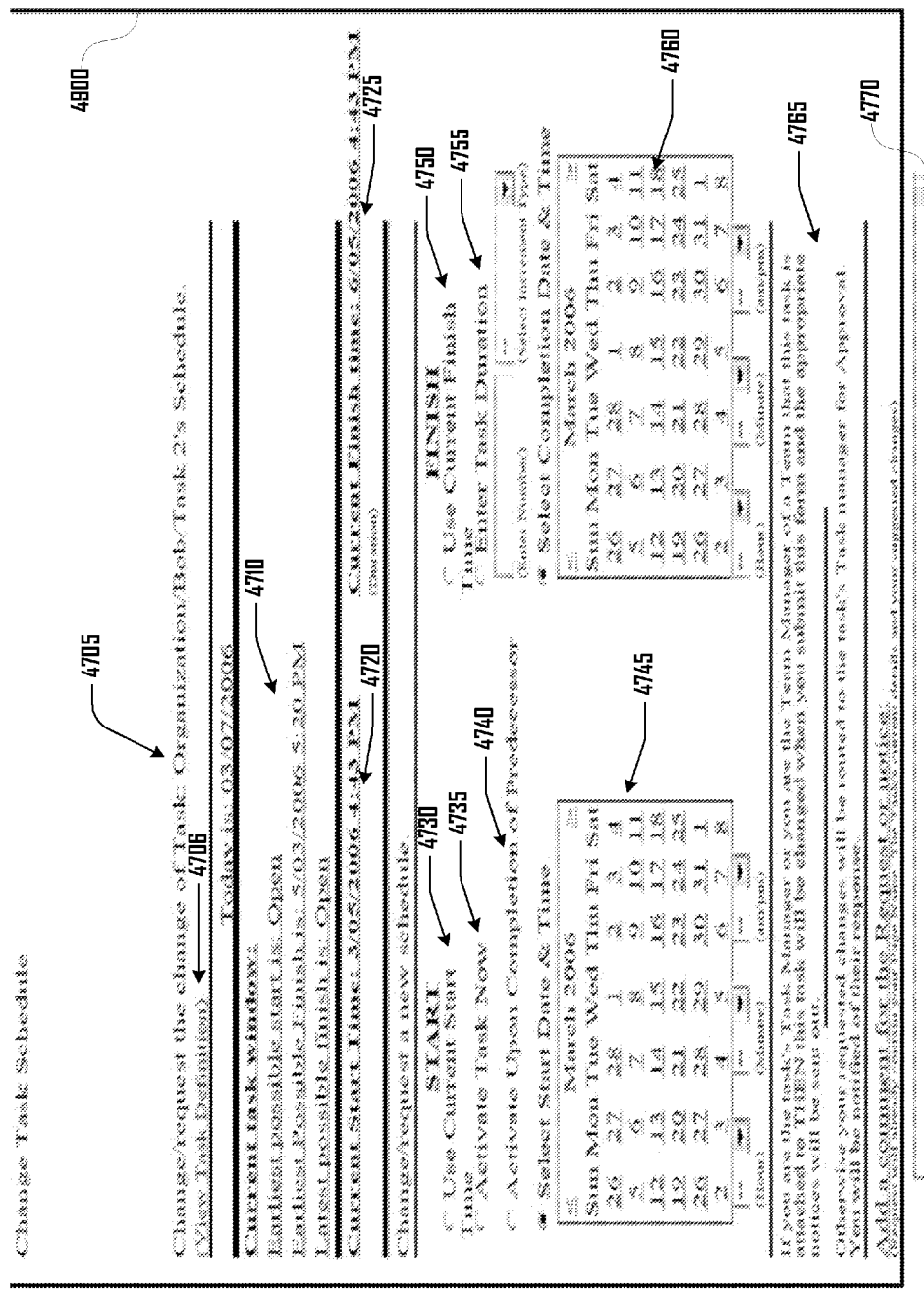
FIG. 49 is an illustration of a Change Task Schedule form, in accordance with one embodiment.

Schedule 384:

Clicking the Schedule 384 Button redirects the browser 5560 to a Change Task Schedule form 4900 that allows the Viewer to change (or initiate the process of changing) the selected Task's Schedule (FIG. 49). The Change Task Schedule form 4900 is similar to the Change Task Schedule form 4700 except that, for the Change Schedule process, only the Current task window 4710 is shown and the Identified Start 4720 and Finish 4725 times for the selected task are checked against the Current task window. The Change Task Schedule form 4900 also does not have a back button.

For additional details see the Change Task Schedule form 4700 description above. The submittal process for the Change Schedule process (FIG. 49) is also different than the submittal process for the Change Dependencies process (FIG. 47)

Selecting the Submit button 4975 on the Change Task Schedule form 4900 will make checks including those associated with the rules mentioned above. If there are problems, error messages are posted. If no problems, the changes are either implemented and the appropriate notices are sent out or a Requested Operation is launched. (Either way the browser 5560 is redirected to the Page the Schedule button 384 was selected on.) This routing is determined by the rules outlined on the Change Task Schedule form 4900 and shown below. Rule G1: If you are the task's Task Manager or you are the Team Manager of a Team that this task is attached to THEN this task will be changed when you submit this form and notices will go out.

Rule G2: Otherwise your requested changes will be routed to the task's Task Manager for Approval. You will be notified of their response.

When Rule G2 is enforced, a Requested Operation is launched. This Requested Operation currently sends an email to the email address associated with the Snowflake Page that is The selected Task's Manager. A link in the email takes the selected Task's Manager to a Change Task Schedule Request form 5000 (FIG. 50). (The selected Task's Manager must be logged into the SP to access the form.) The information on the Change Task Schedule Request form 5000 includes: Identifying the Request 5005, A link to the task's definition 5010, Comment from the Requestor 5015, the Current Task Window 5020 and the Current 5025 and Suggested 5030 Start and Finish Times (with their associated UCP or Duration 5026).

Along with the other information on the form (FIG. 50), the inputs for the Viewer/Task Manager are:

Accept 5035: Selecting Accept on the form indicates that the Task Manager accepts the Requested Task Schedule Change.

Reject 5040: Selecting Reject on the form indicates that the Task Manager does Not accept the Requested Task Schedule Change.

Comment 5045: Enables the Viewer/Task Manager to enter a comment that will be part of the notices generated upon submittal.

Checked rules include; Identified Start and finish times must be within the Task Window. On this form, for the change Schedule process, the Suggested Start and Finish time for the selected task are checked against the Current task window. A Tasks Finish Time Must be after its Start Time.

Selecting the Submit & Close button 5050 will make checks including those mentioned above. If there are problems, error messages are posted. If no problems, for an accepted request: the changes are implemented, the browser 5560 is closed and appropriate notices are sent out. For a rejected request, the browser 5560 is closed and notice is sent out.

Changing The selected Task's schedule can affect the Task Window and/or Schedule for both the selected Task's Downstream Tasks and Sub-Tasks (and the Sub-Task's downstream tasks). The system will make the necessary and appropriate checks when the new schedule is submitted (and approved if necessary) and the necessary and appropriate schedule modifications will be made and notifications will be sent out.

Delete Task 385:

Clicking the Delete Task 385 Button redirects the browser 5560 to a Delete Task form 5100 that allows the Viewer to Delete (or initiate the process of deleting) the selected Task (FIG. 51). In addition to what is shown in the figure, additional details include: The Task is identified 5110 and a link 5110 to its Definition is provided.

Comment 5120 for the notice(s) or the Request that is sent via a Requested Operation to the Task's Manager. This routing is determined by the rules outlined on the Delete Task form 5100.

Selecting the Cancel button 5130 will just redirect the browser 5560 to the page the Delete Task button 385 was selected on.

Selecting the Submit button 5125 will make checks including those mentioned above. If there are problems, error messages are posted. If no problems, the Deletion is either implemented and notices are sent out or a Requested Operation is launched. This routing is determined by the rules 5115 outlined on the Delete Task form 5100 and shown below. Rule H1: If you are the Task's Task Manager or you are the Team Manager of a Team that this Task is attached to THEN this Task will be deleted when you submit this form and notices will go to You and the Task's Performer, Manager, Parent, Predecessor, Successor, Immediate Sub-Task's as well as the Team Manager if this is a Team Task. No one page will receive more than one notice.

Rule H2: Otherwise your request for Task deletion will be sent to the Task's Task Manager for Approval and you will be notified of this routing and the Task Manager's response.

When Rule H2 is enforced, a Requested Operation is launched. This Requested Operation currently sends an email to the email address associated with the Snowflake Page that is The selected Task's Manager. A link in the email takes the selected Task's Manager to a Delete Task Request form 5200 (FIG. 52). (The selected Task's Manager must be logged into the SP to access the form.) The information on the form includes: Identifying the Request 5205, a link 5210 to the Task's definition and a Comment 5215 from the Requestor. Along with other information on the Delete Task Request form 5200, the inputs for the Viewer/Task Manager are:

Accept 5220: Selecting Accept on the form indicates that the Task Manager accepts the Request to Delete the selected Task.

Reject 5225: Selecting Reject on the form indicates that the Task Manager does Not accept the Request to Delete the selected Task.

Comment 5230: Enables the Viewer/Task Manager to enter a comment that will be part of the notices generated upon submittal.

Selecting the Submit & Close button 5235 will make checks including those mentioned above. If there are problems, error messages are posted. If no problems, for an accepted request: the Deletion is implemented, the browser 5560 is closed and appropriate notices are sent out. For a rejected request, the browser 5560 is closed and notice is sent out.

Other Lists 340, 350, 360, 370

The next elements of a User Page 300 are the Managed Group 340, Member Group 350, Teams Managed 360, and Teams Member 370 lists.

Managed Group 340, Member Group 350, Teams Managed 360, and Teams Member 370 lists are also discussed above in the View Sub-Pages section.

A group consists of a Snowflake Page and the Pages that it is the Manager Page of (its immediate Sub-Pages). See FIGS. 3, 20, and 21.

Managed Group 340: Lists the group(s) 341 that the Viewed Page is the Manager of.

From the User Page View, the listed Pages 341 are hyperlinks that open a window filled with the Sub-Page View of the selected Page (Manager Page can not link to a Sub-Page View of its self).

From a Sub-Page View the listed Pages 340 include hyperlinks by which the current window is redirected to the Sub-Page View of the Selected Page (Viewer can not link to a Sub-Page View of the Sub-Page it is Viewing). This Process enables the Viewer to "Drill Down" into their Organization/Snowflake. Member Group 350: Lists the group(s) 351 that the Viewed Page is a Member of.

From the User Page View, the listed Pages 351 are NOT hyperlinks. This is due to the current Rule that a User cannot View their Peer's Pages or the Pages "above" Them in the organizational hierarchy.

From a Sub-Page View the listed Pages 351 include hyperlinks by which the current window is redirected to the Sub-Page View of the Selected Page. (Viewer can not view a Sub-Page View of their own Page or the sub-Page they are currently viewing)

This Process enables the Viewer to "Drill Around" within their Organization/Snowflake. Teams Managed 360: Lists Team(s) 361 Managed by Page being viewed.

From the User Page View, the listed Teams 361 are hyperlinks that open a window filled with the Team Page of the selected Team. The Team Page has a Close button That Closes the window.

From a Sub-Page View the listed Pages 361 include hyperlinks by which the current window is redirected to the Team Page of the Selected Team. This Team Page has a Back Button.

Hidden Teams are only listed when the Viewer is the Team Manager or a Team Member. When shown, Hidden Teams have a slightly different Background color on the list.

Teams Member 370: Lists Teams the Page being viewed is a Member of.

From the User Page 300 View, the listed Teams are hyperlinks that open a window filled with the Team Page of the selected Team. The Team Page has a Close button That Closes the window.

From a Sub-Page View the listed Pages include hyperlinks by which the current window is redirected to the Team Page of the Selected Team. This Team Page has a Back Button.

Hidden Teams are only listed when the Viewer is the Team Manager or a Team Member. When shown, Hidden Teams have a slightly different Background color on the list.

Additional Items Not Shown/discussed Include but are not limited to:
- The SP may include Responsibility, Objective, Skills and Expertise (R.O.S.E.) Functionality. This functionality will enable responsibilities, objectives, skills and expertise to be "attached" to User Page 300s and in turn to Tasks etc. These User Page 300 attributes will have various visibilities and be "searchable" throughout the Snowflake Universe (relative to their visibility). They can also be part of performance reports. Manager Pages will be able to assign (and modify) these attributes to their Sub-Pages and Sub-Pages will be able to ask their Manager Page to approve the addition of and/or modification of these attributes attached to their Page. Other User Page 300s, including Team Manager Pages, may also be able to attach/request the attachment of these attribute types to other User Page 300s.
- Internal Snowflake and external Searches etc may also be integrated into the application.
- The SP may include a variety of Reports including Performance and Expense.
- The SP may maintain a custom Contact List for each User Page 300 along with methods for expediting the sending of messages etc to other Snowflake Pages.
- Calendars and Document management methods that take advantage of the SP's structure may also be integrated into the application (i.e. Page, Group, Department, Snowflake, Snowflake Universe, Team and Process etc.)
- Additional Task related functionality may include:
- "Done For the Day" Repetitive Tasks and "Bull Pen" Tasks
- Allocate/Move and Delete Multiple Tasks at one Time or request multiple User Page 300s to take over various responsibilities for a Task with the first to accept the task ending the process with the appropriate data modifications made and notices sent out etc.
- Task Notes
- Clock in and out etc.
- The SP may develop and/or integrate 3rd Party functionality (including task specific functionality, communication/collaboration functionality and back end business systems etc.)
- Additional Security, authority hierarchy rules, Agent and Scheduling engine Functionality may be developed.

As noted above, the SP works in a Rules-Based organization environment. Accordingly, exemplary sets of task rules, user page rules, team rules, first user page rules and authority rules (manager, team manager and task manger rules) are briefly described below. While these provide one workable set of rules, other embodiments may employ more a or less rules.

Task Rules:
(1) Every task must have a name
(2) Every task who's Performer is the same must have a unique name
(3) The Full name of a task is <Company Name>/<Performer Name>/<Task Name> When displayed <Company Name> is not displayed if the logged in Page is in the same company.
(4) Every task must have a description.
(5) Every task must have 1 and only 1 Performer
(6) Every task must have 1 and only 1 Manager
(7) A Task attached to a Team must be Performed and Managed by a Member or the Manager/Owner of that team.
(8) Every task must have 1 and only 1 Creator
(9) Every task must have a Start Time & a Finish Time
(10) A Task's finish time must be after the start time.
(11) A Task can only have one Predecessor & one Successor
(12) A task cannot be assigned as a dependency task if it is late or Percent Complete is 100.
(13) A task has to be scheduled in its Window (see code for definition of the window).
(14) A task can only be a UPC task if it has a Predecessor.
(15) Every task must have a Priority
(16) A task must have a visibility.
(17) A task that is Hidden can only be seen by the task performer, Manager, potential new manager, or potential new performer. Also sometimes it can also been seen by its immediate parent, children, predecessor, and successor. Also it can also sometimes see a task X if you are currently viewing another task whose is a child of task X, a immediate predecessor of X, or a immediate successor of X.
(18) Every task must have a percent complete
(19) A percent complete of one hundred will not be accepted if the Task's Predecessor AND all its Sub-Task's are not 100 percent complete
(20) A percent Complete can not be greater than one hundred
(21) Every task must have a Status Explanation
(22) A Task's percent Complete and Status explanation can only be modified by the Task Performer
(23) A Task's Warning time can only be viewed and modified by the Task Performer
(24) When Creating a Task: (a) If you are a Team Manager Creating a Team Task to be Performed & Managed by Team Member(s) OR you are the Manager Page of the new Task's Recipient (Performer &/or Manager) OR You are the Recipient (Performer &/or Manager) THEN the Task will be assigned and the appropriate notices will be sent out. (b) ELSE the Task will be assigned AND a RO will be sent out that will allow the recipient to give the Task back.
(25) Changing Task Manager and/or Performer: (a) If you are a Team Manager changing task Performer or Manager from one Team Member to another OR you are the Task Manager changing Task Performer or Manager to one of your immediate Sub-Pages (or yourself in the case of changing Task Performer) THEN the change will be implemented and the appropriate notices will be sent out. (b) If you are the Task Manager (Not Team Manager) changing Task Performer or Manager to a Page that is NOT one of your immediate Sub-Pages THEN a change request RO will be sent to and must be Accepted by the potential new Task Performer or Manager. (c) All other Task Performer or Manager changes will be sent (via an RO) to the Task Manager for approval and if necessary final Acceptance must be received from the potential new Task Performer or Manager. (Final Acceptance from the ultimate "Recipient" is required IF they are Not the Task Manager's immediate Sub-Page, the immediate Sub-Page of the Request Initiator or the Request initiator (?Task Manager? for performer or does this go to RO1ChangeTaskPerformer) (the Additional RO is also not required if the current Task Manager is the Team Manager of a Team task we are dealing with (But this situation would follow path a. above))

(26) When Changing "Task", "Schedule", "Dependencies" or "Deleting" a Task: (a) If you are the task's Task Manager or you are the Team Manager of a Team that this task is attached to THEN the change or deletion will be implemented when you submit the form. (b) Otherwise your requested change or deletion will be routed (via a "Task", "Schedule", "Dependencies" or "Deleting" RO) to the task's Task manager for Approval.

(27) When changing a Task's Dependencies its Schedule must also be re-evaluated (its window may have changed)

(28) A task status cannot be 100 percent unless all of its sub-tasks are 100 percent complete and its predecessor is 100 percent complete.

(29) The task name cannot contain a "/".

(30) A task cannot have a Empty Name.

(31) Email notifications only go out from a Task if its "Save" method was called directly by the front end. If it is call from another area in the middle tier its notifications are disabled.

User Page Rules:

(1) Every Page must have Organization.

(2) A Page cannot have more than 1 Manager Page (3) Page that creates a Sub-Page is the Sub-Page's initial Manager Page (4) Every Page must have a name.

(5) Every Page in the same Organization must have a unique name.

(6) The Full name of a Page is <Organization Name>/<Page Name> When displayed <Organization Name> is not displayed if the logged in Page is in the same organization.

(7) Every Page must have a department.

(8) Every Page must have an email address.

(9) Only a Page with no Manager can modify its Organization object (Snowflake Name).

(10) Only a Page with no Manager can modify its own Name.

(11) Only a Page with no Manager can modify its own Department.

(12) Only a Page with no Manager can initiate an RO to Move itself.

(13) A Page with no Manager can only be Moved if it has NO Sub-Pages.

(14) A Page with no Manager can only be Deleted if it has NO Sub-Pages and is the Manager of NO Teams.

(15) Only a Manager Page can: (a) Initiate a RO to Change the Manager Page of one of its Direct Reports. (b) Create a new Snowflake by "Moving Out" a Direct Report Sub-Page or Branch (NO RO is launched in this situation). (c) Delete a Direct Report Sub-Page

(16) If a Move/Change Manager RO is accepted (this would be for moves within the Same Snowflake, to a Different Snowflake, or a single Page move to a New Snowflake), the Moved Page's Sub-Pages (if any) will move up one level in the hierarchy and become Sub-Pages to the Page that initiated the Change Manager RO (the moved page's old Manager Page)

(17) A Deleted Page's Sub-Pages (if any) will move up one level in the hierarchy and become the deletor's Sub-Pages

(18) 18 Deletor (Manager Page) will also become the New Manager of any Standard Visibility Teams that the Sub-Page is the current Manager of.

(19) 19 Hidden Visibility Teams Managed by the Deleted Sub-Page will be Deleted

(20) Tasks on the Deleted Sub-Page and on a First User Page are automatically dealt with by the System as follows: (Standard Visibility Tasks) (a) IF the Deleted Page is Task Performer only THEN Task Manager becomes Performer & Manager (b) IF Deleted Page is Task Manager only THEN the Deleted Page's Manager Page (page doing the deleting) Becomes the Task Manager UNLESS the Task is attached to a Team AND the Manager Page is NOT a Team member or Manager THEN The Team Manager becomes the Task Manager (c) IF Deleted Page is Task Manager AND Task Performer THEN the Deleted Page's Manager Page (page doing the deleting) Becomes the Task Manager & Task Performer UNLESS the Task is attached to a Team AND the Manager Page is NOT a Team member THEN The Team Manager becomes the Task Manager & Task Performer (Hidden Visibility Tasks) (i) IF the Deleted Page is Task Performer only THEN Task Manager becomes Performer & Manager (ii) IF the Deleted Page is Task Manager only THEN:—IF the Task is attached to a HIDDEN Team THEN The Team Manager becomes the Task Manager—IF the Task is NOT attached to a HIDDEN Team THEN Task Performer becomes Performer & Manager (iii) IF Deleted Page is Task Manager AND Task Performer THEN:—IF the Task is attached to a HIDDEN Team THEN The Team Manager becomes the Task Manager & Task Performer—IF the Task is NOT attached to a HIDDEN Team THEN Task is Deleted.

(21) A page must have a visibility.

(22) Creation date and time defaults to current date and time during the save if the page is a new page.

(23) You can't change a sub pages manager to be in a different snowflake unless you all of the sub pages reports do not move to the new snowflake but instead become sub pages of the moved sub page's manager. ("Move SubPage").

Team Rules (Not required—a Task does not have to be attached to a Team):

(1) Every Team must have one and only one Owner/Manager (2) Page that creates a Team is the Team's initial Manager/Owner (3) Every Team must have a Name (4) All Teams Managed by members of a particular Snowflake must have a unique Name (5) The Full name of a team is <Snowflake Name of Team Manager/Team Name>. When displayed <Organization Name> is not displayed if the logged in Page is in the same organization.

(6) A Team must have a Goal/Purpose (7) A Team must have a Visibility (8) Hidden visibility Teams can only be seen by their manager/owner and members (9) Hidden visibility Teams will be deleted when/if their Manager/Owner page is deleted. All team tasks become non-team tasks.

(10) Only a Team Manager/Owner can: (a) Initiate a RO that will invite A Page(s) to become Part of the Team (b) Remove team Members from the Team (c) Modify a Team (Name, Goal/Purpose and Visibility) (d) Initiate a RO to Change the Team Manager/Owner (e) Delete a Team

(11) A page cannot be a member of a team without a RO (Invite Member or Change Manager)

(12) A page cannot be a member of a team twice.

(13) When a Page is removed from a Team all their Team tasks responsibilities (task manager or task performer for tasks attached to the team they have been removed from) are assigned to the Team Owner.

(14) IF, when changing Team Manager, the Team Manager chooses Not to remain part of the team And the Team Management Allocation is Accepted, the New Team Manager Will receive all of their Task Responsibilities for Tasks attached to this Team.

(15) When a Team is deleted the team tasks Manager and Performer responsibilities will stay as they are but these tasks will no longer be attached to a Team.

The SP enables its users to Create, View, Modify, Move (i.e. change manager), or Delete:

Snowflakes and "first User Pages"
User Pages for Direct Reports
Teams
Tasks

Creation:

Creation of these elements automatically populates the snowflake data 5660 and sends out notices to the appropriate Users. Relationships between the newly created element and previously created elements are recorded.

Snowflakes and first user Pages may be created via a server website. User Pages for Direct Reports, Teams and Tasks may be created via User Pages.

Viewing:

Viewing these elements is enabled via each user's User Page. An example embodiment provides each Snowflake User with their own User Page that contains lists and navigation enabling them to view their Direct Report's User Pages, the Team Pages of Teams they are part of, and Tasks they are the manager or performer of.

Modifying:

Modifying elements is enabled via each user's User Page and governed by the system's automated Authority Rules (see "Authority Rules" below). Modifications attempted by a User for which the User has authority are immediately implemented and notices are sent out to the appropriate Users.

Modifications attempted by a User for which the User does NOT have authority are automatically routed to the User with authority for approval or rejection—the User initiating the attempted modification is immediately notified of the routing. If the Modification is rejected, the initiator is notified and the modification is NOT implemented. If the Modification is accepted, the modification is implemented and notices are sent out to the appropriate Users.

Currently, inviting a User to become a Team Member requires the potential new Team Member to accept or reject the invitation. (This situation however may change in the future and be integrated into the authority hierarchy.) If the "Invitation" is rejected, the initiator is notified and the invited User does NOT become part of the Team. If the invitation is accepted, the invited User does become part of the Team and notices are sent out to the appropriate Users.

Moving

Moving—Changing the Manager of a Direct Report's User Page or a Team managed by the User is enabled via each user's User Page and currently always requires the potential New Manager to accept or reject the move. (These situations however may change in the future and be integrated into the authority hierarchy.) If the "Move" is rejected, the initiator is notified and the move is NOT implemented. If the move is accepted, the modification is implemented and notices are sent out to the appropriate Users.

Deleting

Deleting these elements associated with each user is enabled by each User's User Page and governed by the system's automated Authority Rules. Authority Rules as well as other User Page, Team, Task and notification Rules come into play.

Authority rules—(Manager page, Team manager, Task Manager):

First User Page:
(1) Only a Page with no Manager can modify its Organization object (Snowflake Name).
(2) Only a Page with no Manager can modify its own Name.
(3) Only a Page with no Manager can modify its own Department.
(4) Only a Page with no Manager can initiate an RO to Move itself.

Manager Page:
(1) Manager Page=>Delete a Direct Report Sub-Page
(2) Manager Page=>Change its direct reports Name & Department
(3) Manager Page=>Create Tasks for Direct Reports (without their approval)
(4) Manager Page=>Change/Assign Task Performer or Manager (of a task the Manager Page is Task Manager of) to one of its immediate Sub-Pages
(5) Manager Page=>Initiate a RO to Change the Manager Page of one of its Direct Reports
(6) Manager Page=>Create a new Snowflake by "Moving Out" a Direct Report Sub-Page or Branch (NO RO is launched in this situation)

Team Manager:
(1) Team Manager=>Delete a Team
(2) Team Manager=>Initiate a RO that will invite A Page(s) to become Part of the Team
(3) Team Manager=>Remove team Members from the Team
(4) Team Manager=>Modify a Team (Name, Goal/Purpose and Visibility)
(5) Team Manager=>Initiate a RO to Change the Team Manager/Owner
(6) Team Manager=>Create Team Tasks for Team Members (without their approval)
(7) Team Manager=>Change Team Task's task Performer or Manager from one Team Member to another (without approval of Task Manager or new Task Performer or Manager)
(8) Team Manager=>Change Team Task's "Task", "Schedule", "Dependencies" or "Delete" the Task (without approval of Task Manager)

Task Manager:
(1) Task Manager=>Change "Task", "Schedule", "Dependencies" or "Delete" the Task
(2) Task Manager=>Approve change requests (ROs) (Made by someone other than Task Manager (or Team Manager for Team Tasks)) to change "Task", "Schedule", "Dependencies" or "Delete" the Task
(3) Task Manager=>Change Task Performer or Manager to one of its immediate Sub-Pages (or itself in the case of changing Task Performer) (a) Task Manager (Not Team Manager) changing Task Performer or Manager to a Page that is NOT one of your immediate Sub-Pages THEN a change request RO will be sent to and must be Accepted by the potential new Task Performer or Manager. (b) All other Task Performer or Manager changes will be sent (via an RO) to the Task Manager for approval and if necessary final Acceptance must be received from the potential new Task Performer or Manager. (Final Acceptance from the ultimate "Recipient" is required IF they are Not the Task Manager's immediate Sub-Page, the immediate Sub-Page of the Request Initiator or the Request initiator (?Task Manager? for performer or does this go to RO1ChangeTaskPerformer)

Although specific embodiments have been illustrated and described herein, it will be appreciated by those of ordinary skill in the art that a wide variety of alternate and/or equivalent implementations may be substituted for the specific embodiments shown and described without departing from the scope of the present invention. This application is intended to cover any adaptations or variations of the embodiments discussed herein.

The invention claimed is:

1. A computer-implemented method to manage activities and resources of an organization on a rule-based platform, including allowing a user to access, view, and modify organizational resources, the organizational resources including an organizational task, a team, individual users, and/or a direct report, the method of managing based on an evaluation of attributes of at least the organizational resource by at least one rule controlling the activity to determine if the user is allowed to perform the activity, the method comprising:

storing a representation of at least one organization's structure in memory, the representation including layers of separate but integrated authority structures including an organizational authority hierarchy layer mapping an organizational chart of the organization within which authority is granted to the user to perform certain activities including accessing, viewing, and modifying another user based on the relative position of the user to the other user in the organizational authority hierarchy layer as determined by a dynamic real time evaluation of attributes of the other user and, when the user and the other user are not directly connected in the organizational chart, the dynamic real time evaluation also including attributes of intervening members in the organizational authority hierarchy layer, a team authority hierarchy layer within which authority to perform certain activities including accessing, viewing, and modifying a team is granted to the user based on a real time evaluation of the attributes of the team that may include a team manager and/or team member attributes of the team, and a task authority structure layer within which authority to perform certain activities including accessing, viewing, and modifying a task is granted to the user based on a real time evaluation of the attributes of the task that may include a task manager and/or task performer attributes of the task, each of the layers overlap and create the integrated authority structure by which the at least one rule of each activity dynamically evaluates attributes from any combination of layers at real time to determine if an activity is allowed by the user;

identifying, by a processor, at least the attributes evaluated by the at least one rule of the activity;

evaluating, by the processor, the identified attributes, according to the at least one rule of the activity, to determine if the activity is allowed by the user;

granting, by the processor, authority to perform the activity to the user according to the at least one rule evaluating the attributes of at least the resource the user is attempting to interact with to determine if the requested activity is allowed by the user based at least on a relationship of the user to the respective task, team, individual user and/or direct report in the integrated authority structure of the rule based platform as defined by the attributes of the respective task, team, individual user and/or direct report; and executing, by the processor, the allowed requested activity according to authority granted to the user.

2. A system for implementing organizational actions on a rule-based platform where the ability of a requesting user to direct the system to perform an action is based on an evaluation of relationship attributes of a task, a target user, a direct report, and/or a team that the requesting user is attempting to act upon by a processor as directed by at least one rule controlling the action, the system comprising:

a server in network communication with at least one terminal, the terminal having a display and an interface, the server including:

a memory upon which is resident the following:

a members table having at least one member with a unique member identification attribute and manager attribute;

a team table having at least one team with unique team identification, team manager, and team member attributes; and a task table including at least one task definition with unique task identification, task manager, and task performer attributes;

a processor for generating in memory at least one relation between the at least one task and/or the at least one team and the at least one member; and a network interface for communicating a user page, a task page, a team page, and/or a direct report sub-page for display at the terminal, the task page, the user page, the team page, and/or the direct report sub-page configured to direct the processor to perform an action attempted by the requesting user and regarding the task, the target user, the direct report, and/or the team, wherein the rule-based platform allows the processor to perform the action relating to the task, the target user, the direct report, and/or the team according to at least one rule of the action evaluating at least one relationship attribute of at least the task, the target user, the direct report, and/or the team that the requesting user is attempting to interact with to determine whether the action is allowed by the requesting user based at least on the relationship of the requesting user to the task, the target user, the direct report, and/or the team as defined, at least in part, by the at least one attribute of at least the task, the target user, the direct report, and/or the team that the requesting user is attempting to interact with that is interpreted by the at least one rule of the action to determine the situational authority of the requesting user.

3. The system of claim 2, wherein the platform is configured to allow the processor to perform an action relating to the task, the user, the direct report, and/or the team, when the rule-based platform determines based on attributes that the requested action is allowed, the action selected from at least one of: Create, Access, View, Modify, Move and Delete.

4. The system of claim 3, wherein the platform, when a user with insufficient authority makes a request directing the processor to perform the action, sends a request to an authorized user with authority to complete the requested action.

5. The system of claim 4, wherein the authorized user with the suitable authority is identified based upon rules associated with the action.

6. A computer-implemented method allowing a user to populate a member table of members stored on a server connected to a terminal by a network, the member table having attributes used to create an organizational hierarchy authority layer based on an organizational chart, the method comprising:

in response to a request, received at the server from the terminal, adding a member to the member table, the adding including assigning a unique member identification attribute and a manager page relationship attribute to the added member in the member table;

granting, by a processor, at least one other member access to a user page of the added member according to at least one rule evaluating at least one attribute of at least the added member to determine whether access by the at least one other member is allowed based at least on the relative position of the at least one other member to the added member in the organizational hierarchy based on the organizational chart as determined by a dynamic real time evaluation of the relationship attributes of the added member and of the relationship attributes of intervening members in the organizational hierarchy when the added member and the at least one other member are not directly connected in the organizational hierarchy;

granting, by the processor, the added member access to a user page of at least one other member according to at least one rule evaluating at least one attribute of at least the other member to determine whether access by the added member is allowed based at least on the relative position of the added member to the other member in the organizational hierarchy based on the organizational chart as determined by a dynamic real time evaluation of the relationship attributes of the at least one other member and of the relationship attributes of intervening members in the organizational hierarchy when the added member and the at least one other member are not directly connected in the organizational hierarchy; and dynamically generating, according to granted access, user pages at the terminal by retrieving data from the member table.

7. The method of claim 6, further including:

in response to another request, received at the server from the terminal, granting the member authority over a user page of another member according to attributes of at least the other member used to determine the relative position of the member to the other member, associated with the other member user page, in the organizational hierarchy based on the organizational chart.

8. A computer-implemented method to manage access and authority on a rule-based platform having a plurality of elements with attributes and a plurality of activities that a first element can perform that include a second element, each activity having at least one rule specifying use of at least one attribute of the second element to determine whether the activity is allowed by the first element, the method comprising:

requesting, by the first element, an activity that includes the second element from the plurality of elements, wherein the first element is selected from a first group consisting of a user, an individual, a process, a device, a machine, a team, and a group and wherein the second element is selected from a second group consisting of a user, an individual, a file, a page, a web site, a document, data, an application, a device, a machine, a team, a group, a resource, and a task;

granting, by a processor, the first element authority to access the second element according to the at least one rule of the requested activity evaluating at least one attribute of at least the second element to determine if the requested activity is allowed by the first element based at least on the at least one attribute of at least the second element;

granting, by a processor, the first element authority to modify the second element according to the at least one rule of the requested activity evaluating at least one attribute of at least the second element to determine if the requested activity is allowed by the first element based at least on the at least one attribute of at least the second element;

granting, by a processor, the first element authority to perform the requested activity according to the at least one rule of the requested activity evaluating at least one attribute of at least the second element to determine if the requested activity is allowed by the first element based at least on the at least one attribute of at least the second element; and implementing, by the rule based platform, the allowed requested activity according to authority granted to the first element.

9. The method of claim 8, wherein the evaluating by the rule based platform includes rules evaluating attributes of at least the second element to determine access and/or authority.

10. The method of claim 9, wherein the access includes view privileges as determined by rules of the rule based platform evaluating the attributes of at least the second element.

11. The method of claim 10, wherein items contained in the viewed second element are determined by rules evaluating at least the attributes of possible items to be contained in the second element.

12. The method of claim 9, wherein the authority includes create, modify, move, and delete privileges as determined by rules of the rule based platform evaluating the attributes of at least the second element.

13. The method of claim 12, further comprising requesting, when the rule based platform determines that the activity is not allowed by the first element, approval to implement the activity by another element having the authority as determined by rules of the rule based platform.

14. The method of claim 12, further comprising actively managing, upon implementing the allowed activity, attributes of each element to be modified by the activity according to rules associated with the activity.

15. The method of claim 8, wherein the evaluating, the determining, and the implementing by the rule based platform includes rules associated with the activity.

* * * * *